(12) United States Patent
Zhu et al.

(10) Patent No.: US 12,532,223 B2
(45) Date of Patent: Jan. 20, 2026

(54) COMMUNICATION METHOD AND APPARATUS

(71) Applicant: HUAWEI TECHNOLOGIES CO., LTD., Guangdong (CN)

(72) Inventors: Yuanping Zhu, Shanghai (CN); Yulong Shi, Beijing (CN); Jing Liu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 312 days.

(21) Appl. No.: 18/351,609

(22) Filed: Jul. 13, 2023

(65) Prior Publication Data

US 2023/0370898 A1   Nov. 16, 2023

Related U.S. Application Data

(63) Continuation of application No. PCT/CN2021/071954, filed on Jan. 14, 2021.

(51) Int. Cl.
*H04W 28/16* (2009.01)

(52) U.S. Cl.
CPC ................................ *H04W 28/16* (2013.01)

(58) Field of Classification Search
CPC ............................. H04W 28/16; H04L 12/28
USPC ................. 370/329, 401, 402, 403
See application file for complete search history.

(56) References Cited

U.S. PATENT DOCUMENTS

2016/0157218 A1* 6/2016 Nam ................. H04B 7/0639
370/329
2024/0323964 A1* 9/2024 Yi ...................... H04L 5/0051

FOREIGN PATENT DOCUMENTS

CN        111586744 A      8/2020
WO     2019246446 A1     12/2019

OTHER PUBLICATIONS

European Search Report for EP Application No. 21918504.8 dated Feb. 8, 2024, 15 pages.
International Search Report issued Jan. 14, 2021 in International Application No. PCT/CN2021/071954.

* cited by examiner

*Primary Examiner* — Dang T Ton

(57) ABSTRACT

The technology of this application relates to a communication method and apparatus. The method includes receiving first resource configuration information from a target donor node, determining third resource configuration information based on the first resource configuration information, and sending the third resource configuration information to a first node. The first resource configuration information includes current resource configuration information of a target cell, the target cell is a cell served by a target parent node, and the target parent node is used by the first node to connect to the target donor node. The third resource configuration information is used for resource configuration of a first cell, and the first cell is a cell served by the first node.

20 Claims, 17 Drawing Sheets

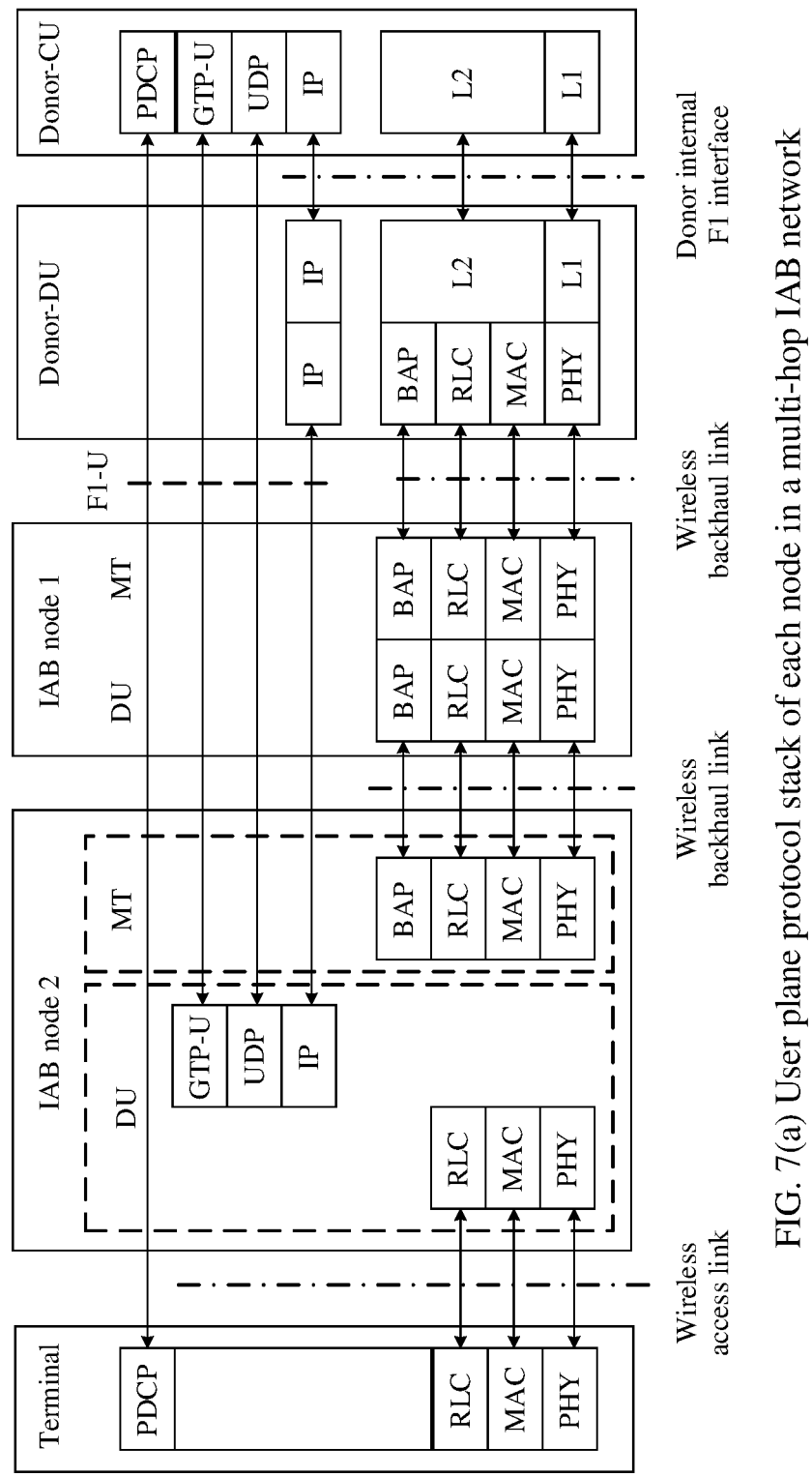
FIG. 7(a) User plane protocol stack of each node in a multi-hop IAB network

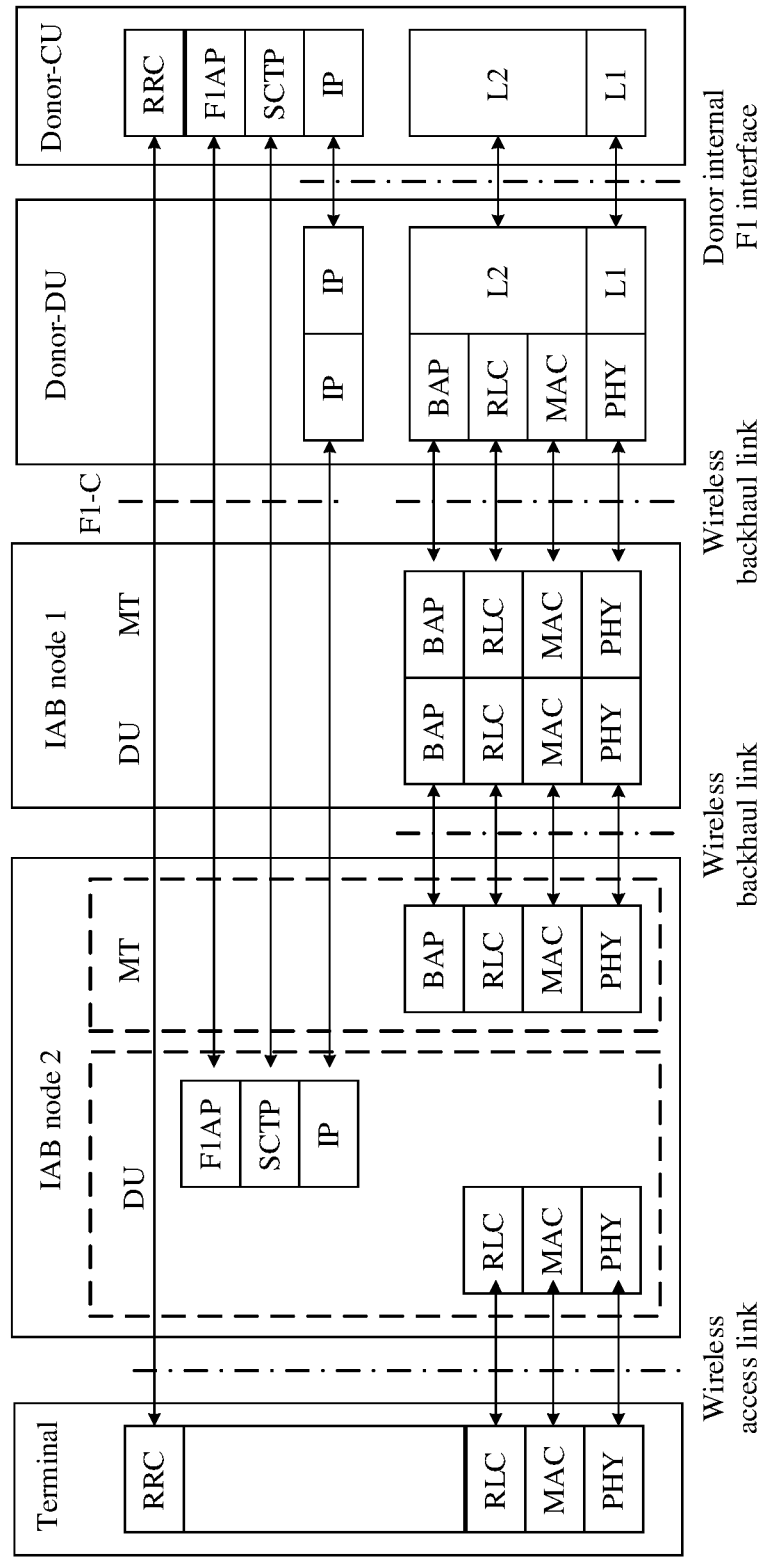
FIG. 7(b) Control plane protocol stack of each node in a multi-hop IAB network

COMMUNICATION METHOD AND APPARATUS

CROSS-REFERENCE TO RELATED APPLICATION(S)

This application is a continuation of International Application No. PCT/CN2021/071954, filed on Jan. 14, 2021, the disclosure of which is hereby incorporated by reference in its entirety.

TECHNICAL FIELD

This application relates to the communication field, and in particular, to a communication method and apparatus.

BACKGROUND

An integrated access and backhaul (IAB) node includes a mobile terminal (MT) and a distributed unit (DU). The IAB node may serve as an MT when facing a parent node of the IAB node. The IAB node may serve as a DU when facing a child node of the IAB node (the child node may be an MT part of a terminal device or another IAB node), and may be considered as a network device. The IAB node may establish a wireless backhaul link with at least one parent node of the IAB node by using an MT part, and may establish a wireless access link with at least one child node of the IAB node by using a DU part.

If the wireless access link and the wireless backhaul link of the IAB node use an intra-band working mode (that is, the wireless access link and the wireless backhaul link use wireless carriers of a same frequency band), the DU part (referred to as an IAB-DU below) of the IAB node and the MT part (referred to as an IAB-MT below) of the IAB node have a duplex constraint problem. Specifically, the IAB-DU and the IAB-MT work in a time division multiplexing (TDM) manner. In downlink transmission, when the IAB-MT receives a message from the parent node, the IAB-DU of the IAB node cannot send a message to the child node of the IAB node. When the IAB-DU sends a message to the child node of the IAB node, the IAB-MT cannot receive a message from the parent node of the IAB node. Similarly, in uplink transmission, the IAB-DU and the IAB-MT have the same duplex constraint problem.

However, in the conventional technology, only a duplex constraint problem caused when an IAB node and a parent node of the IAB node are connected to a same donor node can be resolved.

SUMMARY

Embodiments of this application provide a communication method and apparatus, to resolve a duplex constraint problem caused when an IAB node is connected to a plurality of donor nodes or when an IAB-DU and an IAB-MT are managed by different donor nodes, thereby ensuring normal communication of the IAB node.

To achieve the foregoing objective, the following technical solutions are used in this application.

According to a first aspect, a communication method is provided. The communication method includes: receiving one or more of the following from a target donor node: first resource configuration information, sixth resource configuration information, or first information; determining third resource configuration information, including: determining the third resource configuration information based on the first resource configuration information, or determining the third resource configuration information based on the sixth resource configuration information and/or the first information; and sending the third resource configuration information to a first node.

The first resource configuration information includes current resource configuration information of a target cell, the sixth resource configuration information includes resource reconfiguration information of the target cell, the target cell is a cell served by a target parent node, and the target parent node is used by the first node to connect to the target donor node. The first information includes resource configuration information that is of a first cell and that is determined by the target donor node, and the first cell is a cell served by the first node. The third resource configuration information is used for resource configuration of the first cell.

According to the communication method in the first aspect, a source donor node receives, from the target donor node, current resource configuration information of a target cell served by a target node, and determines, based on the current resource configuration information of the target cell, resource reconfiguration information of the first cell served by the first node. Alternatively, the target donor node sends the first information determined by the target donor node and/or the resource reconfiguration information of the target cell to the source donor node, and recommends the source donor node to adjust resource configuration of the target cell based on the first information and/or the resource reconfiguration information of the target cell. This can meet a duplex constrain, can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

In a possible implementation, the determining the third resource configuration information based on the first resource configuration information may include: determining the third resource configuration information based on the first resource configuration information and second resource configuration information. The second resource configuration information may include current resource configuration information of the first cell. That is, the source donor node may determine the third resource configuration information based on the current resource configuration information of the target cell and the current resource configuration information of the first cell.

In a possible implementation, the determining the third resource configuration information based on the sixth resource configuration information and/or the first information may include: determining the third resource configuration information based on the sixth resource configuration information and/or the first information and second resource configuration information. The second resource configuration information may include current resource configuration information of the first cell. That is, the source donor node may determine the third resource configuration information based on the resource reconfiguration information of the target cell and/or the resource configuration information that is of the first cell and that is determined by the target donor node and the current resource configuration information of the first cell.

In a possible implementation, the communication method according to the first aspect may further include: determining second information based on the second resource configuration information. The second resource configuration information may include the current resource configuration information of the first cell, and the second information may include resource configuration information that is of the target cell and that is determined by the source donor node. That is, the source donor node may determine the resource configuration information of the target cell, to send the resource configuration information to the target donor node, and recommend the target donor node to adjust the resource configuration of the target cell based on the second information, so as to avoid a conflict between the resource configuration of the first cell and the resource configuration of the target cell.

In a possible implementation, the communication method according to the first aspect may further include: determining the second information based on the second resource configuration information and the first resource configuration information. The second resource configuration information may include the current resource configuration information of the first cell, and the second information may include the resource configuration information that is of the target cell and that is determined by the source donor node.

In a possible implementation, the communication method according to the first aspect may further include: sending the second information to the target donor node.

In a possible implementation, the communication method according to the first aspect may further include: determining fifth resource configuration information based on the third resource configuration information and/or the first resource configuration information. The fifth resource configuration information includes resource reconfiguration information of a second cell, the second cell is a cell served by a second node, and the second node is connected to the source donor node via the first node. That is, the source donor node may determine, based on the resource reconfiguration information of the first cell and/or the current resource configuration information of the target cell, resource reconfiguration information of the second cell served by a descendent node of the first node.

In a possible implementation, the communication method according to the first aspect may further include: determining the fifth resource configuration information based on the third resource configuration information and/or the first resource configuration information and fourth resource configuration information. The fourth resource configuration information may include current resource configuration information of the second cell, the second cell may be the cell served by the second node, the second node is connected to the source donor node via the first node, and the fifth resource configuration information may include the resource reconfiguration information of the second cell.

In a possible implementation, the communication method according to the first aspect may further include: determining fifth resource configuration information based on one or more of the sixth resource configuration information, the first information, and the third resource configuration information. The fifth resource configuration information may include resource reconfiguration information of a second cell, the second cell may be a cell served by a second node, and the second node is connected to the source donor node via the first node.

In a possible implementation, the communication method according to the first aspect may further include: determining fifth resource configuration information based on fourth resource configuration information and one or more of the sixth resource configuration information, the first information, and the third resource configuration information. The fourth resource configuration information may include current resource configuration information of a second cell, the fifth resource configuration information may include resource reconfiguration information of the second cell, the second cell is a cell served by a second node, and the second node is connected to the source donor node via the first node.

In a possible implementation, the communication method according to the first aspect may further include: sending the fifth resource configuration information to the second node.

In a possible implementation, the communication method according to the first aspect may further include: sending second effectiveness indication information to the second node. The second effectiveness indication information may indicate that the fifth resource configuration information is effective.

In a possible implementation, the communication method according to the first aspect may further include: sending the third resource configuration information to the target donor node.

In a possible implementation, the communication method according to the first aspect may further include: sending a first request message to the target donor node. The first request message may be used to request to hand over a donor node of the first node from the source donor node to the target donor node, or used to request to use the target donor node as a secondary node of the first node.

In a possible implementation, the first request message may include one or more of the following: first indication information, an identifier of the target cell, or the second resource configuration information. The first indication information may indicate that the first node is an integrated access and backhaul IAB node, and the second resource configuration information may include the current resource configuration information of the first cell.

In a possible implementation, the communication method according to the first aspect may further include: receiving a first response message from the target donor node. The first response message may be used to determine to hand over the donor node of the first node from the source donor node to the target donor node, or used to determine to use the target donor node as the secondary node of the first node.

In a possible implementation, the first response message may include one or more of the following: the first resource configuration information, the sixth resource configuration information, or the first information.

In a possible implementation, the communication method according to the first aspect may further include: sending second indication information to the target donor node. The second indication information may indicate whether the source donor node uses the first information as resource reconfiguration information of the first cell. For example, if the second indication information indicates that the source donor node uses the first information as resource reconfiguration information of the first cell, it indicates that the source donor node fully accepts the recommendation of the target donor node. If the second indication information indicates that the source donor node does not use the first information as resource reconfiguration information of the first cell, it indicates that the source donor node does not fully accept the recommendation of the target donor node or the source donor node fully rejects the recommendation of the target donor node.

In a possible implementation, the communication method according to the first aspect may further include: receiving third indication information from the target donor node. The third indication information may indicate whether the target donor node uses the second information as the resource reconfiguration information of the target cell. In this way, after receiving the third resource configuration information, the first node does not immediately use the third resource configuration information. After determining that the third resource configuration information is effective, the first node performs resource configuration on the first cell based on the third resource configuration information.

In a possible implementation, the communication method according to the first aspect may further include: sending first effectiveness indication information to the first node. The first effectiveness indication information indicates that the third resource configuration information is effective.

According to a second aspect, a communication method is provided. The communication method includes: receiving one or more of the following from a source donor node: second resource configuration information, third resource configuration information, or second information; determining sixth resource configuration information, including: determining the sixth resource configuration information based on the second resource configuration information, or determining the sixth resource configuration information based on the third resource configuration information and/or the second information; and sending the sixth resource configuration information to a target parent node. The second resource configuration information includes current resource configuration information of a first cell, the third resource configuration information includes resource reconfiguration information of the first cell, the first cell is a cell served by a first node, the second information includes resource configuration information that is of a target cell and that is determined by the source donor node, the target cell is a cell served by the target parent node, the target parent node is used by the first node to connect to a target donor node, and the sixth resource configuration information is used for resource configuration of the target cell.

According to the communication method in the second aspect, the target donor node receives, from the source donor node, the current resource configuration information of the first cell served by the first node, and determines, based on the current resource configuration information of the first cell, resource reconfiguration information of the target cell served by the target parent node. This can meet a duplex constrain, can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

In a possible implementation, the determining the sixth resource configuration information based on the second resource configuration information may include: determining the sixth resource configuration information based on the second resource configuration information and first resource configuration information. The first resource configuration information may include current resource configuration information of the target cell.

In a possible implementation, the determining the sixth resource configuration information based on the third resource configuration information and/or the second information may include: determining the sixth resource configuration information based on the third resource configuration information and/or the second information and first resource configuration information. The first resource configuration information may include current resource configuration information of the target cell.

In a possible implementation, the communication method according to the second aspect may further include: determining first information based on the first resource configuration information. The first resource configuration information may include the current resource configuration information of the target cell, and the first information may include resource configuration information that is of the first cell and that is determined by the target donor node.

In a possible implementation, the communication method according to the second aspect may further include: determining the first information based on the first resource configuration information and the second resource configuration information. The first resource configuration information may include the current resource configuration information of the target cell, and the first information may include the resource configuration information that is of the first cell and that is determined by the target donor node.

In a possible implementation, the communication method according to the second aspect may further include: sending the first information to the source donor node.

In a possible implementation, the communication method according to the second aspect may further include: determining eighth resource configuration information based on the second resource configuration information and/or the sixth resource configuration information. The eighth resource configuration information may include resource reconfiguration information of a third cell, the third cell may be a cell served by a third node, and the third node is connected to the target donor node by using the target parent node.

In a possible implementation, the communication method according to the second aspect may further include: determining the eighth resource configuration information based on the second resource configuration information and/or the sixth resource configuration information and seventh resource configuration information. The seventh resource configuration information may include current resource configuration information of the third cell, the third cell is the cell served by the third node, the third node is connected to the target donor node by using the target parent node, and the eighth resource configuration information may include the resource reconfiguration information of the third cell.

In a possible implementation, the communication method according to the second aspect may further include: determining eighth resource configuration information based on one or more of the third resource configuration information, the second information, and the sixth resource configuration information. The eighth resource configuration information may include resource reconfiguration information of a third cell, the third cell may be a cell served by a third node, and the third node is connected to the target donor node by using the target parent node.

In a possible implementation, the communication method according to the second aspect may further include: determining eighth resource configuration information based on seventh resource configuration information and one or more of the third resource configuration information, the second information, and the sixth resource configuration information. The seventh resource configuration information may include current resource configuration information of a third cell, the eighth resource configuration information may include resource reconfiguration information of the third cell, the third cell may be a cell served by a third node, and the third node is connected to the target donor node by using the target parent node.

In a possible implementation, the communication method according to the second aspect may further include: sending the eighth resource configuration information to the third node.

In a possible implementation, the communication method according to the second aspect may further include: sending the sixth resource configuration information to the source donor node.

In a possible implementation, the communication method according to the second aspect may further include: receiving a first request message from the source donor node. The first request message may be used to request to hand over a donor node of the first node from the source donor node to the target donor node, or used to request to use the target donor node as a secondary node of the first node.

In a possible implementation, the first request message may include one or more of the following: first indication information, an identifier of the target cell, or the second resource configuration information. The first indication information may indicate that the first node is an integrated access and backhaul IAB node, and the second resource configuration information may include the current resource configuration information of the first cell.

In a possible implementation, the communication method according to the second aspect may further include: sending a first response message to the source donor node. The first response message may be used to determine to hand over the donor node of the first node from the source donor node to the target donor node, or used to determine to use the target donor node as the secondary node of the first node.

In a possible implementation, the first response message may include one or more of the following: the first resource configuration information, the sixth resource configuration information, or the first information.

In a possible implementation, the communication method according to the second aspect may further include: receiving second indication information from the source donor node. The second indication information may indicate whether the source donor node uses the first information as resource reconfiguration information of the first cell.

In a possible implementation, the communication method according to the second aspect may further include: sending third indication information to the source donor node. The third indication information may indicate whether the target donor node uses the second information as the resource reconfiguration information of the target cell.

In a possible implementation, the communication method according to the second aspect may further include: sending first effectiveness indication information to the first node. The first effectiveness indication information may indicate that the third resource configuration information is effective.

In a possible implementation, the communication method according to the second aspect may further include: sending third effectiveness indication information to the third node. The third effectiveness indication information may indicate that the eighth resource configuration information is effective.

In a possible implementation, the communication method according to the second aspect may further include: sending fourth effectiveness indication information to the target parent node. The fourth effectiveness indication information may indicate that the sixth resource configuration information is effective.

According to a third aspect, a communication method is provided. The communication method includes: receiving third resource configuration information from a source donor node; determining that the third resource configuration information is effective, including: receiving first effectiveness indication information from a target donor node, a target parent node, or the source donor node, or establishing a connection to the target parent node; and performing resource configuration on a first cell based on the third resource configuration information. The third resource configuration information is used for resource configuration of the first cell, the first cell is a cell served by a first node, and the first effectiveness indication information indicates that the third resource configuration information is effective.

In a possible implementation, the communication method according to the third aspect may further include: sending second effectiveness indication information to a second node. The second effectiveness indication information may indicate that fifth resource configuration information is effective. In this way, after receiving the fifth resource configuration information, the second node does not immediately use the fifth resource configuration information. After determining that the fifth resource configuration information is effective, the second node performs resource configuration on a second cell based on the fifth resource configuration information.

In addition, for a technical effect of the third aspect, refer to the technical effect of the communication method according to any implementation of the second aspect.

According to a fourth aspect, a communication method is provided. The communication method includes: receiving sixth resource configuration information from a target donor node; determining that the sixth resource configuration information is effective, including: receiving fourth effectiveness indication information from the target donor node, or establishing a connection to a first node; and performing resource configuration on a target cell based on the sixth resource configuration information. The sixth resource configuration information may be used for resource configuration of the target cell, the target cell is a cell served by a target parent node, and the target parent node may be used by the first node to connect to the target donor node, and the fourth effectiveness indication information indicates that the sixth resource configuration information is effective.

In a possible implementation, the communication method according to the fourth aspect may further include: sending third effectiveness indication information to a third node. The third effectiveness indication information may indicate that eighth resource configuration information is effective.

In a possible implementation, the communication method according to the fourth aspect may further include: sending first effectiveness indication information to the first node. The first effectiveness indication information may indicate that third resource configuration information is effective.

In addition, for a technical effect of the fourth aspect, refer to the technical effect of the communication method according to any implementation of the second aspect.

According to a fifth aspect, a communication method is provided. The communication method includes: sending first configuration effectiveness information to a second node. The first configuration effectiveness information indicates effectiveness of a first internet protocol (IP) address and/or effectiveness of first backhaul adaptation protocol (BAP) layer configuration information, the first IP address is used by the second node to communicate with a central unit (CU) of a source donor node or a CU of a target donor node by using a distributed unit (DU) of the target donor node, and the first BAP layer configuration information is used by the second node to communicate with the CU of the source donor node or the CU of the target donor node.

According to the communication method in the fifth aspect, after obtaining the first IP address and/or the first BAP layer configuration information, the second node may not first use the configuration, and after receiving the first configuration effectiveness information, communicate with the CU of the source donor node or the CU of the target donor node by using the first IP address and/or the first BAP layer configuration information, so that when a first node is connected to a plurality of donor nodes, or when a DU part of the first node and an MT part of the first node are not managed by a same donor node, the second node can normally communicate with the CU of the source donor node or the CU of the target donor node.

In a possible implementation, the first BAP layer configuration information may include one or more of the following: a first BAP routing identifier, a BAP address of a next-hop node of the second node, an identifier of a default backhaul (BH) radio link control (RLC) channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

In a possible implementation, the first configuration effectiveness information may be carried in a protocol data unit (PDU) or a data link layer control element (MAC) CE at a BAP layer.

In a possible implementation, the first configuration effectiveness information may include a first index value and/or a second index value, the first index value is used to indicate at least one first IP address, and the second index value is used to indicate at least one piece of first BAP layer configuration information.

In a possible implementation, the first configuration effectiveness information may include an identifier of the target donor node.

According to a sixth aspect, a communication method is provided. The communication method includes: receiving first configuration effectiveness information from a first node. The first configuration effectiveness information indicates effectiveness of a first internet protocol IP address and/or effectiveness of first backhaul adaptation protocol BAP layer configuration information, the first IP address is used by a second node to communicate with a central unit CU of a source donor node or a CU of a target donor node by using a distributed unit DU of the target donor node, and the first BAP layer configuration information is used by the second node to communicate with the CU of the source donor node or the CU of the target donor node.

In addition, for a technical effect of the sixth aspect, refer to the technical effect of the communication method according to any implementation of the fifth aspect.

In a possible implementation, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

In a possible implementation, the first configuration effectiveness information may be carried in a protocol data unit PDU or a data link layer control element MAC CE at a BAP layer.

In a possible implementation, the first configuration effectiveness information may include a first index value and/or a second index value, the first index value is used to indicate at least one first IP address, and the second index value is used to indicate at least one piece of first BAP layer configuration information.

In a possible implementation, the first configuration effectiveness information may include an identifier of the target donor node.

According to a seventh aspect, a communication method is provided. The communication method includes: determining that a first condition is met, and sending a first message to a second node.

The first condition includes: a release message or a handover success message from a target donor node is received; indication information from the target donor node indicating that a mobile terminal (MT) part of a first node has been successfully connected to the target donor node is received; or it is determined that a control plane of an F1 interface of the first node has been handed over to a second internet protocol IP address. The release message indicates a source donor node to release the MT part of the first node, the handover success message indicates that the MT part of the first node has been successfully handed over from being connected to the source donor node to being connected to the target donor node, and the second IP address is used by the first node to communicate with a central unit CU of the source donor node by using a DU of the target donor node. The first message includes a first IP address and/or first backhaul adaptation protocol BAP layer configuration information, the first IP address is used by the second node to communicate with the CU of the source donor node or a CU of the target donor node by using the DU of the target donor node, and the first BAP layer configuration information is used by the second node to communicate with the CU of the source donor node or the CU of the target donor node.

According to the communication method in the seventh aspect, after determining that the MT part of the first node has been successfully connected to the target donor node, the source donor node sends the first IP address and/or the first BAP layer configuration information to the second node, to enable the second node to communicate with the CU of the source donor node or the CU of the target donor node by using the first IP address and/or the first BAP layer configuration information, so that when the first node is connected to a plurality of donor nodes, or when a DU part of the first node and the MT part of the first node are not managed by a same donor node, the second node can normally communicate with the CU of the source donor node or the CU of the target donor node.

In a possible implementation, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

According to an eighth aspect, a communication method is provided. The communication method includes: receiving a first internet protocol IP address and/or first backhaul adaptation protocol BAP layer configuration information from a source donor node; receiving first sending indication information from the source donor node; and after a first node successfully establishes a connection to a target parent node, sending the first IP address and/or the first BAP layer configuration information to a second node. The first IP address is used by the second node to communicate with a central unit CU of the source donor node or a CU of a target donor node by using a distributed unit DU of the target donor node, the first BAP layer configuration information is used by the second node to communicate with the CU of the source donor node or the CU of the target donor node, and the first sending indication information indicates the first node to send the first IP address and/or the first BAP layer configuration information to the second node after the first node successfully establishes the connection to the target parent node.

According to the communication method in the eighth aspect, the first node sends, based on an indication of the source donor node, the first IP address and/or the first BAP layer configuration information to the second node after the first node successfully establishes the connection to the target parent node, to enable the second node to communicate with the CU of the source donor node or the CU of the target donor node by using the first IP address and/or the first BAP layer configuration information, so that when the first node is connected to a plurality of donor nodes, or when a DU part of the first node and an MT part of the first node are not managed by a same donor node, the second node can normally communicate with the CU of the source donor node or the CU of the target donor node.

In a possible implementation, the first BAP layer configuration information includes one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

According to a ninth aspect, a communication apparatus is provided. The communication apparatus includes a unit or a module configured to perform the method in any one of the first aspect or the eleventh aspect.

In this application, the communication apparatus according to the ninth aspect may be a source donor node, or a chip (system) or another part or component that may be disposed on the source donor node.

In addition, for a technical effect of the communication apparatus according to the ninth aspect, refer to the technical effect of the communication method according to any implementation of the first aspect or the eleventh aspect.

According to a tenth aspect, a communication apparatus is provided. The communication apparatus includes a unit or a module configured to perform any method in the second aspect.

In this application, the communication apparatus according to the tenth aspect may be a target donor node, or a chip (system) or another part or component that may be disposed on the target donor node.

In addition, for a technical effect of the communication apparatus in the tenth aspect, refer to the technical effect of the communication method in any implementation of the second aspect.

According to an eleventh aspect, a communication apparatus is provided. The communication apparatus includes a unit or a module configured to perform the method in any one of the third aspect, the fifth aspect, or the eighth aspect.

In this application, the communication apparatus according to the eleventh aspect may be a first node, or a chip (system) or another part or component that may be disposed on the first node.

In addition, for a technical effect of the communication apparatus according to the eleventh aspect, refer to the technical effect of the communication method according to any implementation of the third aspect, the fifth aspect, or the eighth aspect.

According to a twelfth aspect, a communication apparatus is provided. The communication apparatus includes a unit or a module configured to perform any method in the fourth aspect.

In this application, the communication apparatus according to the twelfth aspect may be a target father node, or a chip (system) or another part or component that may be disposed on the target father node.

In addition, for a technical effect of the communication apparatus in the twelfth aspect, refer to the technical effect of the communication method in any implementation of the fourth aspect.

According to a thirteenth aspect, a communication apparatus is provided. The communication apparatus includes a unit or a module configured to perform any method in the sixth aspect.

In this application, the communication apparatus according to the thirteenth aspect may be a second node, or a chip (system) or another part or component that may be disposed on the second node.

In addition, for a technical effect of the communication apparatus in the thirteenth aspect, refer to the technical effect of the communication method in any implementation of the second aspect.

According to a fourteenth aspect, a communication apparatus is provided. The communication apparatus includes a processor, and the processor is coupled to a memory. The memory is configured to store a computer program. The processor is configured to execute the computer program stored in the memory, so that the communication apparatus performs the communication method according to any one of the first aspect to the eighth aspect.

In a possible implementation, the communication apparatus in the fourteenth aspect may further include a transceiver. The transceiver may be a transceiver circuit or an input/output port. The transceiver may be used by the communication apparatus to communicate with another communication apparatus.

In this application, the communication apparatus according to the fourteenth aspect may be a source donor node, a target donor node, a first node, a target parent node, or a second node, or a chip or a chip system disposed inside the source donor node, the target donor node, the first node, the target parent node, or the second node.

In addition, for a technical effect of the communication apparatus according to the fourteenth aspect, refer to the technical effect of the communication method according to any implementation of the first aspect to the eighth aspect.

According to a fifteenth aspect, a chip system is provided. The chip system includes a processor and an input/output port, the processor is configured to implement processing functions in any one of the first aspect to the eighth aspect, and the input/output port is configured to implement transceiver functions in any one of the first aspect to the eighth aspect.

In a possible implementation, the chip system further includes a memory. The memory is configured to store program instructions and data for implementing functions in any one of the first aspect to the eighth aspect.

The chip system may include a chip, or may include a chip and another discrete component.

According to a sixteenth aspect, a communication system is provided. The system includes a source donor node, a first node, and a target donor node, or the system includes a target donor node, a target parent node, and a source donor node, or the system includes a source donor node and one or more second nodes, or the system includes a first node and one or more second nodes, or the system includes a source donor node, a first node, a target donor node, and a target parent node, or the system includes a source donor node, a first node, a target donor node, a target parent node, and a second node.

According to a seventeenth aspect, a computer-readable storage medium is provided. The computer-readable storage medium includes a computer program or instructions. When the computer program or the instructions are run on a computer, the computer is enabled to perform the communication method according to any possible implementation of the first aspect to the eighth aspect.

According to an eighteenth aspect, a computer program product is provided. The computer program product includes a computer program or instructions. When the computer program or the instructions are run on a computer, the computer is enabled to perform the communication method according to any possible implementation of the first aspect to the eighth aspect.

BRIEF DESCRIPTION OF DRAWINGS

FIG. 7(a) and FIG. 7(b) are example schematic diagrams of an architecture of a protocol stack according to an embodiment of this application;

DESCRIPTION OF EMBODIMENTS

Figure 1:
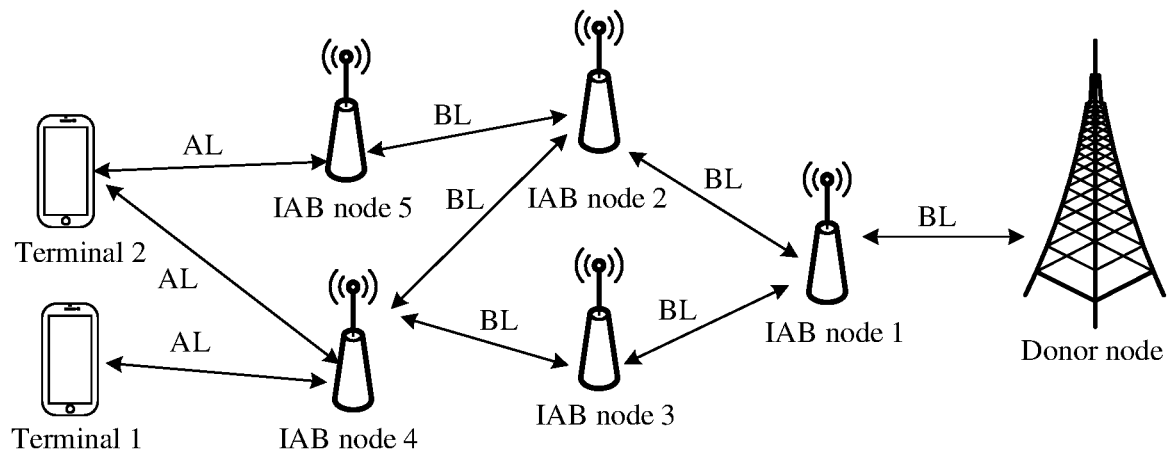
FIG. 1 is an example schematic diagram of an IAB networking scenario according to an embodiment of this application.

The following describes the technical solutions in embodiments of this application with reference to the accompanying drawings in embodiments of this application. In descriptions of this application, unless otherwise specified, "/" means "or". For example, A/B may represent A or B. A term "and/or" in this specification describes only an association relationship between associated objects and indicates that there may be at least three relationships. For example, A and/or B may represent the following three cases: Only A exists, both A and B exist, and only B exists. In addition, in the descriptions of this application, unless otherwise specified, "a plurality of" means two or more than two. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity or an execution sequence, and the terms such as "first" and "second" do not indicate a definite difference.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or implementation scheme described as an "example" in this application should not be explained as being more preferred or having more advantages than another embodiment or implementation scheme. Specifically, the term "example" is used to present a concept in a specific manner.

In embodiments of this application, terms "information", "signal", "message", "channel", and "signaling" may sometimes be interchangeably used. It should be noted that meanings expressed by the terms are consistent when differences of the terms are not emphasized. Terms "of", "corresponding or relevant", and "corresponding" may be interchangeably used sometimes. It should be noted that meanings expressed by the terms are consistent when differences of the terms are not emphasized.

The technical solutions in embodiments of this application may be applied to various communication systems, for example, an orthogonal frequency-division multiple access (OFDMA) system, a single carrier frequency-division multiple access (SC-FDMA) system, and another system. Terms "system" and "network" may be interchanged with each other. The OFDMA system may implement wireless technologies such as evolved universal terrestrial radio access (E-UTRA) and ultra mobile broadband (UMB). The E-UTRA is an evolved version of a universal mobile telecommunications system (UMTS). The 3rd generation partnership project (3GPP) uses a new version of E-UTRA in long term evolution (LTE) and various versions evolved based on LTE. A 5th generation (5G) communication system using new radio (NR) is a next-generation communication system that is under research. In addition, the technical solutions in embodiments of this application are further applicable to a future-oriented communication system, for example, a 6th generation (6G) mobile communication system.

Network elements in this application include a terminal and a wireless backhaul node.

The terminal in embodiments of this application may also be referred to as user equipment (UE), an access terminal, a subscriber unit, a subscriber station, a mobile station, a remote station, a remote terminal, a mobile device, a user terminal, a wireless communication device, a user agent, or a user apparatus. Alternatively, the terminal may be a station (ST) in a wireless local area network (WLAN), or may be a cellular phone, a cordless phone, a session initiation protocol (SIP) phone, a wireless local loop (WLL) station, a personal digital assistant (PDA) device, a handheld device having a wireless communication function, a computing device or another processing device connected to a wireless modem, a vehicle-mounted device, or a wearable device (which may also be referred to as a wearable intelligent device). Alternatively, the terminal may be a terminal in a next-generation communication system, for example, a terminal in 5G or a terminal in a future evolved public land mobile network (PLMN).

The wireless backhaul node is configured to provide a wireless backhaul service for anode (for example, a terminal) wirelessly accessing the wireless backhaul node. The wireless backhaul service is a data and/or signaling backhaul service provided through a wireless backhaul link.

The system architecture and application scenarios described in embodiments of this application are intended to describe the technical solution in embodiments of this application more clearly, and do not constitute a limitation on the technical solutions provided in embodiments of this application. A person of ordinary skill in the art may learn that the technical solutions provided in embodiments of this application are also applicable to a similar technical problem as a network architecture evolves and a new service scenario emerges. In embodiments of this application, an example in which a provided method is applied to an NR system or a 5G network is used for description. However, it should be noted that the method provided in embodiments of this application may further be applied to another network, for example, may be applied to an evolved packet system (EPS) network (namely, a 4th generation (4G) network). Correspondingly, when the method provided in embodiments of this application is applied to the EPS network, a network node performing the method provided in embodiments of this application is replaced with a network node in the EPS network. For example, when the method provided in embodiments of this application is applied to the 5G network or the NR system, a wireless backhaul node in the following descriptions may be a wireless backhaul node in the 5G network. For example, the wireless backhaul node in the 5G network may be referred to as an IAB node, and certainly may also have another name. This is not specifically limited in embodiments of this application. When the method provided in embodiments of this application is applied to the EPS network, a wireless backhaul node in the following may be a wireless backhaul node in the EPS network. For example, the wireless backhaul node in the EPS network may be referred to as a relay node (RN).

With development of technologies such as virtual reality (VR), augmented reality (AR), and the internet of things, there will be more terminals in a future network, and usage of network data will also continuously increase. To adapt to the increasing quantity of terminals and the rapidly increasing usage of network data in the market, higher requirements are imposed on the capacity of the 5G network. In a hotspot area, to meet a 5G ultra-high capacity requirement, using high-frequency small cells for networking becomes more popular. High-frequency carriers have a poor propagation characteristic, are severely attenuated if blocked, and have small coverage. Therefore, a large quantity of small cells need to be densely deployed in the hotspot area. These small cells may be integrated access and backhaul (IAB) nodes.

To design a flexible and convenient access and backhaul solution, a wireless transmission solution is applied to both an access link (AL) and a backhaul link (BL) in an IAB scenario.

In a network including an IAB node (referred to as an IAB network for short below), the IAB node may provide a wireless access service for a terminal, and is connected to a donor node through a wireless backhaul link for transmitting service data of a user. For example, the donor node may be a donor eNodeB. The donor node may be an IAB donor (IAB donor) or a DgNB (namely, a donor gNodeB) for short in the 5G network. The donor node may be a complete entity, or may be a form in which a central unit (CU) (referred to as a Donor-CU for short, or referred to as a CU for short) and a distributed unit (DU) (referred to as a Donor-DU for short)

are separated, that is, the donor node includes the Donor-CU and the Donor-DU. In embodiments of this application and the accompanying drawings, an example in which the donor node includes the Donor-CU and the Donor-DU is used to describe the method provided in embodiments of this application.

The Donor-CU may alternatively be a form in which a user plane (UP) (referred to as a CU-UP for short) and a control plane (CP) (referred to as a CU-CP for short) are separated. That is, the Donor-CU includes one CU-CP and at least one CU-UP.

The IAB node is connected to a core network through the donor node via a wired link. For example, in a 5G standalone architecture, an IAB node is connected to a core network (5G core, 5GC) of a 5G network through a donor node via a wired link. In a 5G non-standalone architecture, an IAB node is connected to an evolved packet core (EPC) on a control plane through an evolved NodeB (eNB), and is connected to the EPC on a user plane through a donor node and the eNB.

To ensure service transmission reliability, an IAB network supports multi-hop IAB-node networking and multi-connection IAB-node networking. Therefore, there may be a plurality of transmission paths between the terminal and the donor node. On one path, there is a determined hierarchical relationship between IAB nodes, and between an IAB node and a donor node serving the IAB node. Each IAB node considers, as a parent node, a node providing a backhaul service for the IAB node. Accordingly, each IAB node may be considered as a child node of the parent node of the IAB node.

FIG. 1 is a schematic diagram of an IAB networking scenario according to an embodiment of this application. With reference to FIG. 1, an IAB network may support standalone (SA) networking. A parent node of an IAB node 1 is a donor node, the IAB node 1 is a parent node of an IAB node 2 and an IAB node 3, both the IAB node 2 and the IAB node 3 are parent nodes of an IAB node 4, and a parent node of an IAB node 5 is the IAB node 2. An uplink data packet of a terminal may be transmitted to a donor node through one or more IAB nodes, and then is sent by the donor node to a mobile gateway device (for example, a user plane function (UPF) network element in a 5G network). After the donor node receives a downlink data packet from the mobile gateway device, the donor node sends the downlink data packet to the terminal through the one or more IAB nodes. There are two available paths for data packet transmission between a terminal 1 and the donor node: the terminal 1→the IAB node 4→the IAB node 3→the IAB node 1→the donor node, and the terminal 1→the IAB node 4→the IAB node 2→the IAB node 1→the donor node. There are three available paths for data packet transmission between a terminal 2 and the donor node: the terminal 2→the IAB node 4→the IAB node 3→the IAB node 1→the donor node, the terminal 2→the IAB node 4→the IAB node 2→the IAB node 1→the donor node, and the terminal 2→the IAB node 5→the IAB node 2→the IAB node 1→the donor node.

It may be understood that, in the IAB network, one transmission path between the terminal and the donor node may include one or more IAB nodes. Each IAB node needs to maintain a wireless backhaul link to a parent node and a wireless access link to a child node. If one IAB node is a node accessed by the terminal, a wireless access link exists between the IAB node and a child node (namely, the terminal). If one IAB node is a node that provides a backhaul service for another IAB node, a wireless backhaul link exists between the IAB node and a child node (namely, the another IAB node). For example, refer to FIG. 1. On the path "the terminal 1→the IAB node 4→the IAB node 3→the IAB node 1→the donor node", the terminal 1 accesses the IAB node 4 through a wireless access link, the IAB node 4 accesses the IAB node 3 through a wireless backhaul link, the IAB node 3 accesses the IAB node 1 through a wireless backhaul link, and the IAB node 1 accesses the donor node through a wireless backhaul link.

For example, the IAB node may be a device such as customer premises equipment (CPE) or a residential gateway (RG). In this case, the method provided in embodiments of this application may be further applied to a home access scenario.

The foregoing IAB networking scenario shown in FIG. 1 is merely an example. In a multi-hop multi-connectivity combined IAB scenario, there are more other possible IAB networking scenarios. For example, a donor node and an IAB node connected to another donor node form dual connectivity to serve a terminal. The possible IAB networking scenarios are not listed one by one herein.

Figure 2:
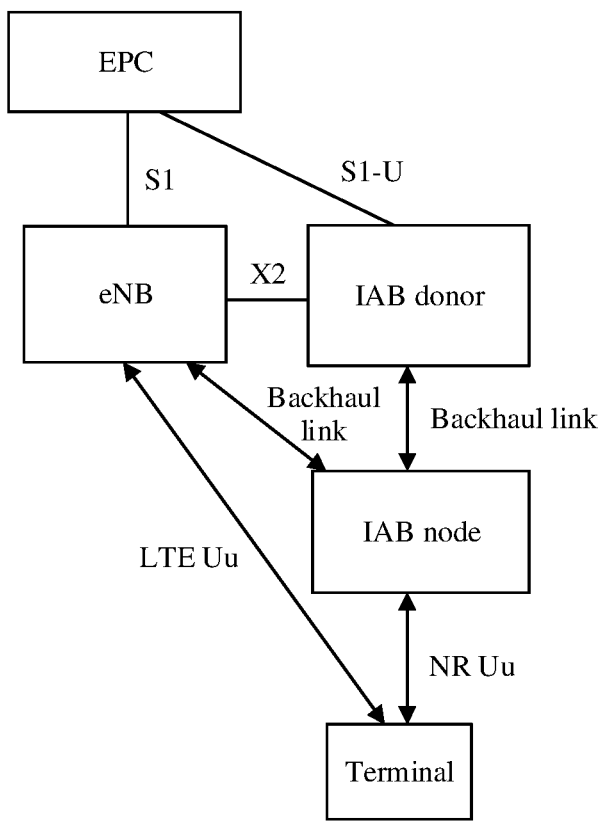
FIG. 2 is an example schematic diagram of another IAB networking scenario according to an embodiment of this application.

FIG. 2 is a schematic diagram of another IAB networking scenario according to an embodiment of this application. With reference to FIG. 2, an IAB network may support non-standalone (NSA) networking. An IAB node supports dual connectivity between 4G and 5G networks, that is, E-UTRAN-NR dual connectivity (EN-DC). An evolved NodeB eNB is a master eNB (MeNB). The eNB provides an LTE air interface (LTE Uu) connection for the IAB node, and establishes an S1 interface with an EPC for user plane transmission and control plane transmission. An IAB donor is a secondary eNodeB, provides an NR air interface (NR Uu) connection for the IAB node, and establishes an S1 interface with the EPC for user plane transmission. Similarly, a terminal supports EN-DC. The terminal is connected to the master eNodeB eNB through the LTE Uu interface, and is connected to a secondary eNodeB IAB node through the NR Uu interface. A secondary eNodeB of UE may also be the IAB donor.

It should be noted that the IAB networking scenario shown in FIG. 2 is merely an example, and the NSA networking scenario of the IAB network may support multi-hop IAB networking. For example, the terminal in FIG. 2 may be another IAB node, that is, the IAB node may be connected to the IAB donor through a multi-hop wireless backhaul link. This is not listed one by one herein.

Figure 3:
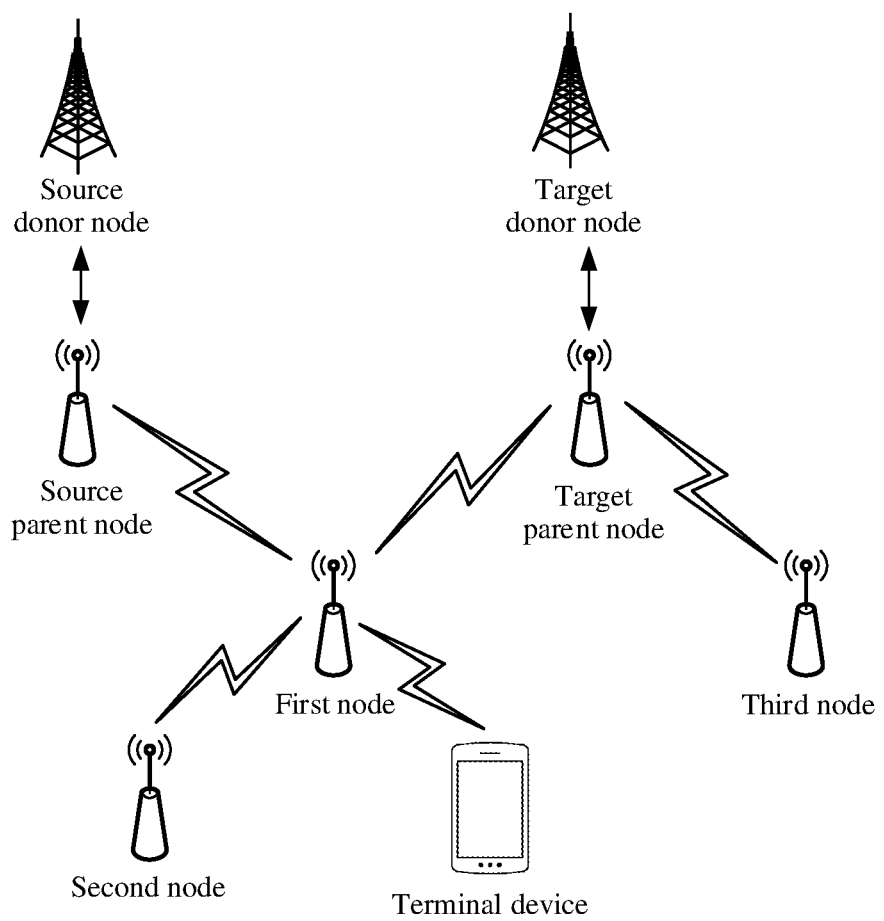
FIG. 3 is an example schematic diagram of an architecture of a communication system according to an embodiment of this application.

For ease of understanding embodiments of this application, a communication system shown in FIG. 3 is first used as an example to describe in detail a communication system applicable to embodiments of this application. For example, FIG. 3 is a schematic diagram of an architecture of a communication system to which a communication method according to an embodiment of this application is applicable.

As shown in FIG. 3, the communication system includes a source donor node, a target donor node, a source parent node, a target parent node, and a first node. Optionally, the system may further include at least one second node and at least one terminal device, and may further include a descendent node of at least one third node and a descendent terminal device of the at least one third node. This is not limited in this application.

The communication system shown in FIG. 3 may include a cross-donor handover scenario and a cross-donor dual-connectivity scenario. In the cross-donor handover scenario, before a handover, the first node is connected to the source donor node by using the source parent node, and after the handover, the first node is connected to the target donor node by using the target parent node. In the cross-donor dual-connectivity scenario, the first node first establishes a connection to the source parent node, where the source parent node is connected to the source donor node; and then establishes a connection to the target parent node by adding a secondary node, and the target parent node is connected to the target donor node.

It should be noted that the communication method provided in embodiments of this application is applicable to any two nodes shown in FIG. 3. For a specific implementation, refer to the following method embodiments.

It should be understood that FIG. 3 is merely a simplified schematic diagram of an example for ease of understanding. The communication system may further include another IAB node and/or another terminal device that are/is not shown in FIG. 3.

Figure 4:
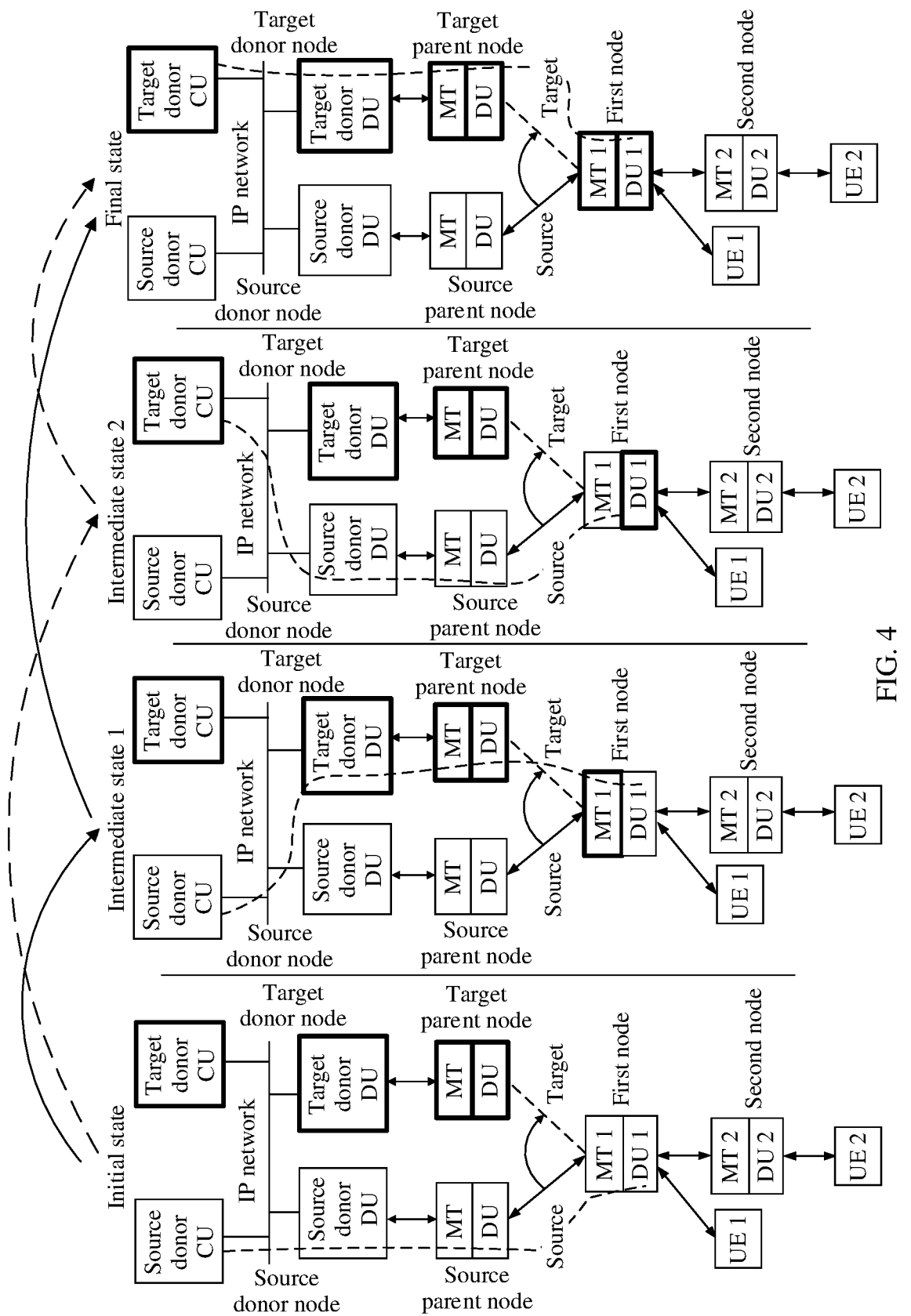
FIG. 4 is an example schematic diagram of a cross-donor handover scenario according to an embodiment of this application.
Figure 5:
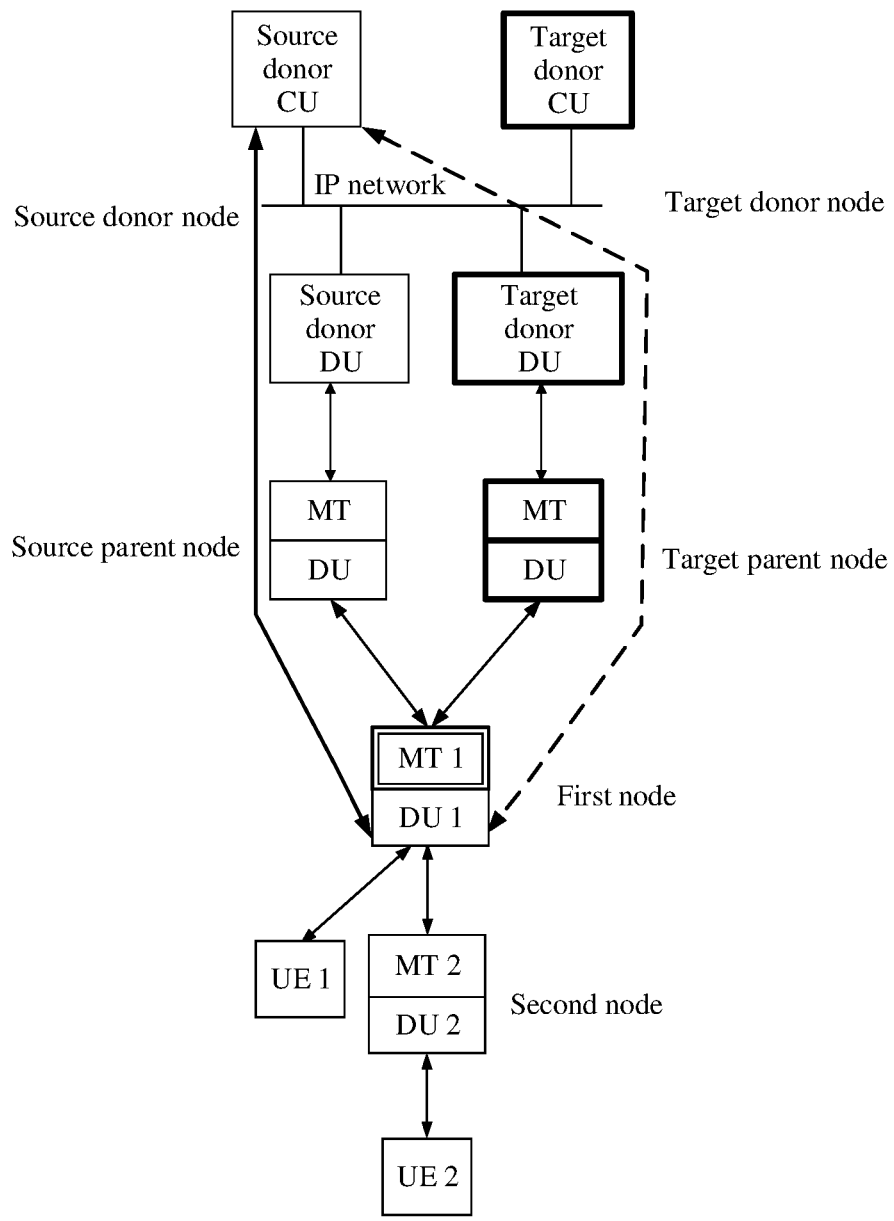
FIG. 5 is an example schematic diagram of a cross-donor dual-connectivity scenario according to an embodiment of this application.

The following separately describes in detail problems in the conventional technology with reference to scenarios shown in FIG. 4 and FIG. 5.

FIG. 4 is a schematic diagram of a cross-donor handover scenario according to an embodiment of this application.

With reference to FIG. 4, a handed-over node is a first node, and the first node may provide access and backhaul services for one or more UEs/child nodes, for example, UE 1 that accesses a cell served by the first node, and a second node that are shown in FIG. 4. Similarly, the second node may provide access and backhaul services for one or more UEs/child nodes, for example, UE 2 that accesses a cell served by the second node shown in FIG. 4. In an actual network deployment scenario, the first node may have one or more grandchild nodes (IAB nodes connected to the first node via at least two hops of wireless backhaul links). The second node may provide services for more UEs, child nodes, or grandchild nodes. This is not limited in this application.

For ease of description, in this application, these IAB nodes or UEs that are connected to a donor node through the first node are collectively referred to as descendent IAB nodes (descendent IAB nodes) or descendent UEs of the first node, and the descendent IAB nodes and the descendent UEs are collectively referred to as descendent nodes.

After the first node is connected to a target parent node from a source parent node after performing a handover, the descendent second node of the first node, the UE 1, and the UE 2 may also follow the first node to perform the handover.

With reference to FIG. 4, in a process in which the first node performs a cross-donor node handover, the first node and a descendent node of the first node may hand over a connection to a target donor node in a plurality of execution sequences, for example, hand over to the target donor node in a top-bottom order, or hand over to the target donor node in a bottom-top order, or hand over to the target donor node in any order. Therefore, in a process of migrating the first node and the descendent node, an MT part and a DU part of one IAB node may be respectively connected to two different IAB donor nodes.

FIG. 4 shows two execution sequences. In a first handover sequence, in an initial state, neither the first node nor the descendent node performs a handover, and both the first node and the descendent node are connected to a CU of a source donor node through the source parent node. In an intermediate state 1, an MT 1 part of the first node is handed over from being connected to the source parent node to being connected to the target parent node, and is connected to a CU of the target donor node through the target parent node. A DU 1 part of the first node and the descendent node of the first node do not perform the handover. In a final state, the DU 1 part of the first node and the descendent node of the first node are handed over from being connected to the source parent node to being connected to the target parent node, and are connected to the CU of the target donor node through the target parent node. In a second handover sequence, in an initial state, neither the first node nor the descendent node performs a handover. In an intermediate state 2, a DU 1 part of the first node and the descendent node of the first node are handed over from being connected to the source parent node to being connected to the target parent node, and are connected to a CU of the target donor node through the target parent node. An MT 1 part of the first node does not perform the handover. In a final state, the MT 1 part of the first node is handed over from being connected to the source parent node to being connected to the target parent node.

With reference to FIG. 4, in the intermediate state 1, the MT 1 part of the first node is connected to the CU of the target donor node, but the DU 1 part and the descendent node of the first node are connected to the CU of the source donor node, and the MT 1 part and the DU 1 part of the first node are connected to different donor nodes. In the intermediate state 2, the MT 1 part of the first node is connected to the CU of the source donor node, but the DU 1 part and the descendent node of the first node are connected to the CU of the target donor node, and the MT 1 part and the DU 1 part of the first node are connected to different donor nodes.

The intermediate state 1 is used as an example. If resource configuration of a cell served by the target parent node to which the MT 1 part of the first node is connected is the same as or completely conflicts with resource configuration of a cell served by the DU 1 part of the first node, for example, if the resource configuration of the cell served by the target parent node includes sending a message to the MT 1 part of the first node in a downlink slot 1, and the resource configuration of the cell served by the DU 1 part of the first node includes sending a message to the UE 1 in the downlink slot 1, a conflict occurs in the downlink slot 1. As a result, resources that can be scheduled (for example, slots that can be scheduled) in the MT 1 part of the first node in the cell served by the target parent node are very few, and even almost no scheduling resource is available in an extreme case. Consequently, the MT 1 part of the first node cannot normally communicate with the target donor node. In addition, because a service of the descendent node also needs to be transmitted via a wireless backhaul link between the MT 1 part of the first node and the target parent node, service transmission of the descendent node is also affected. The MT 1 part of the first node and the DU 1 part of the first node in the intermediate state 2 have a problem similar to that in the intermediate state 1.

FIG. 5 is a schematic diagram of a cross-donor dual-connectivity scenario according to an embodiment of this application. It should be noted that in a cross-donor dual-connectivity scenario, a source donor node shown in FIG. 5 may be referred to as a master donor node, a target donor node may be referred to as a secondary donor node, a source parent node may be referred to as a master parent node, and a target parent node may be referred to as a secondary parent node.

With reference to FIG. 5, a first node first establishes a connection to the source parent node, and then establishes a connection to the target parent node by adding a secondary node. The source parent node is connected to a CU of the source donor node, and the target parent node is connected to a CU of the target donor node. After dual connectivity is established, an MT 1 part of the first node is connected to both a cell served by the source parent node (which is specifically a DU part of the source parent node) and a cell served by the target parent node (which is specifically a DU part of the target parent node), and is connected to the CU part of the source donor node and the CU part of the target donor node. However, a DU 1 part of the first node is connected to only the CU part of the source donor node. If resource configuration of the cell served by the target parent node is the same as or almost consistent with resource configuration of a cell served by the DU 1 part of the first node, for example, if the resource configuration of the cell served by the target parent node includes sending a message to the MT 1 part of the first node in a downlink slot 1, and the resource configuration of the cell served by the DU 1 part of the first node includes sending a message to UE 1 in the downlink slot 1, a conflict occurs in the downlink slot 1. As a result, resources that can be scheduled (for example, slots that can be scheduled) in the MT 1 part of the first node in the cell served by the target parent node are very few, and almost no scheduling resource is available in an extreme case. Consequently, even if the secondary node is added to the first node, the secondary node almost cannot be used due to limited scheduling resources, or a transmission capability that can be provided by the secondary node is limited, and advantages of dual connectivity in capacity improvement and robustness improvement cannot be fully utilized.

Figure 8:
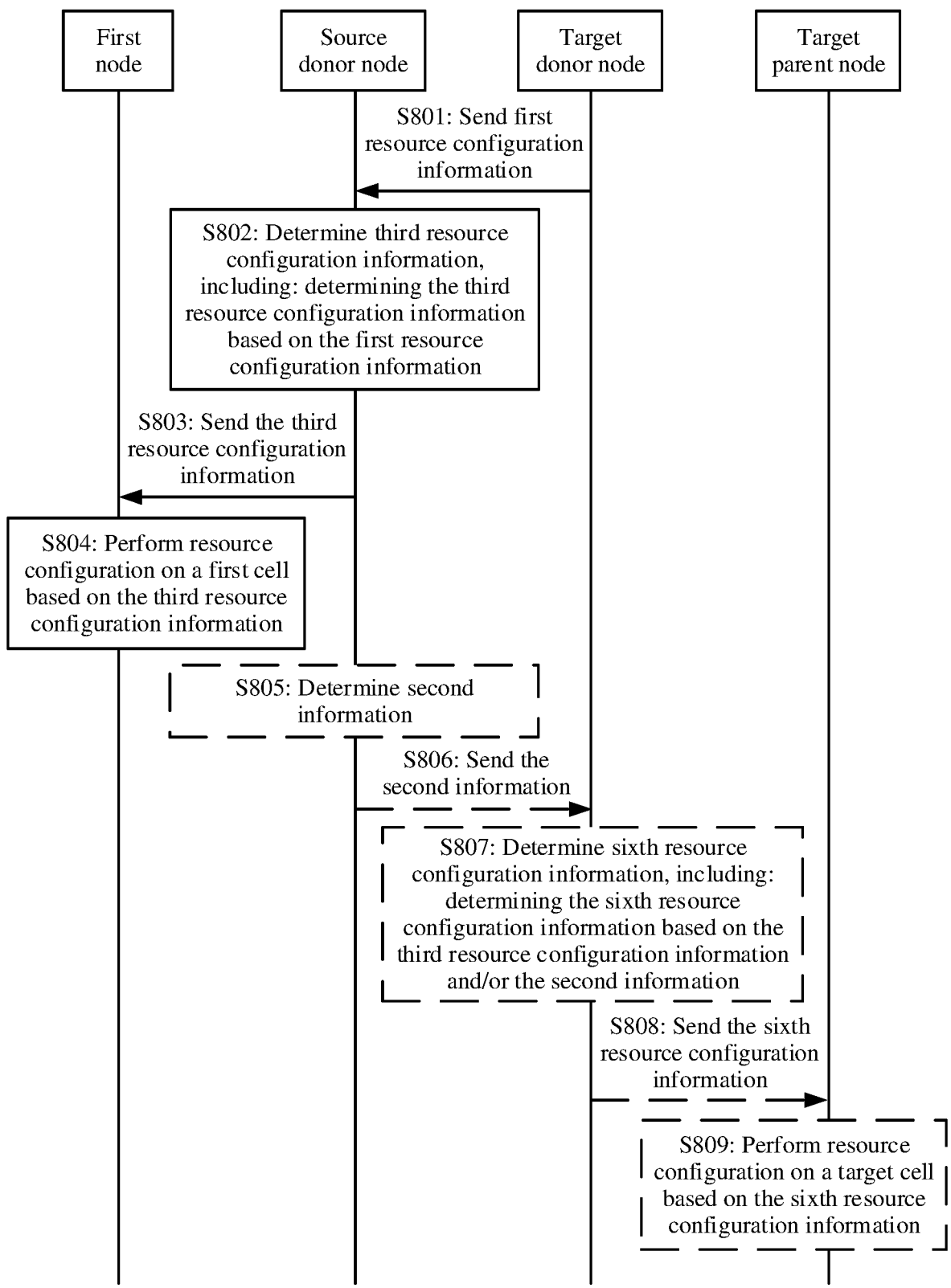
FIG. 8 is an example schematic flowchart of a communication method according to an embodiment of this application.

Therefore, a solution is designed in this embodiment of this application. For ease of description, an IAB node whose MT part and DU part are connected to different donor CUs in the scenario in FIG. 8 is referred to as a border IAB node. This solution aims to coordinate between CUs, to adjust resource configuration of a border IAB node DU, so that the resource configuration of the border IAB node DU and resource configuration of a parent node can be staggered in some slots, and an MT part of the border IAB node can be scheduled by a DU of the parent node.

To make embodiments of this application clearer, the following collectively describes some content and concepts related to embodiments of this application.

1. Link, Previous-Hop Node of a Node, and Next-Hop Node of a Node

A link is a path between two adjacent nodes on a path.

A previous-hop node of a node refers to a node that is on a path that includes the node and that receives a data packet last before the node in uplink transmission or downlink transmission. The previous-hop node of the node may also be referred to as a previous-hop node of the data packet.

A next-hop node of a node refers to a node that is on a path that includes the node and that first receives a data packet after the node in uplink transmission or downlink transmission. The next-hop node of the node may also be referred to as a next-hop node of the data packet.

2. Border IAB Node, Target Parent Node, and Cell Served by an IAB Node

A border IAB node in embodiments of this application is an IAB node whose MT part and DU part are connected to CUs of different donor nodes.

For example, refer to FIG. 4. In the intermediate state 1, the MT part of the first node is connected to the CU of the target donor node, and the DU part of the first node is connected to the CU of the source donor node. In the intermediate state 2, the MT part of the first node is connected to the CU of the source donor node, and the DU part of the first node is connected to the CU of the target donor node. The first node may be referred to as a border node.

For another example, refer to FIG. 5. The MT part of the first node is connected to the CU of the target donor node and the CU of the source donor node, and the DU part of the first node is connected to the CU of the source donor node. The first node may be referred to as a border node.

A cell served by an IAB node may include a cell served by a DU part of the IAB node or a cell deployed by the DU part of the IAB node.

3. Composition of an IAB Node, and Composition of a Donor Node

An IAB node includes a mobile terminal (MT) and a distributed unit (DU). The IAB node may serve as an MT when facing a parent node of the IAB node. The IAB node may serve as a DU when facing a child node of the IAB node (the child node may be an MT part of a terminal device or another IAB node), and may be considered as a network device. The IAB node may establish a wireless backhaul link with at least one parent node of the IAB node by using an MT part, and may establish a wireless access link with at least one child node of the IAB node by using a DU part.

Figure 6:
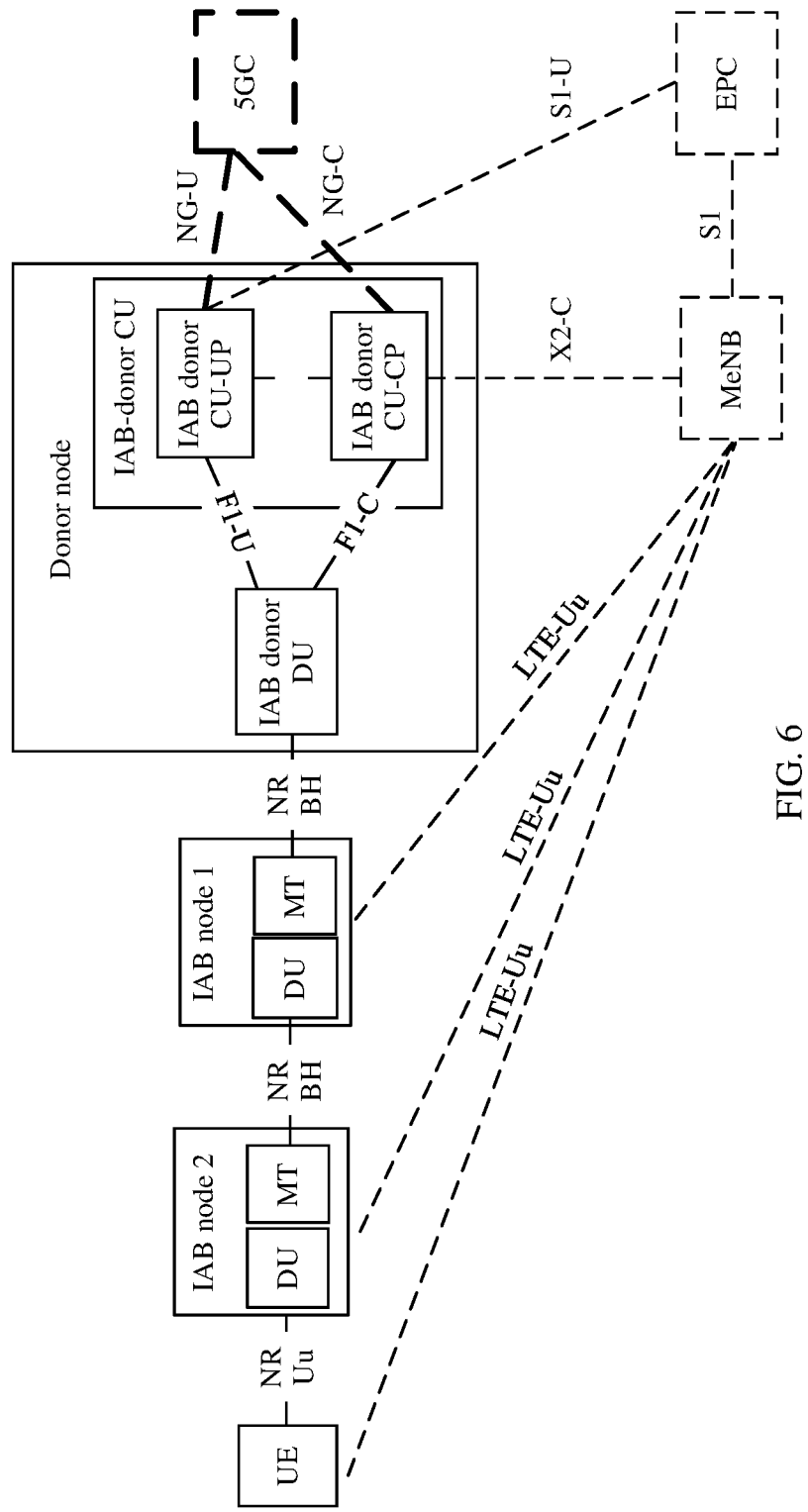
FIG. 6 is an example schematic diagram of a structure of an IAB node according to an embodiment of this application.

For example, refer to FIG. 6. A terminal UE is connected to a donor node through an IAB node 2 and an IAB node 1. The IAB node 1 and the IAB node 2 each include a DU part and an MT part. The DU part of the IAB node 2 provides an access service for the terminal UE. The DU part of the IAB node 1 provides an access service for the MT part of the IAB node 2. A Donor-DU provides an access service for the MT part of the IAB node 1.

When the IAB node 2 and the IAB node 1 work in an SA networking mode, the donor node may be connected to a core network (5GC) of a 5G network. A control plane CU-CP of the donor node is connected to a control plane network element (for example, an access and mobility management function (AMF)) in the 5GC through an NG control plane NG-C interface, and a user plane CU-UP of the donor node is connected to a user plane network element (for example, a user plane function (UPF) network element) in the 5GC through an NG user plane (NG-U) interface.

When the IAB node 2 and the IAB node 1 work in an NSA networking mode (or an EN-DC mode), the user plane CU-UP of the donor node may be connected to an EPC through an S1 user plane S1-U interface (for example, connected to a serving gateway (SGW)). There is an LTE Uu air interface connection between an MeNB and the MT part of the IAB node 2, and the MT part of the IAB node 1 and the UE, and there is an X2-C interface between the MeNB and the control plane CU-CP of the donor node. The MeNB is connected to the EPC through an S1 interface (the S1 interface includes an S1 interface user plane and an S1 interface control plane).

Optionally, the MeNB shown in FIG. 6 may be replaced with a 5G eNodeB gNB (namely, a gNodeB), and the LTE-Uu interface shown in FIG. 6 is correspondingly replaced with an NR-Uu interface. A user plane interface and/or a control plane interface may be established between the gNB and the 5GC, and the gNB and the donor node provide a dual-connectivity service for the IAB node 1, the IAB node 2, and the UE. The gNB may serve as a master eNodeB or a secondary eNodeB of the IAB node 1, the IAB node 2, and the UE.

4. Architectures of Protocol Stacks of an IAB Node, a Donor-DU, a Donor-CU, and a Terminal For example, based on the example shown in FIG. 6, for an architecture of a user plane protocol stack of each node, refer to FIG. 7(a), and for an architecture of a control plane protocol stack of each node, refer to FIG. 7(b).

Meanings of protocol layers in FIG. 7(a) and FIG. 7(b) are: a packet data convergence protocol (PDCP) layer, a general packet radio service tunneling protocol user plane (GTP-U) layer, a user datagram protocol (UDP) layer, an internet protocol (IP) layer, an L2 (layer 2) layer, an L1 (layer 1) layer, a backhaul adaptation protocol (BAP) layer, a radio link control (RLC) layer, a media access control (MAC) layer, a physical (PHY) layer, a radio resource control (RRC) layer, an F1 application protocol (F1AP) layer, and a stream control transmission protocol (SCTP) layer. The L2 layer is a link layer. For example, the L2 layer may be a data link layer in an open systems interconnection (OSI) reference model. The L1 layer may be a physical layer. For example, the L1 layer may be a physical layer in the OSI reference model.

It should be noted that in FIG. 7(a) and FIG. 7(b), drawing is performed by using an example in which a donor node includes a Donor-DU and a Donor-CU. Therefore, protocol layers of the Donor-DU and the Donor-CU are shown in FIG. 7(a) and FIG. 7(b). If the donor node is an entity with a complete function, the donor node only needs to retain protocol stacks of external node interfaces of the Donor-DU and the Donor-CU, and does not need a protocol layer on an internal interface between the Donor-DU and the Donor-CU.

In addition, it should be noted that, regardless of an architecture of a control plane protocol stack or an architecture of a user plane protocol stack, when the Donor-DU is an agent node of an F1 interface between the Donor-CU and an IAB node, in an architecture of a protocol stack that is in the Donor-DU and that corresponds to the IAB node, above an IP layer, a UDP layer and a GTP-U layer that respectively correspond to a UDP layer and a GTP-U layer in an architecture of a protocol stack of a DU part of the access IAB node are further included.

5. Protocol Layer of an F1 Interface and Protocol Layer of a Wireless Backhaul Interface An F1 interface is a logical interface between an IAB node (for example, a DU part of the IAB node) and a donor node (or a Donor-CU or a Donor-DU). The F1 interface may also be referred to as an F1* interface, and supports a user plane (F1-U) and a control plane (F1-C). The protocol layer of the F1 interface is a communication protocol layer on the F1 interface.

For example, a user plane protocol layer of the F1 interface may include one or more of an IP layer, a UDP layer, and a GTP-U layer. Optionally, the user plane protocol layer of the F1 interface further includes a PDCP layer and/or an IP security (IPsec) layer. The IAB node and the donor node may perform interface management, IAB-DU management, UE context-related configuration, and the like by using the user plane protocol layer of the F1 interface.

For example, a control plane protocol layer of the F1 interface may include one or more of an IP layer, an F1AP layer, and an SCTP layer. Optionally, the control plane protocol layer of the F1 interface further includes one or more of a PDCP layer, an IPsec layer, and a datagram transport layer security (DTLS) layer. The IAB node and the donor node may perform functions such as user plane data transmission and downlink transmission status feedback by using the control plane protocol layer of the F1 interface.

A wireless backhaul interface is a logical interface between IAB nodes or between an IAB node and a donor node (or a Donor-DU). A protocol layer of the wireless backhaul interface is a communication protocol layer on the wireless backhaul interface. The protocol layer of the wireless backhaul interface includes one or more of the following protocol layers: a BAP layer, an RLC layer, a MAC layer, and a PHY layer.

For example, a user plane protocol layer of the IAB node on the F1 interface includes a GTP-U layer, a UDP layer, and an IP layer. Refer to FIG. 7(a). In one case, the GTP-U layer and the UDP layer of the IAB node are peer layers of a GTP-U layer and a UDP layer of the Donor-CU, and the IP layer of the IAB node is a peer layer of an IP layer of the Donor-DU. In another case, the Donor-DU is a proxy node of the F1 interface between the Donor-CU and the IAB node, and the GTP-U layer, the UDP layer, and the IP layer of the IAB node are peer layers of a GTP-U layer, a UDP layer, and an IP layer of the Donor-DU. It should be noted that, if security protection is considered for the F1 interface, the user plane protocol layer of the F1 interface may further include an IPsec layer and/or a PDCP layer. In a possible implementation, the IPsec layer or the PDCP layer is located above the IP layer and below the GTP-U layer.

For example, a control plane protocol layer of the IAB node on the F1 interface includes an F1AP layer, an SCTP layer, and an IP layer. Refer to FIG. 7(b). In one case, the F1AP layer and the SCTP layer of the IAB node are peer layers of an F1AP layer and an SCTP layer of the Donor-CU, and the IP layer of the IAB node is a peer layer of an IP layer of the Donor-DU. In another case, the Donor-DU is a proxy node of the F1 interface between the Donor-CU and the IAB node, and the F1AP layer, the SCTP layer, and the IP layer of the IAB node are peer layers of an F1AP layer, an SCTP layer, and an IP layer of the Donor-DU. It should be noted that, if security protection is considered for the F1 interface, the control plane protocol layer of the F1 interface may further include one or more of an IPsec layer, a PDCP layer, and a DTLS layer. In a possible implementation, the IPsec layer, the PDCP layer, or the DTLS layer is located above the IP layer and below the F1AP layer.

It may be understood that when the protocol layer for the security protection is introduced into the protocol layers of the F1 interface, architectures of protocol stacks of some nodes in FIG. 7(a) and FIG. 7(b) are changed. For details, refer to the text for understanding. An architecture of a protocol stack of each node in an IAB network shown in FIG. 7(a) and FIG. 7(b) in this embodiment of this application is merely an example. The method provided in embodiments of this application does not depend on this example, but makes, by using this example, the method provided in embodiments of this application easier to understand.

6. RLC Channel

An RLC channel is a channel between an RLC layer and an upper-layer protocol layer (for example, a BAP layer). In this specification, an RLC channel of an IAB node on a wireless backhaul link may be a channel between an RLC layer and a PDCP layer, or may be a channel between an RLC layer and a BAP layer, depending on the upper-layer protocol layer of the RLC layer.

7. Protocol Data Unit (PDU)

In a communication network, a data unit exchanged between peer protocol layer entities of different nodes is a PDU. A protocol layer transfers a PDU of the protocol layer to an adjacent lower-layer protocol layer by using a service access point (SAP) (which may also be referred to as a service interface) provided by the lower-layer protocol layer to the protocol layer, and the lower-layer protocol layer indirectly exchanges the PDU of the protocol layer. The PDU of the protocol layer is used as an SDU of the lower-layer protocol layer.

For example, for a protocol layer, if a data packet received by the protocol layer does not include a protocol layer header of the protocol layer, the data packet may be considered as an SDU of the protocol layer; or if a data packet received by the protocol layer includes a protocol layer header of the protocol layer, the data packet may be considered as a PDU of the protocol layer. For example, for a BAP layer, if a data packet received by the BAP layer does not include a BAP layer header, the data packet may be considered as an SDU of the BAP layer; or if a data packet received by the BAP layer includes a BAP layer header, the data packet may be considered as a PDU of the BAP layer.

The PDU of the BAP layer may be classified into a control PDU of the BAP layer and a data PDU of the BAP layer. In the data PDU of the BAP layer, a BAP layer payload includes user plane data and/or control plane signaling. In the control PDU of the BAP layer, a BAP layer payload includes BAP layer feedback information, for example, stream control feedback information, header compression feedback information, or other feedback information or control information generated by the BAP layer. The control PDU that is of the BAP layer and that includes the header compression feedback information may be referred to as a header compression status report. The control PDU that is of the BAP layer and that includes the stream control feedback information may be referred to as a stream control status report.

8. BAP Layer

The BAP layer has at least one of the following capabilities: adding, to a data packet, routing information that can be identified by a wireless backhaul node; performing routing selection based on the routing information that can be identified by the wireless backhaul node; adding, to the data packet, identification information that can be identified by the wireless backhaul node and that is related to a quality of service (QoS) requirement; performing QoS mapping on a plurality of links including the wireless backhaul node for the data packet; adding data packet type indication information to the data packet; and sending stream control feedback information to a node having a stream control capability. It should be noted that a name of a protocol layer having these capabilities is not necessarily a BAP layer. A person skilled in the art may understand that any protocol layer having these capabilities may be understood as the BAP layer in embodiments of this application.

The routing information that can be identified by the wireless backhaul node may be one or more of information such as an identifier of a terminal, an identifier of an IAB node accessed by the terminal, an identifier of a donor node, an identifier of a Donor-DU, an identifier of a Donor-CU, and an identifier of a transmission path.

The QoS mapping on the plurality of links may be: mapping performed on a wireless backhaul link from an RB of the terminal to an RLC bearer, an RLC channel, or a logical channel on the wireless backhaul link based on an identifier that is of the RB of the terminal and that is carried in the data packet; or mapping performed from an RB, an RLC bearer, an RLC channel, or a logical channel on an ingress link to an RB, an RLC bearer, an RLC channel, or a logical channel on an egress link based on a correspondence or correspondences between any two or more of the RBs, the RLC bearers, the RLC channels, and the logical channels on the ingress link and the egress link.

The data packet type indication information may indicate that content encapsulated into a BAP layer includes any one or more of the following types: user plane data of a terminal, an RRC message of the terminal, an RRC message of an IAB node, a control layer application message (for example, an F1AP message) on an interface between the IAB node and a donor node (or a Donor-CU or a CU-CP), a stream control feedback message generated by the IAB node, a header compression feedback message generated by the IAB node, a data PDU of the BAP layer, a control PDU of the BAP layer, and the like.

The identification information related to the QoS requirement may be a QoS flow identifier (QFI) of the terminal, an identifier of the RB of the terminal, a differentiated services code point (DSCP), a flow label in a header of an IP data packet of internet protocol version 6 (IPv6), and the like.

For example, the node having the stream control capability may be a node providing a backhaul service for an IAB node, and may be, for example, a donor node, a Donor-DU, a Donor-CU, or a parent node of the IAB node. Content of the stream control feedback information may include one or more types of the following information: a cache status and a load degree of an IAB node, a status (for example, a link blockage (blockage), link resumption (resume), or link quality information) of a link including the IAB node, a bandwidth and a transmission latency of the link including the IAB node, a sequence number of a data packet lost at the IAB node, a sequence number of a data packet successfully sent by the IAB node to a terminal or a child node of the terminal, and the like.

In addition, in a possible case, a function of the BAP layer may alternatively be extended from a function or functions of any one or more layers (for example, an RLC layer, a MAC layer, and a PDCP layer) included in the layer 2 without any additional protocol layer.

The following describes in detail the communication methods provided in embodiments of this application with reference to FIG. 8 to FIG. 14.

For example, FIG. 8 is a schematic flowchart of a communication method according to an embodiment of this application. The communication method is applicable to communication between any two nodes shown in FIG. 8.

As shown in FIG. 8, the communication method includes the following steps.

S801: A target donor node sends first resource configuration information to a source donor node. Correspondingly, the source donor node receives the first resource configuration information from the target donor node.

The first resource configuration information includes current resource configuration information of a target cell. The target cell is a cell served by a target parent node, and the target parent node is used by a first node to connect to the target donor node.

Optionally, resource configuration information of a cell may include but is not limited to one or more of the following: frequency information of the cell, bandwidth information of the cell, an uplink and downlink duplex mode of the cell, resource configuration of the cell, synchronization signal block (SSB) transmission configuration (STC) of the cell, common random access resource configuration (rach-ConfigCommon) of the cell, common IAB-specific random access resource configuration (rach-ConfigCommonIAB-r16) of the cell, channel state information-reference signal (CSI-RS) configuration of the cell, uplink scheduling request (SR) configuration (SchedulingRequestResourceConfig) of the cell, PDCCH transmission location configured in a SIB 1 (PDCCH-ConfigSIB1), common subcarrier spacing (subCarrierSpacingCommon, SCS common) configuration, and a multiplexing capability of the cell.

For example, the uplink and downlink duplex mode of the cell may include a time division duplex (TDD) mode and a frequency division duplex (FDD) mode.

For example, the multiplexing capability of the cell is for a cell served by an IAB node, and specifically refers to a multiplexing capability of an IAB-DU serving the cell and a co-deployed IAB-MT part. That is, whether transmission or reception of the IAB-DU is allowed to be performed simultaneously with transmission or reception of the co-deployed IAB-MT.

For example, the resource configuration of the cell may include attribute configuration of a downlink symbol, an uplink symbol, and a flexible symbol in each slot. If the uplink and downlink duplex mode of the cell is the TDD mode, the resource configuration of the cell may further include locations and a quantity of downlink symbols, locations and a quantity of uplink symbols, and locations and a quantity of flexible symbols in each slot.

The attribute configuration may include a hard mode, a soft mode, and a not available mode. Specifically, the hard mode indicates that a node serving the cell definitely performs transmission scheduling in the slot, the not available mode indicates that the node serving the cell definitely does not perform transmission scheduling in the slot, and the soft mode indicates that the node serving the cell may perform transmission scheduling in the slot, or may not perform transmission scheduling in the slot.

Locations of time domain resources and/or frequency domain resources that the cell definitely occupies to transmit these special signals or resources (for example, common random access resources or reference signals of the cell) may be determined based on each piece of the following configuration information: the common random access resource configuration (rach-ConfigCommon) of the cell, the common IAB-specific random access resource configuration (rach-ConfigCommonIAB-r16) of the cell, the channel state information-reference signal (channel state information-reference signal, CSI-RS) configuration of the cell, the uplink scheduling request (SR) configuration (SchedulingRequestResourceConfig) of the cell, and the PDCCH transmission location configured in the SIB 1 (PDCCH-ConfigSIB1). The time domain resources and/or frequency domain resources at these locations may also be considered as hard (hard) mode resources of the cell.

Figure 9:
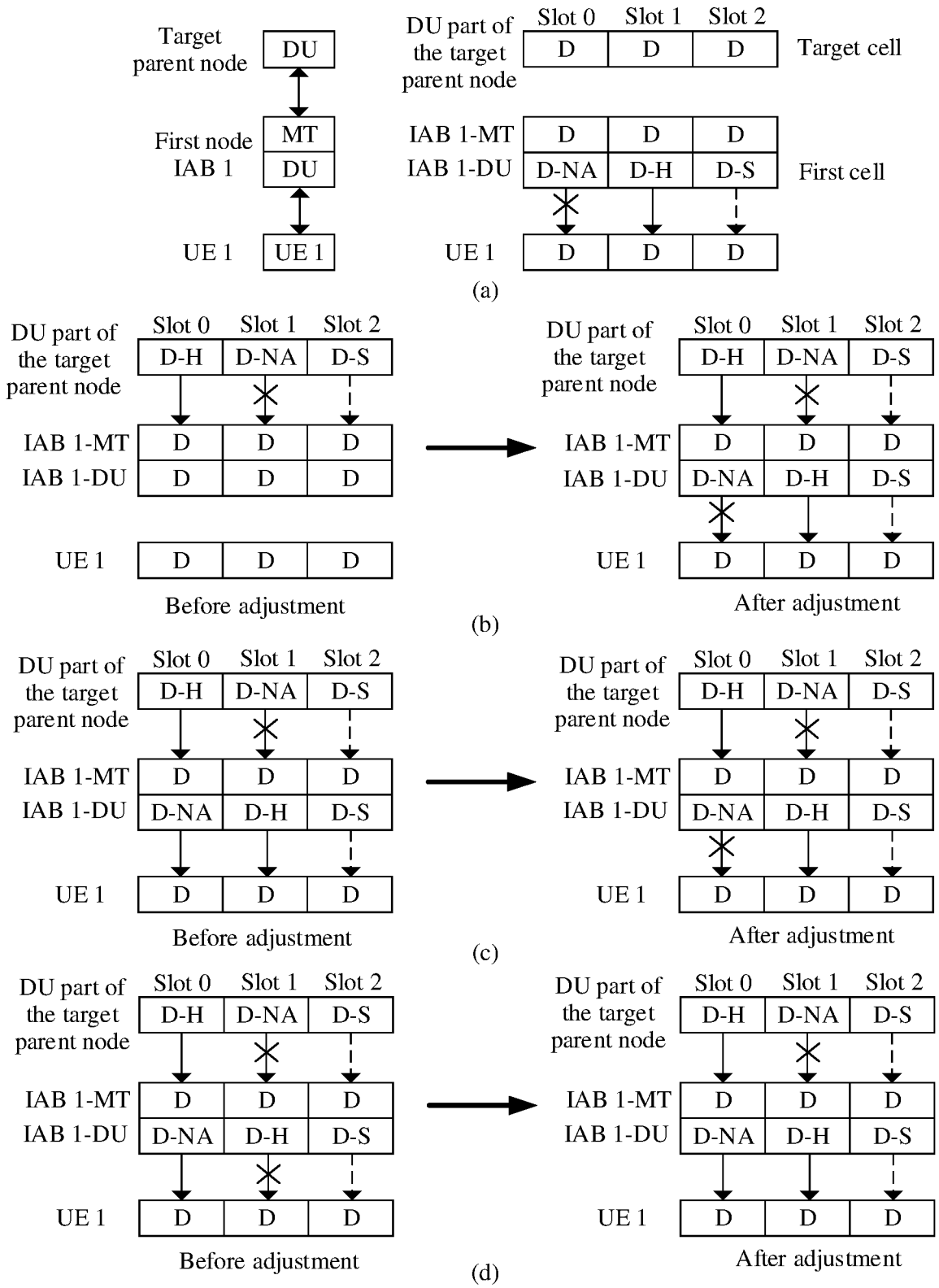
FIG. 9 is an example schematic diagram of application of a communication method according to an embodiment of this application.

With reference to FIG. 9, in downlink (downlink, D) transmission, the uplink and downlink duplex mode is the FDD mode is used as an example. With reference to (a) in FIG. 9, resource configuration of a first cell served by IAB 1 includes: a slot 1 is in a hard mode, a slot 0 is in a not available (NA) mode, and a slot 2 is in a soft mode. This means that the IAB 1 determines to perform downlink transmission scheduling on UE or a child node in the slot 1, definitely does not perform downlink transmission scheduling on the UE or the child node in the slot 0, and may perform downlink transmission scheduling on the UE or the child node in the slot 2.

For example, channel state information-reference signal (CSI-RS) configuration of a cell may include configuration of a non-zero power CSI-RS (NZP-CSI-RS) resource.

It should be noted that, corresponding resource configuration information may be set for different cells, and resource configuration information of different cells may be different. When the cell is a target cell, resource configuration information of the cell may include resource configuration information corresponding to the target cell. When the cell is the first cell, resource configuration information of the cell may include resource configuration information corresponding to the first cell. When the cell is a second cell, resource configuration information of the cell may include resource configuration information corresponding to the second cell. When the cell is a third cell, resource configuration information of the cell may include resource configuration information corresponding to the third cell.

In a possible implementation, the communication method provided in this embodiment of this application may further include: The source donor node sends a first request message to the target donor node. Correspondingly, the target donor node receives the first request message from the source donor node.

Optionally, the first request message may be used to request to hand over a donor node of the first node from the source donor node to the target donor node, or used to request to use the target donor node as a secondary node of the first node.

For example, the first request message may be a handover request message for the first node. In a cross-donor handover scenario, with reference to the initial state in FIG. 4, the source donor node requests the target donor node to hand over the donor node of the first node from the source donor node to the target donor node.

For another example, the first request message may be a secondary node addition request message for the first node. In a cross-donor dual-connectivity scenario, with reference to FIG. 5, the source donor node requests the target donor node to use the target donor node as a secondary node of the first node, to improve a data transmission rate.

In some embodiments, the first request message includes one or more of the following: first indication information, an identifier of the target cell, or second resource configuration information.

Optionally, the first indication information indicates that the first node is an IAB node. The first indication information indicates that the first request message is requested by the IAB node, and is not requested by a common terminal device UE.

Optionally, the identifier of the target cell may include a cell identifier of the target cell, and the first request message includes the identifier of the target cell, so that signaling overheads of determining, by the target donor node, the cell served by the target parent node can be reduced. A type of the identifier of the target cell in this application may include one or more of the following identifiers of the target cell: a physical cell identity (PCI), an NR cell identity (NCI), an NR cell global identity (NCGI), a 4G cell identifier (E-UTRA cell identifier, ECI), and a 4G cell global identifier (E-UTRAN cell global identifier, ECGI).

Optionally, the second resource configuration information may include current resource configuration information of a first cell, and the first cell is a cell served by the first node. In this way, the target donor node may obtain the current resource configuration information of the first cell served by the first node.

In a possible implementation, the communication method provided in this embodiment of this application may further include: The target donor node sends a first response message to the source donor node. Correspondingly, the source donor node receives the first response message from the target donor node.

Optionally, the first response message may be used to determine to hand over the donor node of the first node from the source donor node to the target donor node, or used to determine to use the target donor node as a secondary node of the first node.

For example, in a cross-donor handover scenario, the first response message may be a handover request acknowledge message.

For another example, in a cross-donor dual-connectivity scenario, the first response message may be a secondary node addition request acknowledge message.

Optionally, the first response message may include the first resource configuration information. That is, the target donor node may send the first resource configuration information to the source donor node by using the first response message.

S802: The source donor node determines third resource configuration information, including: determining the third resource configuration information based on the first resource configuration information.

For example, the third resource configuration information may be used for resource configuration of the first cell. The third resource configuration information may include resource reconfiguration information of the first cell, and the resource reconfiguration information of the first cell may be determined based on the current resource configuration information of the target cell.

Optionally, a hard mode referred to when resource configuration information of a cell is determined may be that attribute configuration of a slot in resource configuration of the cell is a hard mode or a resource that is in the cell and that is considered as a hard mode. In this embodiment of this application, the resource configuration information of the cell is determined by referring to an example in which the attribute configuration of the slot is the hard mode.

For example, with reference to FIG. 9, in downlink transmission, resource configuration information of a cell includes resource configuration of the cell. With reference to (b) in FIG. 9, resource configuration of a target cell served by a target parent node includes: a slot 0 is in a hard mode, a slot 1 is in a not available mode, and a slot 2 is in a soft mode. A slot in which a first node performs downlink scheduling may be staggered from a slot in which the target parent node schedules IAB 1, and the determined third resource configuration information includes: the slot 0 is in a not available mode, the slot 1 is in a hard mode, and the slot 2 is in a soft mode.

In this way, if the target parent node performs downlink transmission scheduling on the first node IAB 1 in the slot 0, because the first node definitely does not perform downlink transmission scheduling on UE in the slot 0, a conflict does not occur between the first node and the target parent node in the slot 0, and the target parent node and the IAB 1 may perform normal downlink communication in the slot 0. The target parent node definitely does not perform downlink transmission scheduling on the first node IAB 1 in the slot 1. If the first node performs downlink transmission scheduling on UE or a child node served by the first node in the slot 1, the first node may perform normal downlink communication with the UE or the child node served by the first node in the slot 1. The target parent node may perform downlink transmission scheduling on the first node IAB 1 in the slot 2, and the first node may perform downlink transmission scheduling on the UE in the slot 2.

Specifically, whether the first node performs transmission scheduling in the slot 2 may be determined based on an indication of the target parent node, so that no conflict occurs between the first node and the target parent node in the slot 2. For example, if the target parent node determines that the target parent node performs downlink transmission scheduling on the first node IAB 1 in the slot 2, the target parent node may use downlink control information (DCI) to indicate the first node (specifically, to indicate an MT part of the first node) not to perform, in the slot 2, downlink transmission scheduling on the UE or the child node served by the first node; or if the target parent node determines that the target parent node does not perform downlink transmission scheduling on the first node IAB 1 in the slot 2, the target parent node may use downlink control information (DCI) to indicate that the first node may perform, in the slot 2, downlink transmission scheduling on the UE or the child node served by the first node.

In some embodiments, the third resource configuration information determined by the source donor node based on the first resource configuration information may conflict with the current resource configuration information of the target cell, and a slot in which the conflict occurs may be resolved by the target donor node determining the resource reconfiguration information of the target cell. For details, refer to the following methods in S805 to S809.

In some embodiments, that the source donor node determines the third resource configuration information based on the first resource configuration information may include: The source donor node determines the third resource configuration information based on the first resource configuration information and second resource configuration information.

Optionally, the third resource configuration information may include the resource reconfiguration information of the first cell, and the resource reconfiguration information of the first cell may include resource configuration information of the first cell and/or resource adjustment information of the first cell. That is, the source donor node may determine the resource configuration information of the first cell based on the current resource configuration information of the target cell and the current resource configuration information of the first cell, or determine to adjust some resource configuration information.

For example, with reference to (c) in FIG. 9, in downlink transmission, resource configuration information of a cell includes resource configuration of the cell. Current resource configuration of a target cell served by a target parent node includes: a slot 0 is in a hard mode, a slot 1 is in a not available mode, and a slot 2 is in a soft mode. Current resource configuration of a first cell includes: a slot 0 is in a hard mode, a slot 1 is in a hard mode, and a slot 2 is in a soft mode. A slot in which a first node schedules UE or a child node served by the first node may be staggered from a slot in which the target parent node schedules IAB 1, and the determined third resource configuration information includes: the slot 0 is in a not available mode, the slot 1 is in a hard mode, and the slot 2 is in a soft mode. The third resource configuration information includes configuration information of the slot 0, the slot 1, and the slot 2, regardless of whether current configuration information of the three slots all needs to be adjusted. Alternatively, the determined third resource configuration information includes: the slot 0 is in a not available mode. In this way, the third resource configuration information includes only configuration information of the slot 0 that needs to be adjusted, and does not include configuration information of the slot 1 and the slot 2 that do not need to be adjusted. This can reduce signaling overheads when the first node reconfigures a resource.

For another example, with reference to (d) in FIG. 9, in downlink transmission, resource configuration information of a cell includes resource configuration of the cell. Current resource configuration of a target cell served by a target parent node includes: a slot 0 is in a hard mode, a slot 1 is in a not available mode, and a slot 2 is in a soft mode.

Current resource configuration of a first cell includes: a slot 0 is in a hard mode, a slot 1 is in a not available mode, and a slot 2 is in a soft mode. A slot in which a first node schedules UE or a child node served by the first node may not be staggered from a slot in which the target parent node performs downlink scheduling. For example, the determined third resource configuration information includes: the slot 0 is in a hard mode, the slot 1 is in a hard mode, and the slot 2 is in a soft mode. The slot 0 in which the first node schedules the UE or the child node served by the first node conflicts with the slot 0 in which the target parent node performs downlink scheduling.

That is, the source donor node may adjust, based on the first resource configuration information, only a part of resource configuration information that is of the first cell and in which a conflict occurs, and an unadjusted slot in which a conflict occurs may be resolved by using a scheduling policy of the target cell (for example, the target parent node learns that the slot 0 is in a hard mode for the first node IAB 1, and therefore may try to avoid performing downlink transmission scheduling on the IAB 1 in the slot 0), or may be resolved by the target donor node determining the resource reconfiguration information of the target cell. For details, refer to the following methods in S805 to S809.

In a possible implementation, the communication method provided in this embodiment of this application may further include: The source donor node determines fifth resource configuration information based on the third resource configuration information and/or the first resource configuration information.

Optionally, the fifth resource configuration information includes resource reconfiguration information of a second cell, the second cell is a cell served by a second node, and the second node is connected to the source donor node via the first node. That is, the second node may be considered as a descendent node of the first node (which may be specifically a child node, a grandchild node, or the like of the first node).

That is, if the descendent node of the first node exists in a network, such as the second node shown in FIG. 3 to FIG. 5, the source donor node may determine, based on the resource reconfiguration information of the first cell and/or the current resource configuration information of the target cell, resource reconfiguration information of the second cell.

Figure 10:
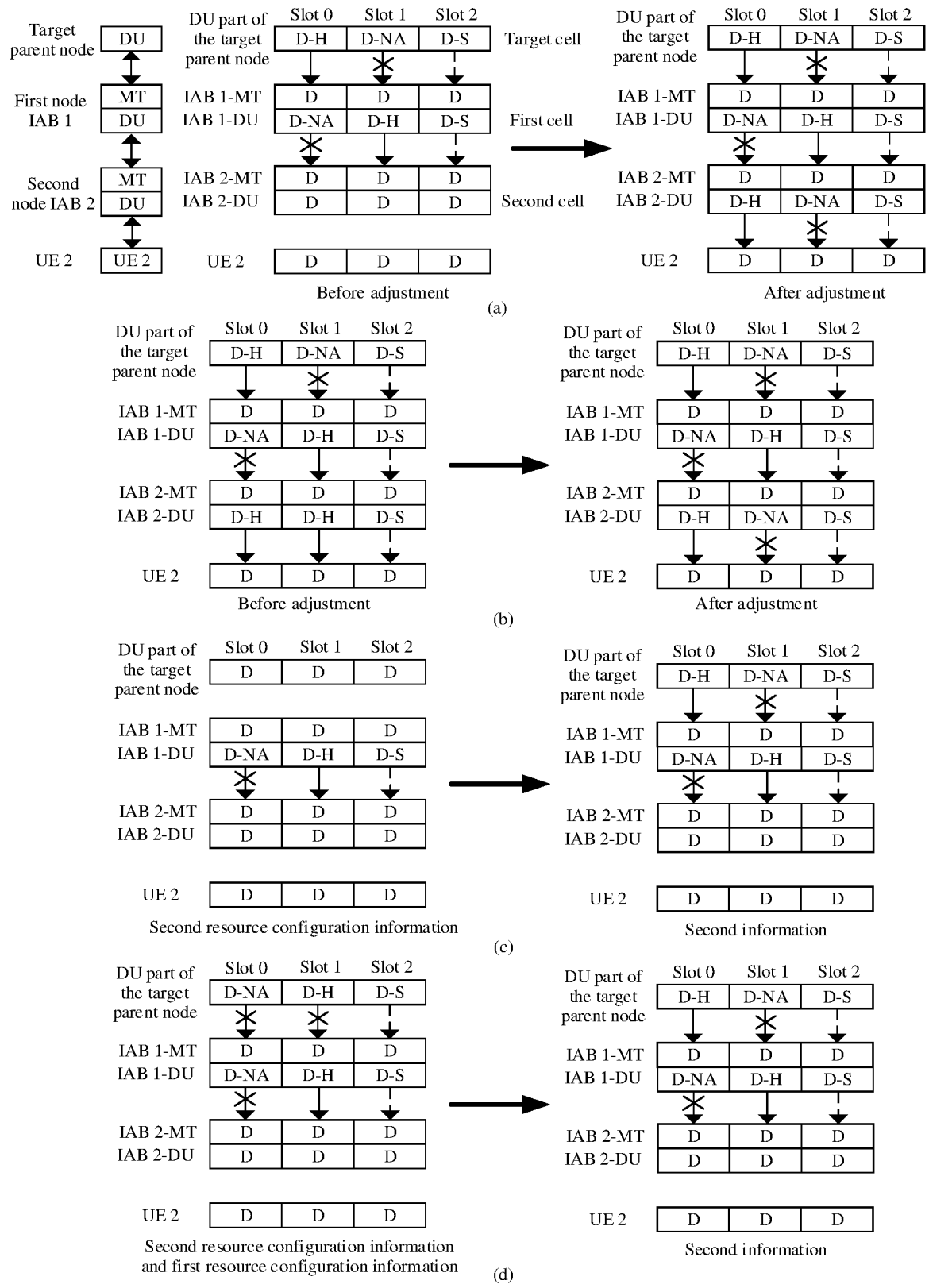
FIG. 10 is an example schematic diagram of application of another communication method according to an embodiment of this application.
Figure 10:
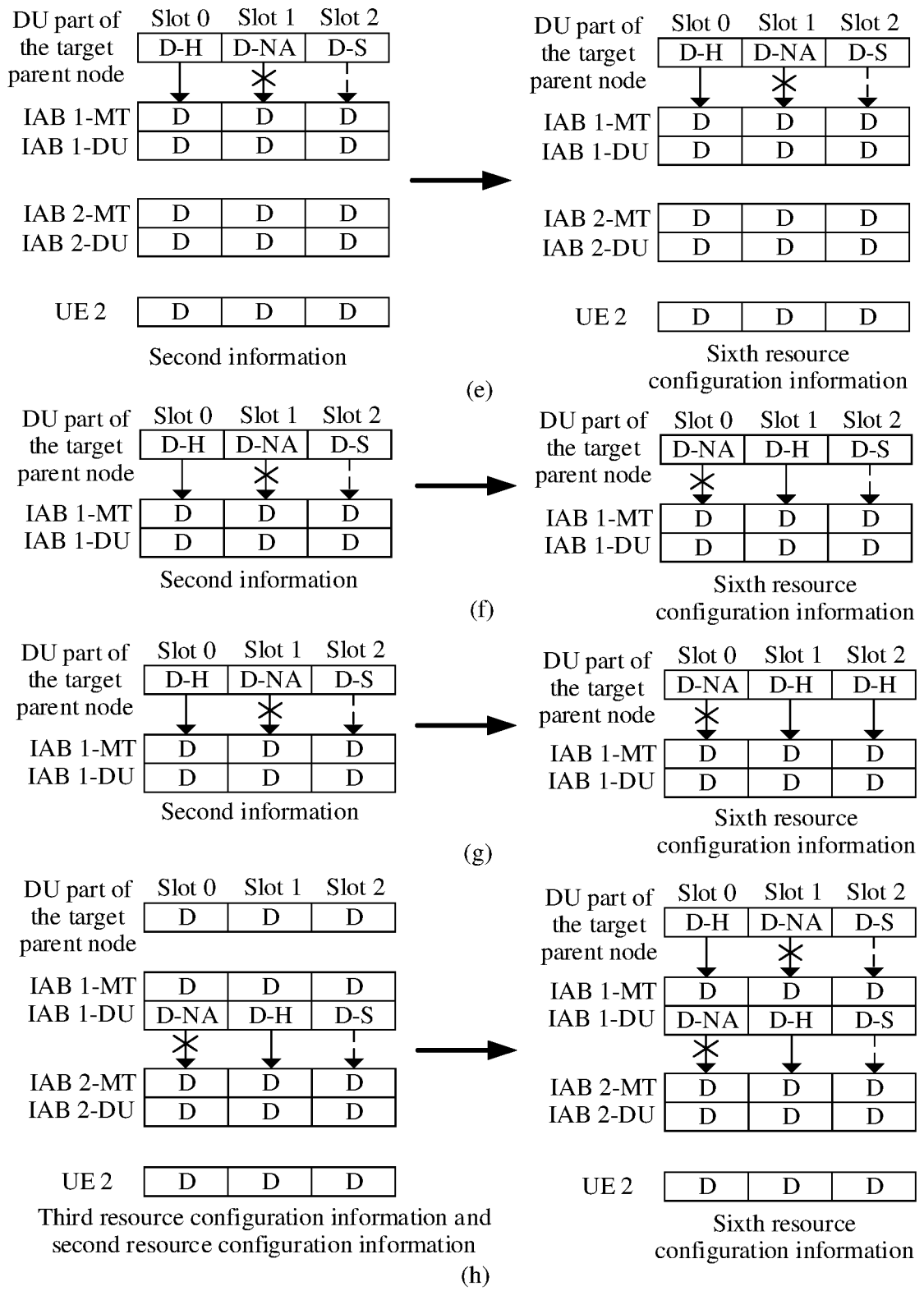

For example, with reference to FIG. 10, in downlink transmission, the uplink and downlink duplex mode is the FDD mode. With reference to (a) in FIG. 10, it is assumed that current resource configuration of a target cell served by a target parent node includes: a slot 0 is in a hard mode, a slot 1 is in a not available mode, and a slot 2 is in a soft mode. It is assumed that the third resource configuration information includes: a slot 0 is in a not available mode, a slot 1 is in a hard mode, and a slot 2 is in a soft mode. To meet a duplex constraint of an MT part and a DU part of the second node, it may be determined that resource configuration information of the second cell is consistent with the current resource configuration information of the target cell, or resource configuration information of the second cell may be staggered from the resource reconfiguration information of the first cell. The obtained fifth resource configuration information may include: a slot 0 is in a hard mode, a slot 1 is in a not available mode, and a slot 2 is in a soft mode. In this way, both the first node and the second node can normally perform downlink transmission scheduling on the UE or the child node served by the first node and the second node.

In a possible implementation, the communication method provided in this embodiment of this application may further include: The source donor node determines the fifth resource configuration information based on the third resource configuration information and/or the first resource configuration information and fourth resource configuration information.

Optionally, the fourth resource configuration information may include current resource configuration information of the second cell.

Optionally, the fifth resource configuration information may include the resource reconfiguration information of the second cell, and the resource reconfiguration information of the second cell may include resource configuration information of the second cell and/or resource adjustment information of the second cell.

That is, the source donor node may determine the resource configuration information of the second cell based on the resource reconfiguration information of the first cell, the current resource configuration information of the target cell, and/or current resource configuration information of the second node, or determine to adjust some resource configuration information of the second cell.

For example, with reference to FIG. 10, in downlink transmission, resource configuration information of a cell includes resource configuration of the cell. With reference to (b) in FIG. 10, it is assumed that current resource configuration of a target cell served by a target parent node includes: a slot 0 is in a hard mode, a slot 1 is in a not available mode, and a slot 2 is in a soft mode. It is assumed that resource reconfiguration information of a first cell includes: a slot 0 is in a not available mode, a slot 1 is in a hard mode, and a slot 2 is in a soft mode. It is assumed that current resource configuration information of a second cell includes: a slot 0 is in a hard mode, a slot 1 is in a hard mode, and a slot 2 is in a soft mode. The determined fifth resource configuration information includes: a slot 0 is in a hard mode, a slot 1 is in a not available mode, and a slot 2 is in a soft mode. The fifth resource configuration information includes configuration information of the slot 0, the slot 1, and the slot 2, regardless of whether current configuration information of the three slots all needs to be adjusted. Alternatively, the determined fifth resource configuration information includes: the slot 1 is in a not available mode. In this way, the fifth resource configuration information includes only configuration information of the slot 1 that needs to be adjusted, and does not include configuration information of the slot 0 and the slot 2 that do not need to be adjusted. This can reduce signaling overheads when the second node reconfigures a resource.

Optionally, similar to determining the third resource configuration information by the source donor node, the source donor node may adjust only a part of resource configuration information that is of the second cell and in which a conflict occurs, and an unadjusted slot in which a conflict occurs may be resolved by using a scheduling policy of the first node on the first cell (for example, the first node learns that the slot 1 is in a hard mode for the second node, and therefore may try to avoid performing downlink transmission scheduling on the second node in the slot 1), or may be resolved by the source donor node determining the resource reconfiguration information of the first cell.

S803: The source donor node sends the third resource configuration information to the first node. Correspondingly, the first node receives the third resource configuration information from the source donor node.

Optionally, the source donor node may send an F1 application protocol (F1 application protocol, FTAP) message or an RRC message to the first node. Correspondingly, the first node may receive the F1AP message or the RRC message from the source donor node.

For example, the F1AP message or the RRC message may include the third resource configuration information, and may further include an identifier of the first cell. Optionally, the F1AP message or the RRC message may include indication information indicating that the third resource configuration information is not immediately used.

In a possible implementation, the communication method provided in this embodiment of this application may further include: The source donor node sends the fifth resource configuration information to the second node. Correspondingly, the second node receives the fifth resource configuration information from the source donor node.

Optionally, the source donor node may send the RRC message or the F1AP message to the second node. Correspondingly, the second node may receive the RRC message or the F1AP message from the source donor node.

For example, the RRC message may include the fifth resource configuration information. The F1AP message may include an F1AP message. Optionally, the F1AP message may include indication information indicating that the fifth resource configuration information is not immediately used.

It should be noted that a sequence of sending, by the source donor node, the third resource configuration information to the first node and sending, by the source donor node, the fifth resource configuration information to the second node is not limited in this embodiment of this application.

In a possible implementation, the communication method provided in this embodiment of this application may further include: The source donor node sends the third resource configuration information to the target donor node. Correspondingly, the target donor node receives the third resource configuration information from the source donor node.

In this way, the target donor node may send the third resource configuration information to the target parent node, so that the target parent node obtains a slot that is set to be in a hard mode and that is in the third resource configuration information. The target parent node may avoid performing uplink/downlink transmission scheduling on the first node in the slot that is in the hard mode and that is in the third resource configuration information. In addition, the target parent node may further learn of a slot that is in a soft mode and that is in the third resource configuration information. Therefore, the target parent node may indicate, by using DCI control, whether the first node can perform, in the slot set to be in the soft mode, downlink transmission scheduling on the UE or the child node served by the first node.

S804: The first node performs resource configuration on the first cell based on the third resource configuration information.

Optionally, the second node performs resource configuration on the second cell based on the fifth resource configuration information.

In a possible implementation, before S804, the communication method provided in this embodiment of this application may further include: The first node determines that the third resource configuration information is effective.

In this way, after receiving the third resource configuration information, the first node does not immediately use the third resource configuration information. After determining that the third resource configuration information is effective, the first node performs resource configuration on the first cell based on the third resource configuration information.

With reference to FIG. 4, the first handover sequence is used as an example. In the initial state, the donor node of the first node is not handed over to the target donor node. Therefore, the first node in the initial state may not use the third resource configuration information. When the donor node of the MT part of the first node is handed over to the target donor node, in the intermediate state 1 shown in FIG. 4, the MT part of the first node is connected to the target parent node, and the first node may start to use the third resource configuration information.

In some embodiments, the source donor node may send first effectiveness indication information to the first node. Optionally, an RRC message (for example, an RRC reconfiguration message) that carries a handover command and that is sent by the source donor node to the MT part of the first node may carry the first effectiveness indication information. Alternatively, the handover command sent by the source donor node to the MT part of the first node is directly considered as implicit first effectiveness indication information. The handover command may be configuration information used to indicate the MT part of the first node to hand over to the target cell served by the target parent node, and may be specifically a reconfigurationwithSync (ReconfigurationwithSync) information element (IE).

In some embodiments, the target donor node may send the first effectiveness indication information to the first node. Optionally, the first effectiveness indication information may indicate that the third resource configuration information is effective. After determining that the MT part of the first node is connected to the target parent node, the target donor node may send, to the first node, information indicating that the third resource configuration information is effective.

In some embodiments, the target parent node may send the first effectiveness indication information to the first node. After determining that the MT part of the first node is connected to the target parent node, the target parent node may send, to the first node, the information indicating that the third resource configuration information is effective.

In some embodiments, that the first node determines that the third resource configuration information is effective may include: The first node receives the first effectiveness indication information from the target donor node or the target parent node, or the first node establishes a connection to the target parent node, or the first node receives the first effectiveness indication information from the source donor node.

Optionally, the first effectiveness indication information may indicate that the third resource configuration information is effective. That is, after receiving explicit or implicit effectiveness indication information, the first node may perform resource configuration on the first cell based on the third resource configuration information, or may perform resource configuration on the first cell based on the third resource configuration information when the MT part of the first node establishes a connection to the target parent node (for example, random access is performed in the target cell served by the target parent node, or random access succeeds, or an RRC reconfiguration complete message is sent to a target IAB donor by using the target parent node).

In a possible implementation, the communication method provided in this embodiment of this application may further include: The first node sends second effectiveness indication information to the second node. Correspondingly, the second node receives the second effectiveness indication information from the first node.

Optionally, the second effectiveness indication information may indicate that the fifth resource configuration information is effective. In this way, after receiving the fifth resource configuration information, the second node does not immediately use the fifth resource configuration information. After determining that the fifth resource configuration information is effective, the second node performs resource configuration on the second cell based on the fifth resource configuration information.

In a possible implementation, before the second node performs resource configuration on the second cell based on the fifth resource configuration information, the communication method provided in this embodiment of this application may further include: The second node determines that the fifth resource configuration information is effective. Specifically, the second node receives the second effectiveness indication information from the first node.

In this way, after receiving explicit effectiveness indication information, the second node may perform resource configuration on the second cell based on the fifth resource configuration information.

According to the communication method shown in S801 to S804 in FIG. 8, the source donor node receives, from the target donor node, the current resource configuration information of the target cell served by a target node, and determines, based on the current resource configuration information of the target cell, resource reconfiguration information of the first cell served by the first node. This can meet a duplex constrain, can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

Optionally, the communication method shown in FIG. 8 may further include the following S805 to S809. The following S805 to S809 may be used independently, or the following S805 to S809 may be used together with the foregoing S801 to S804. A sequence of the following S805 to S809 and the foregoing S801 to S804 is not limited in this embodiment of this application.

S805: The source donor node determines second information.

Optionally, the second information may include resource configuration information that is of the target cell and that is determined by the source donor node. That is, the source donor node may determine the resource configuration information of the target cell, to send the resource configuration information to the target donor node, and recommend the target donor node to adjust the resource configuration of the target cell based on the second information, so as to avoid a conflict between the resource configuration of the first cell and the resource configuration of the target cell.

In a possible implementation, in S805, determining the second information may include: determining the second information based on the second resource configuration information.

In an embodiment, optionally, the second resource configuration information may include the current resource configuration information of the first cell.

In another embodiment, optionally, the second resource configuration information may include adjusted resource configuration information of the first cell, that is, the third resource configuration information.

For example, with reference to FIG. 10, in downlink transmission, resource configuration information of a cell includes resource configuration of the cell. With reference to (c) in FIG. 10, it is assumed that current or adjusted resource configuration of a first cell includes: a slot 0 is in a not available mode, a slot 1 is in a hard mode, and a slot 2 is in a soft mode. In this case, the source donor node may determine that the second information includes: a slot 0 is in a hard mode, a slot 1 is in a not available mode, and a slot 2 is in a soft mode.

In a possible implementation, in S805, determining the second information may include: determining the second information based on the second resource configuration information and the first resource configuration information.

Optionally, the second information may include recommended resource configuration information of the target cell, and the recommended resource configuration information of the target cell may include the resource configuration information of the second cell and/or the resource adjustment information of the second cell.

For example, with reference to FIG. 10, in downlink transmission, resource configuration information of a cell includes resource configuration of the cell. With reference to (d) in FIG. 10, it is assumed that current resource configuration of a first cell includes: a slot 0 is in a not available mode, a slot 1 is in a hard mode, and a slot 2 is in a soft mode. It is assumed that current resource configuration of a target cell served by a target parent node includes: a slot 0 is in a not available mode, a slot 1 is in a hard mode, and a slot 2 is in a soft mode. In this case, the source donor node may determine that the second information includes: a slot 0 is in a hard mode, a slot 1 is in a not available mode, and a slot 2 is in a soft mode. The second information includes configuration information of the slot 0, the slot 1, and the slot 2, regardless of whether current configuration information of the three slots all needs to be adjusted. Alternatively, the source donor node may determine that the second information includes: a slot 0 is in a hard mode, and a slot 1 is in a not available mode.

It should be noted that S805 may be performed simultaneously with S802, or performed before S802, or performed after S802. This is not limited in this application.

S806: The source donor node sends the second information to the target donor node. Correspondingly, the target donor node receives the second information from the source donor node.

It should be noted that S806 may be performed when the source donor node sends the third resource configuration information to the target donor node, or before the source donor node sends the third resource configuration information to the target donor node, or after the source donor node sends the third resource configuration information to the target donor node. This is not limited in this application.

S807: The target donor node determines sixth resource configuration information, including: determining the sixth resource configuration information based on the third resource configuration information and/or the second information.

Optionally, the sixth resource configuration information may be used for resource configuration of the target cell. The sixth resource configuration information may include the resource reconfiguration information of the target cell, and the resource reconfiguration information of the target cell may be determined based on the resource reconfiguration information of the first cell and/or resource configuration information of the target cell recommended by the source donor node.

The following describes an example in which the target donor node determines the sixth resource configuration information based on the second information.

For example, with reference to (e) in FIG. 10, in downlink transmission, resource configuration information of a cell includes resource configuration of the cell. It is assumed that the second information includes: a slot 0 is in a hard mode, a slot 1 is in a not available mode, and a slot 2 is in a soft mode. In this case, the target donor node may determine that the sixth resource configuration information includes: a slot 0 is in a hard mode, a slot 1 is in a not available mode, and a slot 2 is in a soft mode. That is, the target donor node may fully accept the recommendation of the source donor node.

For example, with reference to (f) in FIG. 10, in downlink transmission, resource configuration information of a cell includes resource configuration of the cell. It is assumed that the second information includes: a slot 0 is in a hard mode, a slot 1 is in a not available mode, and a slot 2 is in a soft mode. In this case, the target donor node may determine that the sixth resource configuration information includes: a slot 0 is in a not available mode, a slot 1 is in a hard mode, and a slot 2 is in a soft mode. That is, the target donor node may partially accept the recommendation of the source donor node.

For example, with reference to (g) in FIG. 10, in downlink transmission, resource configuration information of a cell includes resource configuration of the cell. It is assumed that the second information includes: a slot 0 is in a hard mode, a slot 1 is in a not available mode, and a slot 2 is in a soft mode. In this case, the target donor node may determine that the sixth resource configuration information includes: a slot 0 is in a not available mode, a slot 1 is in a hard mode, and a slot 2 is in a hard mode. That is, the target donor node may fully reject the recommendation of the source donor node.

The following describes an example in which the target donor node determines the sixth resource configuration information based on the third resource configuration information.

For example, with reference to (h) in FIG. 10, in downlink transmission, resource configuration information of a cell includes resource configuration of the cell. It is assumed that resource reconfiguration information (namely, third resource configuration information) of a first cell includes: a slot 0 is in a not available mode, a slot 1 is in a hard mode, and a slot 2 is in a soft mode. In this case, the target donor node may determine that the sixth resource configuration information includes: a slot 0 is in a hard mode, a slot 1 is in a not available mode, and a slot 2 is in a soft mode.

It should be noted that, that the target donor node determines the sixth resource configuration information based on the third resource configuration information is similar to determining the sixth resource configuration information based on the second information. Transmission scheduling of the determined sixth resource configuration information in a slot may partially or completely conflict with that of the third resource configuration information. The target donor node may negotiate with the source donor node again. This is not listed one by one in this embodiment of this application again. An example of determining the sixth resource configuration information based on the third resource configuration information and the second information may be obtained by combining the example of determining the sixth resource configuration information based on the third resource configuration information with the example of determining the sixth resource configuration information based on the second information. This is not listed one by one in this embodiment of this application again.

Optionally, after transmission scheduling of the determined sixth resource configuration information in a slot partially or completely conflicts with that of the third resource configuration information, the target donor node may negotiate with the source donor node again. Alternatively, a protocol stipulates that after a specific quantity of negotiation times, the target donor node modifies the current resource configuration information of the target cell based on the third resource configuration information and/or the second information that are/is received from the source donor node. Alternatively, a protocol stipulates that after a specific quantity of negotiation times, the source donor node modifies the current resource configuration information of the first cell based on current or reconfigured resource configuration information of the target cell received from the target donor node, to resolve a conflict between the resource configuration of the first cell and the resource configuration of the target cell.

In some embodiments, that the target donor node determines the sixth resource configuration information based on the third resource configuration information and/or the second information may include: The target donor node determines the sixth resource configuration information based on the third resource configuration information and/or the second information and the first resource configuration information.

Optionally, the sixth resource configuration information may include the resource reconfiguration information of the target cell, and the resource reconfiguration information of the target cell may include the resource configuration information of the target cell and/or resource adjustment information of the target cell. That is, the target donor node may determine the resource configuration information of the target cell based on the resource reconfiguration information of the first cell and/or the resource configuration information that is of the target cell and that is determined by the source donor node, and the current resource configuration information of the target cell, or determine to adjust some resource configuration information of the target cell.

A specific example in which the target donor node determines the sixth resource configuration information based on the third resource configuration information and the first resource configuration information is similar to the specific example in which the source donor node determines the third resource configuration information based on the first resource configuration information and the second resource configuration information in S802.

A specific example of determining the sixth resource configuration information based on the second information and the first resource configuration information is similar to the specific example of determining the sixth resource configuration information based on the second information.

An example of a specific implementation of determining the sixth resource configuration information based on the third resource configuration information, the second information, and the first resource configuration information is similar to a combination of an example of a specific implementation of determining the sixth resource configuration information based on the third resource configuration information and the first resource configuration information and an example of a specific implementation of determining the sixth resource configuration information based on the second information and the first resource configuration information.

In a possible implementation, the communication method provided in this embodiment of this application further includes: The target donor node sends third indication information to the source donor node. Correspondingly, the source donor node receives the third indication information from the target donor node.

Optionally, the third indication information may indicate whether the target donor node uses the second information as the resource reconfiguration information of the target cell.

For example, if the third indication information indicates that the target donor node uses the second information as the resource reconfiguration information of the target cell, it indicates that the target donor node fully accepts the recommendation of the source donor node. If the third indication information indicates that the target donor node does not use the second information as the resource reconfiguration information of the target cell, it indicates that the target donor node does not fully accept the recommendation of the source donor node or the target donor node fully rejects the recommendation of the source donor node. Alternatively, in another possible example, if the target donor node does not fully accept the recommendation of the source donor node, the third indication information may indicate specific parts that are of the cell resource configuration recommended by the source donor node and that are accepted by the target donor node.

In this way, when the third indication information indicates no, the source donor node may adjust the resource configuration information of the target cell, or send new second information to the target donor node, to resolve a conflict between the resource configuration of the first cell and the resource configuration of the target cell.

In a possible implementation, the communication method provided in this embodiment of this application further includes: The target donor node determines eighth resource configuration information based on one or more of the third resource configuration information, the second information, or the sixth resource configuration information.

Optionally, the eighth resource configuration information may include resource reconfiguration information of a third cell, the third cell is a cell served by a third node, and the third node is connected to the target donor node through the target parent node (that is, the third node is a descendent node of the target parent node, and may be specifically, for example, a child node or a grandchild node of the target parent node). The resource reconfiguration information of the third cell may include resource configuration information of the third cell and/or resource adjustment information of the third cell.

That is, the target donor node may determine the resource configuration information of the third cell based on one or more of the resource reconfiguration information of the first cell, the resource configuration information that is of the target cell and that is determined by the source donor node, the sixth resource configuration information of the target cell, or the current resource configuration information of the target cell, or determine to adjust some resource configuration information of the third cell.

An example in which the target donor node determines the eighth resource configuration information based on one or more of the third resource configuration information, the second information, or the sixth resource configuration information is similar to the example in which the target donor node determines the sixth resource configuration information based on the third resource configuration information and/or the second information.

In a possible implementation, the communication method provided in this embodiment of this application further includes: The target donor node determines the eighth resource configuration information based on seventh resource configuration information and one or more of the third resource configuration information, the second information, or the sixth resource configuration information.

Optionally, the seventh resource configuration information includes current resource configuration information of the third cell. That is, the target donor node may determine the resource configuration information of the third cell based on the current resource configuration information of the third cell and one or more of the resource reconfiguration information of the first cell, the resource configuration information that is of the target cell and that is determined by the source donor node, the sixth resource configuration information that is of the target cell and that is determined by the target donor node, or the current resource configuration information of the target cell, or determine to adjust some resource configuration information of the third cell.

A specific example in which the target donor node determines the eighth resource configuration information based on the seventh resource configuration information and one or more of the third resource configuration information, the second information, or the sixth resource configuration information is similar to the specific example in which the target donor node determines the sixth resource configuration information based on the third resource configuration information and/or the second information and the first resource configuration information.

S808: The target donor node sends the sixth resource configuration information to the target father node. Correspondingly, the target father node receives the sixth resource configuration information from the target donor node.

For example, the target donor node may send the RRC message or the F1AP message to the target parent node, where the RRC message or the F1AP message carries the sixth resource configuration information.

Optionally, the RRC message or the F1AP message that includes the sixth resource configuration information may further include indication information indicating the target parent node not to immediately use the sixth resource configuration information.

In a possible implementation, the communication method provided in this embodiment of this application may further include: The target donor node sends the eighth resource configuration information to the third node. Correspondingly, the third node receives the eighth resource configuration information from the target donor node.

Optionally, the target donor node may send the RRC message or the F1AP message to the third node. Correspondingly, the third node may receive the RRC message or the F1AP message from the target donor node.

For example, the RRC message or the F1AP message may include the eighth resource configuration information, and optionally may further include indication information indicating the third node not to immediately use the eighth resource configuration information.

It should be noted that a sequence of sending, by the target donor node, the sixth resource configuration information to the target node and sending, by the target donor node, the eighth resource configuration information to the third node is not limited in this embodiment of this application.

In a possible implementation, the communication method provided in this embodiment of this application may further include: The target donor node sends the sixth resource configuration information to the source donor node. Correspondingly, the source donor node receives the sixth resource configuration information from the target donor node.

In this way, the source donor node may learn of the resource reconfiguration information of the target cell.

S809: The target father node performs resource configuration on the target cell based on the sixth resource configuration information.

Optionally, the third node performs resource configuration on the third cell based on the eighth resource configuration information.

In a possible implementation, before S809, the communication method provided in this embodiment of this application may further include: The target father node determines that the sixth resource configuration information is effective.

In this way, after receiving the sixth resource configuration information, the target father node does not immediately use the sixth resource configuration information. After determining that the sixth resource configuration information is effective, the target father node performs resource configuration on the target cell based on the sixth resource configuration information.

In some embodiments, the target donor node may send fourth effectiveness indication information to the target father node.

Optionally, the fourth effectiveness indication information may indicate that the sixth resource configuration information is effective. After the target donor node determines that the MT part of the first node is connected to the target parent node (for example, the target donor node receives an uplink message including the MT part of the first node from the target parent node, where the uplink message may be an RRC reconfiguration complete message), the target donor node may send, to the target node, information indicating that the sixth resource configuration information is effective.

In some embodiments, that the target parent node determines that the sixth resource configuration information is effective may include: The target parent node receives the fourth effectiveness indication information from the target donor node, or the target parent node establishes a connection to the first node (for example, the first node successfully performs random access to the target cell served by the target parent node).

Optionally, the fourth effectiveness indication information indicates that the sixth resource configuration information is effective. That is, after receiving explicit effectiveness indication information, the target node may perform resource configuration on the target cell based on the sixth resource configuration information, or may perform resource configuration on the first cell based on the sixth resource configuration information when the MT part of the first node establishes a connection to the target parent node (for example, the MT part of the first node succeeds in random access to the target cell served by the target parent node).

In a possible implementation, the communication method provided in this embodiment of this application may further include: The target parent node sends third effectiveness indication information to the third node.

In a possible implementation, the communication method provided in this embodiment of this application may further include: The target donor node sends the third effectiveness indication information to the third node.

Optionally, the third effectiveness indication information may indicate that the eighth resource configuration information is effective. In this way, after receiving the eighth resource configuration information, the third node does not immediately use the eighth resource configuration information. After determining that the eighth resource configuration information is effective, the third node performs resource configuration on the third cell based on the eighth resource configuration information.

In a possible implementation, before the third node performs resource configuration on the third cell based on the eighth resource configuration information, the communication method provided in this embodiment of this application may further include: The third node determines that the eighth resource configuration information is effective. Specifically, the third node receives the third effectiveness indication information from the target donor node or the target parent node.

In this way, after receiving explicit effectiveness indication information, the third node may perform resource configuration on the third cell based on the eighth resource configuration information.

According to the communication method shown in S805 to S809 in FIG. 8, the source donor node sends the second information and/or the third resource configuration information determined by the source donor node to the target donor node, and recommends the target donor node to adjust resource configuration of the target cell based on the second information and/or the third resource configuration information. This can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

Figure 11:
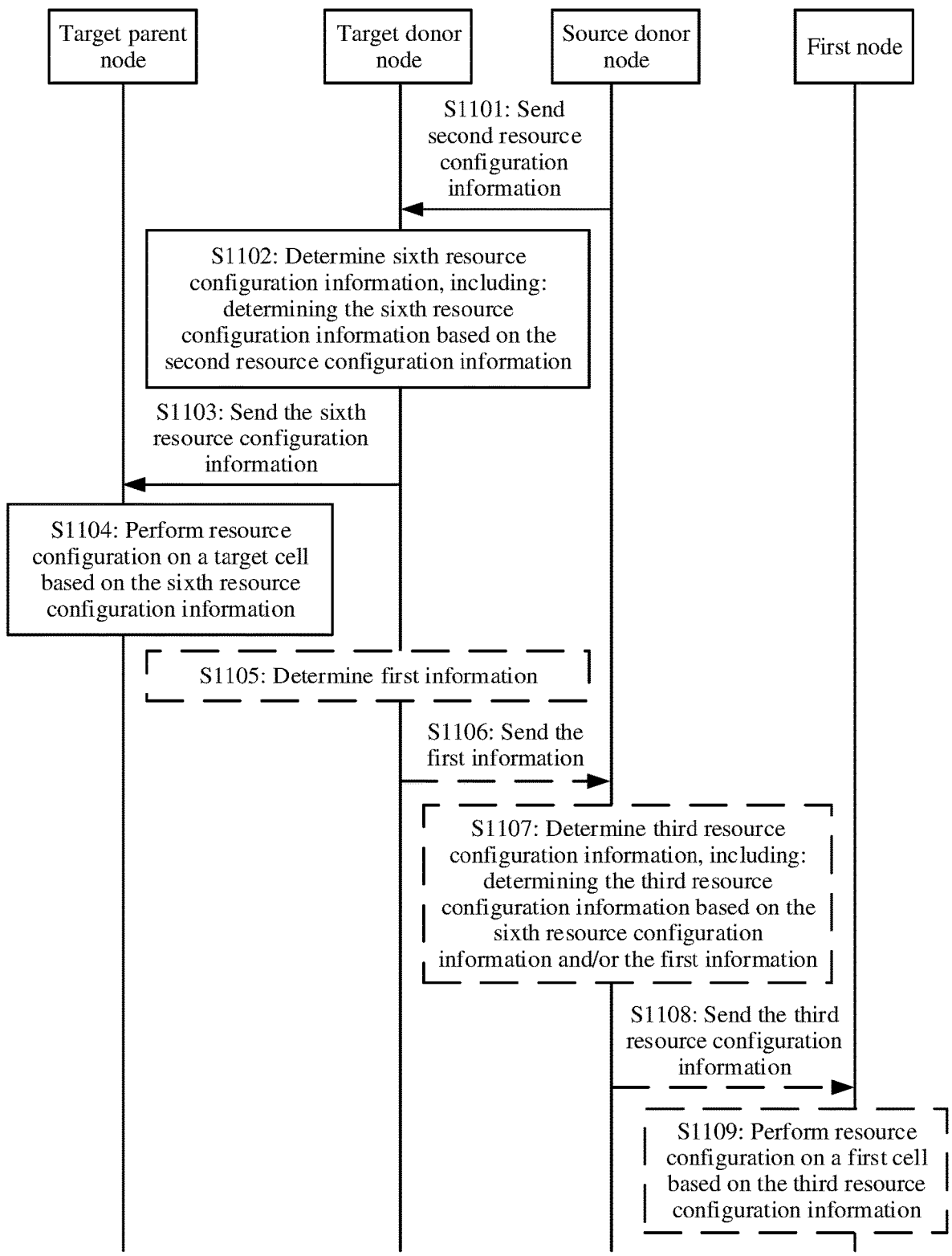
FIG. 11 is an example schematic flowchart of another communication method according to an embodiment of this application.

For example, FIG. 11 is a schematic flowchart of another communication method according to an embodiment of this application. The communication method is applicable to communication between any two nodes shown in FIG. 3. As shown in FIG. 11, the communication method includes the following steps.

S1101: A source donor node sends second resource configuration information to a target donor node. Correspondingly, the target donor node receives the second resource configuration information from the source donor node.

The second resource configuration information includes current resource configuration information of a first cell.

For specific implementations of resource configuration information of a cell and the second resource configuration information, refer to S801.

In a possible implementation, the communication method provided in this embodiment of this application may further include: The source donor node sends a first request message to the target donor node. Correspondingly, the target donor node receives the first request message from the source donor node.

Optionally, the first request message may be used to request to hand over a donor node of a first node from the source donor node to the target donor node, or used to request to use the target donor node as a secondary node of the first node.

Optionally, the first request message may include one or more of the following: first indication information, an identifier of a target cell, or the second resource configuration information.

Optionally, the first indication information indicates that the first node is an IAB node.

For specific implementations of the first request message, the first indication information, and the identifier of the target cell, refer to S801.

In a possible implementation, the communication method provided in this embodiment of this application may further include: The target donor node sends a first response message to the source donor node. Correspondingly, the source donor node receives the first response message from the target donor node.

Optionally, the first response message may be used to determine to hand over the donor node of the first node from the source donor node to the target donor node, or used to determine to use the target donor node as a secondary node of the first node.

Optionally, the first response message may include first resource configuration information.

For specific implementations of the first response message and the first resource configuration information, refer to S801.

S1102: The target donor node determines sixth resource configuration information, including: determining the sixth resource configuration information based on the second resource configuration information.

For example, the sixth resource configuration information may be used for resource configuration of the target cell, the target cell is a cell served by a target parent node, and the target parent node may be used by the first node to connect to the target donor node. The sixth resource configuration information may include resource reconfiguration information of the target cell, and the resource reconfiguration information of the target cell may be determined based on the current resource configuration information of the first cell.

A specific implementation of S1102 is similar to that of S802 in which the source donor node determines third resource configuration information, including: determining the third resource configuration information based on the first resource configuration information.

For example, with reference to (h) in FIG. 10, in downlink transmission, resource configuration information of a cell includes resource configuration of the cell. The current resource configuration information of the first cell includes: a slot 0 is in a not available mode, a slot 1 is in a hard mode, and a slot 2 is in a soft mode. A slot in which the target father nod schedules the first node to perform downlink transmission may be staggered from a slot in which the first node performs downlink transmission scheduling on UE or a child node served by the first node, and the determined sixth resource configuration information includes: the slot 0 is in a hard mode, the slot 1 is in a not available mode, and the slot 2 is in a soft mode. In this way, no conflict occurs between the first node and the target parent node in transmission scheduling in a downlink slot.

Optionally, the sixth resource configuration information determined by the target donor node based on the second resource configuration information may conflict with the current resource configuration information of the first cell, and a slot in which the conflict exists may be resolved by using a scheduling policy of a target node in the target cell (for example, the target node learns that the slot 1 is in a hard mode for the first node, and therefore may try to avoid performing downlink transmission scheduling on the first node in the slot 1), or may be resolved by the source donor node determining the resource reconfiguration information of the first cell. For details, refer to the following methods in S1105 to S1109.

In some embodiments, that the target donor node determines the sixth resource configuration information based on the second resource configuration information may include: The target donor node determines the sixth resource configuration information based on the second resource configuration information and the first resource configuration information.

Optionally, the sixth resource configuration information may include the resource reconfiguration information of the target cell, and the resource reconfiguration information of the target cell may include resource configuration information of the target cell and/or resource adjustment information of the target cell. That is, the target donor node may determine the resource configuration information of the target cell based on the current resource configuration information of the target cell and the current resource configuration information of the first cell, or determine to adjust some resource configuration information.

Optionally, the target donor node may adjust, based on the second resource configuration information, only a part of resource configuration information that is of the target cell and in which a conflict occurs, and an unadjusted slot in which a conflict occurs may be resolved by determining the resource reconfiguration information of the first cell by the source donor node. For details, refer to the method described in S1105 to S1109.

A specific implementation in which the target donor node determines the sixth resource configuration information based on the second resource configuration information and the first resource configuration information is similar to the specific implementation in which the source donor node determines the third resource configuration information based on the first resource configuration information and the second resource configuration information in S802.

A specific example in which the target donor node determines the sixth resource configuration information based on the second resource configuration information and the first resource configuration information is similar to the specific example in which the source donor node determines the third resource configuration information based on the first resource configuration information and the second resource configuration information in S802.

In a possible implementation, the communication method provided in this embodiment of this application may further include: The target donor node determines eighth resource configuration information based on the second resource configuration information and/or the sixth resource configuration information.

Optionally, the eighth resource configuration information may include resource reconfiguration information of a third cell, the third cell is a cell served by a third node, and the third node is connected to the target donor node by using the target parent node. That is, the third node may be a descendent node of the target parent node, the target donor node may determine, based on the current resource configuration information of the first cell and/or the resource reconfiguration information of the target cell, the resource reconfiguration information of the third cell served by the descendent node of the target parent node.

A specific example in which the target donor node determines the eighth resource configuration information based on the second resource configuration information and/or the sixth resource configuration information is similar to the specific example in which the source donor node determines the fifth resource configuration information based on the third resource configuration information and/or the first resource configuration information in S802.

In a possible implementation, the communication method provided in this embodiment of this application may further include: The target donor node determines the eighth resource configuration information based on the second resource configuration information and/or the sixth resource configuration information and seventh resource configuration information.

Optionally, the seventh resource configuration information may include current resource configuration information of the third cell.

Optionally, the eighth resource configuration information may include the resource reconfiguration information of the third cell, and the resource reconfiguration information of the third cell may include resource configuration information of the third cell and/or resource adjustment information of the third cell. That is, the target donor node may determine the resource configuration information of the third cell, or determine to adjust some resource configuration information of the third cell.

A specific example in which the target donor node determines the eighth resource configuration information based on the second resource configuration information and/or the sixth resource configuration information and the seventh resource configuration information is similar to the specific example in which the source donor node determines the fifth resource configuration information based on the third resource configuration information and/or the first resource configuration information and the fourth resource configuration information in S802.

S1103: The target donor node sends the sixth resource configuration information to the target father node. Correspondingly, the target father node receives the sixth resource configuration information from the target donor node.

Optionally, the target donor node may send an RRC message or an F1AP message to the target father node. Correspondingly, the target node may receive the RRC message or the F1AP message from the target donor node.

For example, the RRC message may include the sixth resource configuration information. The F1AP message may include the sixth resource configuration information. Optionally, the RRC message or the F1AP message may further include indication information indicating the target parent node not to immediately use the sixth resource configuration information.

In a possible implementation, the communication method provided in this embodiment of this application may further include: The target donor node sends the eighth resource configuration information to the third node. Correspondingly, the third node receives the eighth resource configuration information from the target donor node. For a specific implementation, refer to the corresponding implementation in S808.

In a possible implementation, the communication method provided in this embodiment of this application may further include: The target donor node sends the sixth resource configuration information to the source donor node. Correspondingly, the source donor node receives the sixth resource configuration information from the target donor node.

In this way, the source donor node may learn of the resource reconfiguration information of the target cell.

Optionally, the target donor node may send the sixth resource configuration information to the source donor node by using the first response message. The first response message may include the sixth resource configuration information.

S1104: The target father node performs resource configuration on the target cell based on the sixth resource configuration information.

Optionally, the third node performs resource configuration on the third cell based on the eighth resource configuration information.

In a possible implementation, before S1104, the communication method provided in this embodiment of this application may further include: The target father node determines that the sixth resource configuration information is effective.

In this way, when receiving the sixth resource configuration information, the target father node does not immediately use the sixth resource configuration information. After determining that the sixth resource configuration information is effective, the target father node performs resource configuration on the target cell based on the sixth resource configuration information.

In some embodiments, the target donor node may send fourth effectiveness indication information to the target father node.

Optionally, the fourth effectiveness indication information may indicate that the sixth resource configuration information is effective. After the target donor node determines that an MT part of the first node is connected to the target parent node (for example, the target donor node receives an uplink message including the MT part of the first node from the target parent node, where the uplink message may be an RRC reconfiguration complete message), the target donor node may send, to the target node, information indicating that the sixth resource configuration information is effective.

In some embodiments, that the target parent node determines that the sixth resource configuration information is effective may include: The target parent node receives the fourth effectiveness indication information from the target donor node, or the target parent node establishes a connection to the first node.

Optionally, the fourth effectiveness indication information indicates that the sixth resource configuration information is effective. That is, after receiving explicit effectiveness indication information, the target node may perform resource configuration on the target cell based on the sixth resource configuration information, or may perform resource configuration on the target cell based on the sixth resource configuration information when the MT part of the first node establishes a connection to the target parent node (for example, the MT part of the first node succeeds in random access to the target cell served by the target parent node).

In a possible implementation, the communication method provided in this embodiment of this application may further include: The target donor node or the target parent node sends third effectiveness indication information to the third node.

Optionally, the third effectiveness indication information may indicate that the eighth resource configuration information is effective. In this way, after receiving the eighth resource configuration information, the third node does not immediately use the eighth resource configuration information. After determining that the eighth resource configuration information is effective, the third node performs resource configuration on the third cell based on the eighth resource configuration information.

In a possible implementation, before the third node performs resource configuration on the third cell based on the eighth resource configuration information, the communication method provided in this embodiment of this application may further include: The third node determines that the eighth resource configuration information is effective. Specifically, the third node receives the third effectiveness indication information from the target donor node or the target parent node.

In a possible manner, after determining that the sixth resource configuration information is effective, the target parent node may send the third effectiveness indication information to the third node.

In this way, after receiving explicit effectiveness indication information, the third node may perform resource configuration on the third cell based on the eighth resource configuration information.

According to the communication method shown in S1101 to S1104 in FIG. 11, the target donor node receives, from the source donor node, the current resource configuration information of the first cell served by the first node, and determines, based on the current resource configuration information of the first cell, the resource reconfiguration information of the target cell served by the target parent node. This can meet a duplex constrain, can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

Optionally, the communication method shown in FIG. 11 may further include the following S1105 to S1109. The following S1105 to S1109 may be used independently, or the following S1105 to S1109 may be used together with the foregoing S1101 to S1104. A sequence of the following S1105 to S1109 and the foregoing S1101 to S1104 is not limited in this embodiment of this application.

S1105: The target donor node determines first information.

Optionally, the first information may include resource configuration information that is of the first cell and that is determined by the target donor node. That is, the target donor node may determine the resource configuration information of the first cell, to send the resource configuration information to the source donor node, and recommend the source donor node to adjust the resource configuration of the first cell based on the first information, so as to avoid a conflict between the resource configuration of the first cell and the resource configuration of the target cell.

In a possible implementation, in S1105, determining the first information may include: The target donor node determines the first information based on the first resource configuration information.

For example, with reference to (b) in FIG. 9, in downlink transmission, resource configuration information of a cell includes resource configuration of the cell. It is assumed that current resource configuration of the target cell includes: a slot 0 is in a hard mode, a slot 1 is in a not available mode, and a slot 2 is in a soft mode. In this case, the target donor node may determine that the first information includes: a slot 0 is in a not available mode, a slot 1 is in a hard mode, and a slot 2 is in a soft mode.

In a possible implementation, in S1105, determining the first information may include: determining the first information based on the first resource configuration information and the second resource configuration information.

Optionally, the first information may include recommended resource configuration information of the first cell, and the recommended resource configuration information of the first cell may include resource configuration information of the first cell and/or resource adjustment information of the first cell.

A specific example of determining the first information based on the first resource configuration information and the second resource configuration information is similar to the specific example in which the source donor node determines the second information based on the second resource configuration information and the first resource configuration information in S805.

It should be noted that S1105 may be performed simultaneously with S1102, or performed before S1102, or performed after S1102. This is not limited in this application.

S1106: The target donor node sends the first information to the source donor node. Correspondingly, the source donor node receives the first information from the target donor node.

Optionally, the target donor node may send the first information to the source donor node by using the first response message. Optionally, the first response message may include the first resource configuration information.

It should be noted that S1106 may be performed when the target donor node sends the sixth resource configuration information to the source donor node, or before the target donor node sends the sixth resource configuration information to the source donor node, or after the target donor node sends the sixth resource configuration information to the source donor node. This is not limited in this application.

S1107: The source donor node determines the third resource configuration information, including: determining the third resource configuration information based on the sixth resource configuration information and/or the first information.

Optionally, the third resource configuration information may be used for resource configuration of the first cell. The third resource configuration information may include the resource reconfiguration information of the first cell, and the resource reconfiguration information of the first cell may be determined based on the resource reconfiguration information of the target cell and/or the resource configuration information of the first cell recommended by the target donor node.

For example, that the source donor node determines the third resource configuration information based on the first information may specifically include: The source donor node fully accepts the recommendation of the target donor node, or the source donor node partially accepts the recommendation of the target donor node, or the source donor node fully rejects the recommendation of the target donor node. A specific example is similar to the example in which the target donor node determines the sixth resource configuration information based on the second information in S807.

A specific example in which the source donor node determines the third resource configuration information based on the sixth resource configuration information is similar to the specific example in which the target donor node determines the sixth resource configuration information based on the third resource configuration information in S807.

It should be noted that, that the source donor node determines the third resource configuration information based on the sixth resource configuration information is similar to determining the third resource configuration information based on the first information. Transmission scheduling of the determined third resource configuration information in a slot may partially or completely conflict with that of the sixth resource configuration information. The target donor node may negotiate with the source donor node again. This is not listed one by one in this embodiment of this application again. An example of determining the third resource configuration information based on the sixth resource configuration information and the first information may be obtained by combining the example of determining the third resource configuration information based on the sixth resource configuration information with the example of determining the third resource configuration information based on the first information. This is not listed one by one in this embodiment of this application again.

Optionally, after transmission scheduling of the determined third resource configuration information in a slot partially or completely conflicts with that of the sixth resource configuration information, the source donor node may negotiate with the target donor node again. Alternatively, a protocol stipulates that after a specific quantity of negotiation times, the source donor node modifies the current resource configuration information of the first cell based on the sixth resource configuration information and/or the first information that are/is received from the target donor node. Alternatively, a protocol stipulates that after a specific quantity of negotiation times, the target donor node modifies the current resource configuration information of the target cell based on current or reconfigured resource configuration information of the first cell received from the source donor node, to resolve a conflict between the resource configuration of the first cell and the resource configuration of the target cell.

In some embodiments, that the source donor node determines the third resource configuration information based on the sixth resource configuration information and/or the first information may include: The source donor node determines the third resource configuration information based on the sixth resource configuration information and/or the first information and the second resource configuration information.

Optionally, the third resource configuration information may include the resource reconfiguration information of the first cell, and the resource reconfiguration information of the first cell may include resource configuration information of the first cell and/or resource adjustment information of the first cell. That is, the source donor node may determine the resource configuration information of the first cell based on the resource reconfiguration information of the target cell and/or the resource configuration information that is of the first cell and that is determined by the target donor node, and the current resource configuration information of the first cell, or determine to adjust some resource configuration information of the target cell.

An implementation in which the source donor node determines the third resource configuration information based on the sixth resource configuration information and/or the first information and the second resource configuration information is similar to the implementation in which the target donor node determines the sixth resource configuration information based on the third resource configuration information and/or the second information and the first resource configuration information in S807.

In a possible implementation, the communication method provided in this embodiment of this application further includes: The source donor node sends second indication information to the target donor node. Correspondingly, the target donor node receives the second indication information from the source donor node.

Optionally, the second indication information may indicate whether the source donor node uses the first information as the resource reconfiguration information of the first cell.

For example, if the second indication information indicates that the source donor node uses the first information as the resource reconfiguration information of the first cell, it indicates that the source donor node fully accepts the recommendation of the target donor node. If the second indication information indicates that the source donor node does not use the first information as the resource reconfiguration information of the first cell, it indicates that the source donor node does not fully accept the recommendation of the target donor node or the source donor node fully rejects the recommendation of the target donor node. Alternatively, in another possible example, if the source donor node does not fully accept the recommendation of the target donor node, the second indication information may indicate specific parts that are of the cell resource configuration recommended by the target donor node in the first information and that are accepted by the source donor node.

In this way, when the second indication information indicates no, the target donor node may adjust the resource configuration information of the target cell, or send new first information to the source donor node, to resolve a conflict between the resource configuration of the first cell and the resource configuration of the target cell.

In a possible implementation, the communication method provided in this embodiment of this application may further include: The source donor node determines the fifth resource configuration information based on one or more of the sixth resource configuration information, the first information, or the third resource configuration information.

Optionally, the fifth resource configuration information may include resource reconfiguration information of a second cell, the second cell is a cell served by a second node, and the second node is connected to the source donor node via the first node. The resource reconfiguration information of the second cell may include resource configuration information of the second cell and/or resource adjustment information of the second cell.

That is, the source donor node may determine the resource configuration information of the second cell based on one or more of the resource reconfiguration information of the target cell, the resource configuration information that is of the first cell and that is determined by the target donor node, and the current resource configuration information of the first cell, or determine to adjust some resource configuration information of the second cell.

A specific implementation in which the source donor node determines the fifth resource configuration information based on one or more of the sixth resource configuration information, the first information, or the third resource configuration information is similar to the specific implementation in which the target donor node determines the eighth resource configuration information based on one or more of the third resource configuration information, the second information, or the sixth resource configuration information in S807.

In a possible implementation, the communication method provided in this embodiment of this application may further include: The source donor node determines the fifth resource configuration information based on fourth resource configuration information and one or more of the sixth resource configuration information, the first information, or the third resource configuration information.

Optionally, the fourth resource configuration information may include resource configuration information of the second cell, the second cell is the cell served by the second node, and the second node is connected to the source donor node via the first node.

A specific implementation in which the source donor node determines the fifth resource configuration information based on the fourth resource configuration information and one or more of the sixth resource configuration information, the first information, or the third resource configuration information is similar to the specific implementation in which the target donor node determines the eighth resource configuration information based on the seventh resource configuration information and one or more of the third resource configuration information, the second information, or the sixth resource configuration information in S807.

S1108: The source donor node sends the third resource configuration information to the first node. Correspondingly, the first node receives the third resource configuration information from the source donor node.

For a specific implementation of S1108, refer to S803.

In a possible implementation, the communication method provided in this embodiment of this application may further include: The source donor node sends the fifth resource configuration information to the second node. Correspondingly, the second node receives the fifth resource configuration information from the source donor node. For a specific implementation, refer to the corresponding implementation in S803.

In a possible implementation, the communication method provided in this embodiment of this application may further include: The source donor node sends the third resource configuration information to the target donor node. Correspondingly, the target donor node receives the third resource configuration information from the source donor node.

In a possible implementation, the communication method provided in this embodiment of this application further includes: The target donor node sends first effectiveness indication information to the first node. Correspondingly, the first node receives the first effectiveness indication information from the target donor node.

In a possible implementation, the communication method provided in this embodiment of this application further includes: The source donor node sends the first effectiveness indication information to the first node. Correspondingly, the first node receives the first effectiveness indication information from the source donor node. Optionally, an RRC message (for example, an RRC reconfiguration message) that carries a handover command and that is sent by the source donor node to the MT part of the first node may carry the first effectiveness indication information. Alternatively, the handover command sent by the source donor node to the MT part of the first node is directly considered as implicit first effectiveness indication information. The handover command may be configuration information used to indicate the MT part of the first node to hand over to the target cell served by the target parent node, and may be specifically a reconfigurationwithSync (ReconfigurationwithSync) information element.

Optionally, the first effectiveness indication information may indicate that the third resource configuration information is effective.

In some embodiments, that the first node determines that the third resource configuration information is effective may include: The first node receives the first effectiveness indication information from the target donor node or the target parent node, or the first node establishes a connection to the target parent node, or the first node receives the first effectiveness indication information from the source donor node.

S1109: The first node performs resource configuration on the first cell based on the third resource configuration information.

Optionally, the second node performs resource configuration on the second cell based on the fifth resource configuration information.

For a specific implementation of S1109, refer to S804.

According to the communication method shown in S1105 to S1109 in FIG. 11, the target donor node sends the first information determined by the target donor node and/or the resource reconfiguration information of the target cell to the source donor node, and recommends the source donor node to adjust the resource configuration of the first cell based on the first information and/or the resource reconfiguration information of the target cell. This can meet a duplex constrain, can ensure normal communication of an IAB node, and can avoid a case in which after the first node accesses the target parent node, a link between the first node and the target parent node does not have sufficient available time domain resources because resource configuration of the first cell conflicts with resource configuration of the target cell. In this way, availability and capacity of an IAB network can be improved.

With reference to FIG. 4 and FIG. 5, in some possible network topology states, a data packet carried on an F1 connection between a DU part of the first node and a CU part of the donor node may be transmitted through a DU part (for example, a DU part of the target donor node shown in FIG. 4 and FIG. 5) controlled by a donor node other than the source donor node.

Scenario 1: With reference to FIG. 4, before the MT part of the first node is handed over (in the initial state shown in FIG. 4), an F1 connection is established between the DU part DU 1 of the first node and the CU of the source donor node, and in a period of time after the MT part MT 1 of the first node hands over to connect to the target parent node (in the intermediate state 1 shown in FIG. 4), the DU part DU 1 of the first node needs to transmit data and/or signaling on the F1 interface between the DU part of the target donor node and the CU part of the source donor node, for example, communicate with the CU part of the source donor node through a path shown by a dashed line in the intermediate state 1 (DU 1-Target parent node-Target donor DU-Source donor CU).

Scenario 2: With reference to FIG. 4, if the first node supports deployment of a plurality of logical DU parts, that the first node includes an MT 1, a DU 1, and a DU 1' is used as an example, before the MT part of the first node is handed over (in the initial state shown in FIG. 4), the DU 1' of the first node needs to establish an F1 connection to the CU of the target donor node by using the DU part of the source donor node. After the MT part MT 1 of the first node hands over to connect to the target parent node (in the intermediate state 1 shown in FIG. 4), the DU 1' of the first node transmits data and/or signaling on the F1 interface between the DU part of the target donor node and the CU part of the target donor node. For example, the DU 1' of the first node communicates with the CU part of the target donor node through a path of DU 1'-Target parent node-Target donor DU-Target donor CU.

Scenario 3: With reference to FIG. 5, if the first node supports dual connectivity across donor nodes, some or all F1 interface services (including user plane services of the F1 interface and/or control plane services of the F1 interface), non-F1 interface (non-F1) services (for example, operation, administration, maintenance (OAM) service) of the DU part of the first node may be transmitted on a transmission path shown by the dashed line in FIG. 5.

In the foregoing several scenarios, the signaling and/or data on the F1 connection between the DU part of the first node and the CU part of the donor node needs to be transmitted on a new transmission path, and the new path includes a new donor DU. Considering that an IP address of a DU part of an IAB node needs to be related to an IP address of a connected donor DU (for example, the IP address of the DU part of the IAB node and the IP address of the connected donor DU belong to a same IP network segment, or the IP address of the DU part of the IAB node is directly an IP address in an address pool maintained by the donor DU). This can ensure that an IP packet sent by the CU of the donor node or another network node to the IAB node by using an IP network can be correctly routed to the donor DU connected to the IAB node first, and then forwarded to the IAB node by using the donor DU, and can further ensure that an uplink IP data packet sent by the IAB node by using the donor DU is not discarded because a condition of allowing forwarding in a source IP address filtering rule deployed on the donor DU is not met. Therefore, both the first node and a descendent node of the first node need to obtain new IP addresses, to transmit the data and/or signaling on the F1 interface between the DU part of the first node and the CU part of the donor node.

To enable the DU part of the first node to transmit the F1 interface service on the new transmission path as soon as possible, a new IP address and configuration of a BAP layer to be used on the new transmission path may be sent to the first node. For example, the new IP address and/or the configuration of the BAP layer to be used on the new transmission path may be carried in an RRC reconfiguration message that is sent to the MT part of the first node and that includes a handover command, or in an RRC reconfiguration message that is sent to the MT part of the first node and that includes related configuration used to add a secondary node.

Figure 12:
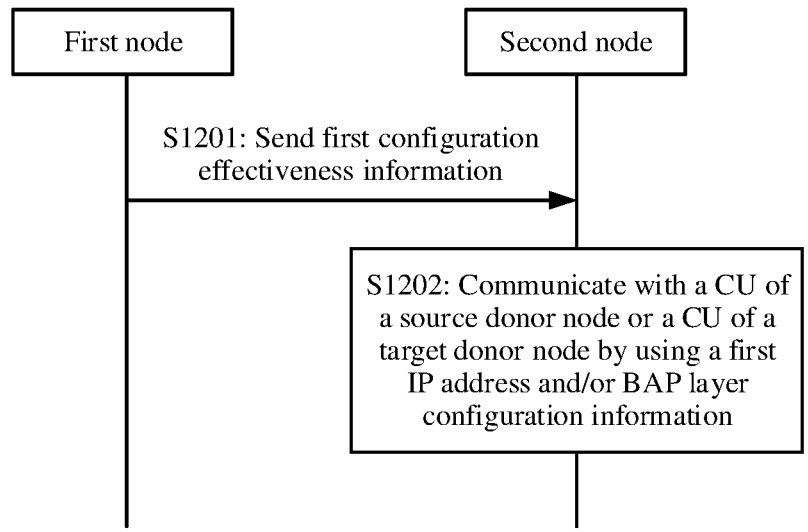
FIG. 12 is an example schematic flowchart of still another communication method according to an embodiment of this application.
Figure 13:
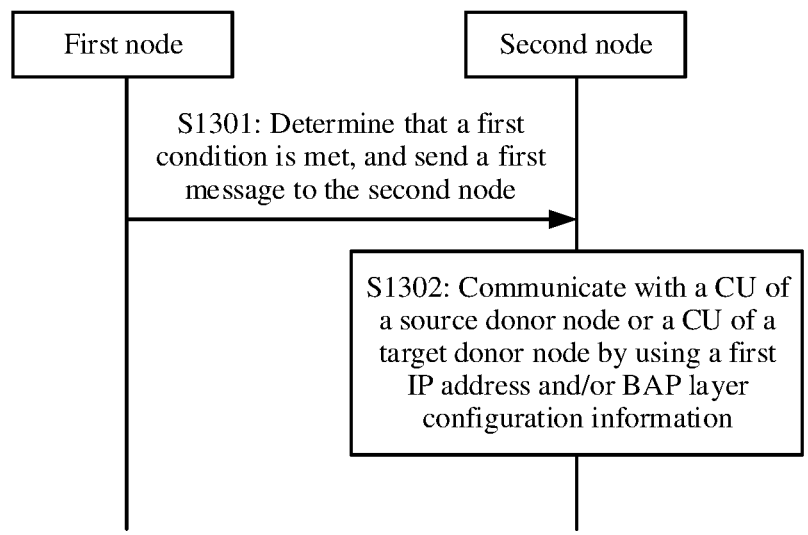
FIG. 13 is an example schematic flowchart of yet another communication method according to an embodiment of this application.
Figure 14:
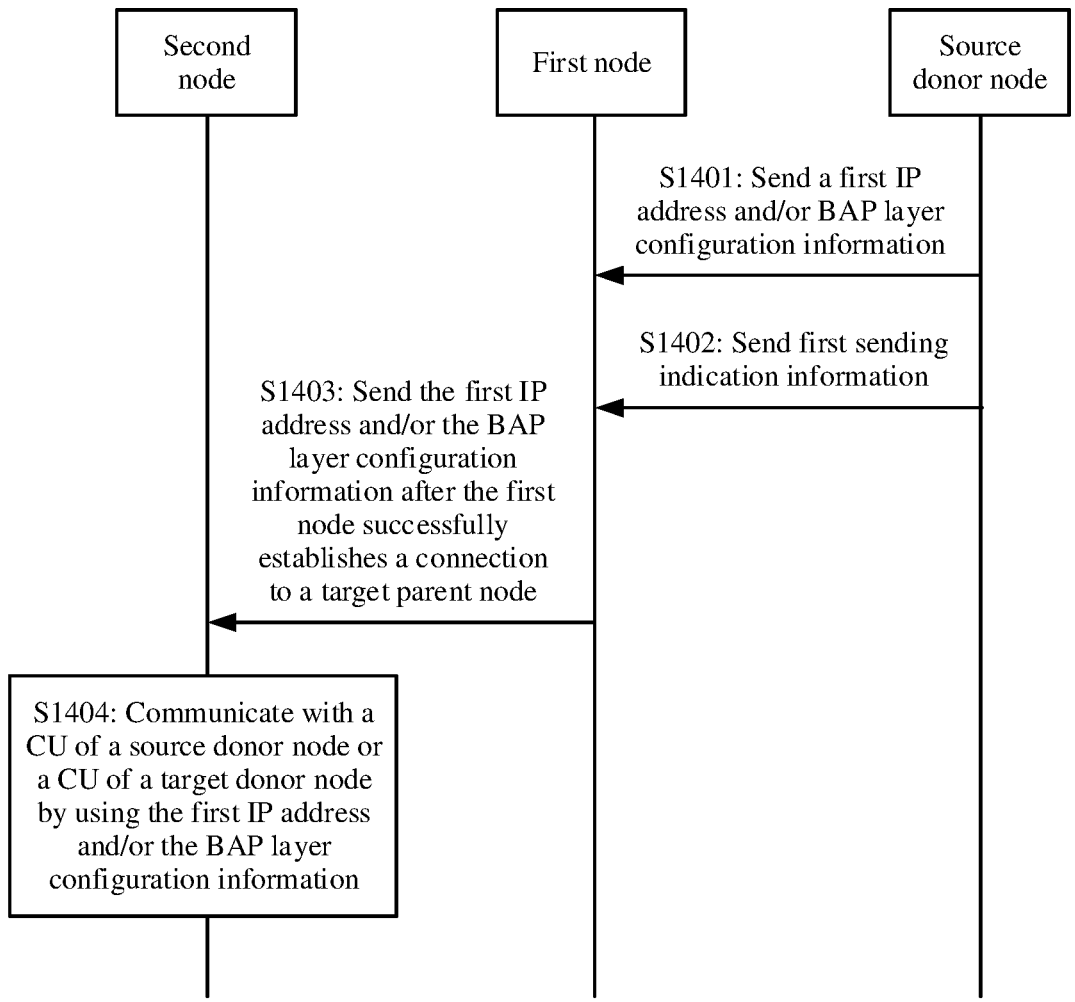
FIG. 14 is an example schematic flowchart of still yet another communication method according to an embodiment of this application.

However, in the foregoing several scenarios, for a descendent IAB node of the first node, using the second node in FIG. 4 and FIG. 5 as an example, after the MT 1 of the first node is handed over to the cell served by the target parent node, the second node also needs to transmit the data and/or signaling on the F1 interface through the new transmission path (referred to as a first path below), and may further transmit the non-F1 interface service (for example, the OAM service). Alternatively, after a cell group served by the target parent node is added to the MT 1 of the first node as a secondary cell group, the second node may migrate some or all data and/or signaling on the F1 interface to the first path, and may further transmit some non-F1 (non-F1) interface services (for example, the OAM services). The first path includes the first node and the DU part of the target donor node. With reference to FIG. 12 to FIG. 14, when the first node is connected to a plurality of donor nodes, or when the DU part of the first node and the MT part of the first node are not managed by a same donor node, how the descendent IAB node of the first node communicates with UE through a link between the first node and the donor node is described below. The methods shown in FIG. 12 to FIG. 14 may be that the second node successfully transmits the F1 interface service and the non-F1 interface service of the second node through the first path.

For example, FIG. 12 is a schematic flowchart of still another communication method according to an embodiment of this application. As shown in FIG. 12, the communication method includes the following steps.

S1201: A first node sends first configuration effectiveness information to a second node. Correspondingly, the second node receives the first configuration effectiveness information from the first node.

The first configuration effectiveness information indicates effectiveness of a first internet protocol IP address and/or effectiveness of first backhaul adaptation protocol BAP layer configuration information.

For example, the first IP address is used by the second node to communicate with a CU of a source donor node or a CU of a target donor node by using a DU of the target donor node.

For example, the first IP address may be used by the second node to perform non-F1 interface service communication with another node (for example, an OAM server) by using the DU of the target donor node.

With reference to FIG. 4 or FIG. 5, the second node may communicate with the CU of the source donor node, the CU of the target donor node, or another node (for example, the OAM server) by using the DU of the target donor node by using the first IP address.

Specifically, the first IP address may be an IP address related to the DU of the target donor node (or an IP address whose anchor is on the DU of the target donor node). The IP address related to the DU of the target donor node or the IP address whose anchor is on the DU of the target donor node means that the DU of the target donor node can be found by using the IP address (for example, an IP address of an IAB node and an IP address of the DU of the target donor node belong to a same IP network segment, or an IP address of a DU part of the IAB node is directly an IP address in an address pool maintained by the DU of the target donor node). For example, when a destination address of a data packet is the first IP address, based on the first IP address, the data packet on a network segment of an IP route may be forwarded to the DU of the target donor node, and then the DU of the target donor node forwards the data packet.

For example, the first BAP layer configuration information is used by the second node to communicate with the CU of the source donor node, the CU of the target donor node, or another node (for example, the OAM server) by using the DU of the target donor node.

In some embodiments, the first BAP layer configuration information includes one or more of the following: a first BAP routing identifier, a BAP address of a next-hop node of the second node, an identifier of a default backhaul (BH) radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link.

Optionally, the next-hop node of the second node is a next-hop node of the second node during uplink transmission, that is, a parent node of the second node.

Optionally, the first link is a link between the second node and the next-hop node of the second node.

For example, the first BAP routing identifier (BAP routing ID) may be a BAP layer routing identifier, the first BAP routing identifier may include a BAP layer address and a BAP path identifier, the BAP layer address may be an address of the DU part of the target donor node, and the BAP path identifier may be an identifier of a transmission path between the second node and the DU part of the target donor node.

In some embodiments, optionally, after determining that a transmission path between the first node and the target donor DU is established, the first node sends the first configuration effectiveness information to the second node. For example, after determining that the first node successfully performs random access to a target parent node, the first node may determine that the transmission path between the first node and the target donor DU is established. Alternatively, after sending an uplink RRC message (for example, an RRC reconfiguration complete message) by using the target parent node, the first node may determine that the transmission path between the first node and the target donor DU is established.

In some embodiments, optionally, the first node may send the first configuration effectiveness information to the second node after receiving an RRC reconfiguration message that includes a handover command and that is sent by the source donor node (which may be specifically the CU of the source donor node or a CU-CP of the source donor node); or send the first configuration effectiveness information to the second node after receiving an RRC reconfiguration message that includes related configuration used to add a secondary node by the first node and that is sent by the source donor node (which may be specifically the CU of the source donor node or a CU-CP of the source donor node).

In some embodiments, the first configuration effectiveness information may be carried in a protocol data unit PDU or a data link layer MAC control element (CE) at a BAP layer.

In some embodiments, the first configuration effectiveness information may include a first index value and/or a second index value, the first index value is used to indicate at least one first IP address, and the second index value is used to indicate at least one piece of BAP layer configuration information.

In some embodiments, the first index value and the second index value may be a same index value.

In some embodiments, the first configuration effectiveness information may include an identifier of the target donor node.

For example, the first configuration effectiveness information may include an identifier of a gNB corresponding to the second node, an identifier of a DU part of the target donor node (for example, a DU ID of the target donor node, a BAP address of the DU of the target donor node, or an IP address of the DU of the target donor node), or an identifier of the CU part of the target donor node (gNB CU ID, or an IP address of the CU of the target donor node). In this case, when the second node obtains a new IP address or a group of new IP addresses or new BAP layer configuration information, corresponding to the new IP address or new BAP layer configuration, the identifier of the corresponding gNB, the identifier of the DU part of the target donor node, or the identifier of the target donor CU part is further carried. In this way, the second node may learn, based on these identifiers, a specific group of IP addresses and/or a specific set of BAP layer configuration information used for communication.

Optionally, the second node may send, to a descendent node of the second node, indication information indicating that the second node is connected to the target donor node. The descendent node of the second node may stop using an old IP address based on the received indication information, and may further stop using BAP layer configuration that is used before obtaining first BAP layer configuration.

Optionally, the second node may send configuration effectiveness indication information to a child node of the second node, where the indication information is used by the child node to take effect of a second IP address and/or second BAP layer configuration information. The second IP address and the second BAP layer configuration information that are obtained by the child node are used for communication with the source donor node CU or the target donor CU or another node (for example, the OAM server) through a new path of the first node. The new path of the first node includes the DU of the target donor node.

In some embodiments, the communication method provided in this embodiment of this application may further include: The source donor node (which may be specifically the CU of the source donor node or the CU-CP of the source donor node) sends the first IP address and/or the first BAP layer configuration information to the second node by using an RRC message or an F1AP message. Correspondingly, the second node receives the first IP address and/or the first BAP layer configuration information from the source donor node by using the RRC message or the F1AP message.

Optionally, the source donor node may send the first IP address and/or the first BAP layer configuration information to the second node when an MT part of the first node is not connected to the target parent node.

Optionally, the source donor node may send, to the second node, indication information indicating that the first IP address is not immediately used and/or indication information indicating that the first BAP layer configuration information is not immediately used. Correspondingly, the second node receives, from the source donor node, the indication information indicating that the first IP address is not immediately used and/or the indication information indicating that the first BAP layer configuration information is not immediately used.

Optionally, the second node may not immediately use the first IP address to communicate with the CU of the target donor node or the CU of the source donor node through an F1 interface. The second node may not immediately use the first BAP layer configuration information to communicate with the CU of the target donor node or the CU of the source donor node.

For example, communication through the F1 interface may include one or more of the following: establishing stream control transmission protocol (SCTP) coupling with the CU part of the source donor node by using the first IP address, performing IPsec security negotiation, establishing an F1 connection, transmitting a user plane data service of the F1 interface by using the first IP address, or transmitting control plane signaling (namely, an F1AP message) of the F1 interface by using the first IP address.

S1202: The second node communicates with the CU of the source donor node or the CU of the target donor node by using the first IP address and/or the first BAP layer configuration information.

According to the communication method shown in FIG. 12, after obtaining the first IP address and/or the first BAP layer configuration information, the second node may not first use the configuration, and after receiving the first configuration effectiveness information, communicate with the CU of the source donor node or the CU of the target donor node by using the first IP address and/or the first BAP layer configuration information, so that when the first node is connected to a plurality of donor nodes, or when a DU part of the first node and the MT part of the first node are not managed by a same donor node, the second node can normally communicate with the CU of the source donor node or the CU of the target donor node.

For example, FIG. 13 is a schematic flowchart of yet another communication method according to an embodiment of this application. As shown in FIG. 13, the communication method includes the following steps:

S1301: A source donor node determines that a first condition is met, and sends a first message to a second node. Correspondingly, the second node receives the first message from the source donor node.

The first condition includes: a release message or a handover success message from a target donor node is received; indication information from the target donor node indicating that a mobile terminal MT part of a first node has been successfully connected to the target donor node is received; or it is determined that a control plane of an F1 interface of the first node has been handed over to a second internet protocol IP address.

The release message may indicate the source donor node to release the MT part of the first node.

For example, the release message may include a context notification message for releasing the MT part of the first node.

For example, the handover success message may indicate that the MT part of the first node has been successfully handed over from being connected to the source donor node to being connected to the target donor node. As shown in the intermediate state 1 shown in FIG. 4, the MT 1 of the first node has been connected to the target parent node.

Optionally, after receiving an RRC reconfiguration complete message of the MT part of the first node, the target donor node may send, to the source donor node through an Xn interface between the target donor node and the source donor node, indication information indicating that the mobile terminal MT part of the first node has been successfully connected to the target donor node.

For example, the second IP address may be used by the first node to communicate with a CU of the source donor node by using a DU of the target donor node. In this way, when the first node communicates with the CU of the source donor node by using the second IP address, it may indicate that the MT part of the first node has been successfully connected to the target donor node.

For example, the first message includes a first IP address and/or first backhaul adaptation protocol BAP layer configuration information.

For example, the first IP address may be used by the second node to communicate with the CU of the source donor node, a CU of the target donor node, or another node (for example, an OAM server) by using the DU of the target donor node. For a specific implementation of the first IP address, refer to S1201.

For example, the first BAP layer configuration information may be used by the second node to communicate with the CU of the source donor node or the CU of the target donor node. For a specific implementation of the first BAP layer configuration information, refer to S1201.

Optionally, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. Optionally, the next-hop node of the second node is a next-hop node of the second node during uplink transmission, that is, a parent node of the second node. The first link is a link between the second node and the next-hop node of the second node. For a specific implementation of the first BAP layer configuration information, refer to S1201.

In some embodiments, the communication method provided in this embodiment of this application may further include: The source donor node sends the first IP address and/or the first BAP layer configuration information to the second node by using an RRC message or an F1AP message. Correspondingly, the second node receives the first IP address and/or the first BAP layer configuration information from the source donor node by using the RRC message or the F1AP message.

In some embodiments, the communication method provided in this embodiment of this application may further include: The CU part of target donor node sends the first IP address and/or the first BAP layer configuration information to the second node by using an RRC message. Correspondingly, the second node receives the first IP address and/or the first BAP layer configuration information from the target donor node by using the RRC message or the F1AP message.

S1302: The second node communicates with the CU of the source donor node or the CU of the target donor node by using the first IP address and/or the first BAP layer configuration information.

According to the communication method shown in FIG. 13, after determining that the MT part of the first node has been successfully connected to the target donor node, the source donor node sends the first IP address and/or the first BAP layer configuration information to the second node, to enable the second node to communicate with the CU of the source donor node or the CU of the target donor node by using the first IP address and/or the first BAP layer configuration information, so that when the first node is connected to a plurality of donor nodes, or when a DU part of the first node and the MT part of the first node are not managed by a same donor node, the second node can normally communicate with the CU of the source donor node or the CU of the target donor node.

For example, FIG. 14 is a schematic flowchart of still yet another communication method according to an embodiment of this application. As shown in FIG. 14, the communication method includes the following steps:

S1401: A source donor node sends a first IP address and/or first BAP layer configuration information to a first node. Correspondingly, the first node receives the first internet protocol IP address and/or backhaul adaptation protocol BAP layer configuration information from the source donor node.

For example, the first IP address is used by a second node to communicate with a central unit CU of the source donor node or a CU of a target donor node by using a distributed unit DU of the target donor node. For a specific implementation of the first IP address, refer to S1201.

For example, the first BAP layer configuration information is used by the second node to communicate with the CU of the source donor node or the CU of the target donor node. For a specific implementation of the first BAP layer configuration information, refer to S1201.

In some embodiments, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. Optionally, the next-hop node of the second node is a next-hop node of the second node during uplink transmission, that is, a parent node of the second node. The first link is a link between the second node and the next-hop node of the second node. For a specific implementation of the first BAP layer configuration information, refer to S1201.

S1402: The source donor node sends first sending indication information to the first node. Correspondingly, the first node receives the first sending indication information from the source donor node.

The first sending indication information may indicate the first node to send the first IP address and/or the first BAP layer configuration information to the second node after the first node successfully establishes a connection to a target parent node.

S1403: After the first node successfully establishes the connection to the target parent node, the first node sends the first IP address and/or the first BAP layer configuration information to the second node. Correspondingly, the second node receives the first IP address and/or the first BAP layer configuration information from the first node.

For example, after a control plane of an F1 interface of the first node is handed over to a second IP address, the first node sends the first IP address and/or the first BAP layer configuration information to the second node. For a specific implementation of the second IP address, refer to S1301.

S1404: The second node communicates with the CU of the source donor node, the CU of the target donor node, or another node (for example, an OAM server) by using the first IP address and/or the first BAP layer configuration information.

According to the communication method shown in FIG. 14, the first node sends, based on an indication of the source donor node, the first IP address and/or the first BAP layer configuration information to the second node after the first node successfully establishes the connection to the target parent node, to enable the second node to communicate with the CU of the source donor node or the CU of the target donor node by using the first IP address and/or the first BAP layer configuration information, so that when the first node is connected to a plurality of donor nodes, or when a DU part of the first node and an MT part of the first node are not managed by a same donor node, the second node can normally communicate with the CU of the source donor node or the CU of the target donor node.

The foregoing describes in detail the communication methods provided in embodiments of this application with reference to FIG. 8 to FIG. 14. The following describes in detail communication apparatuses provided in embodiments of this application with reference to FIG. 15 to FIG. 19.

Figure 15:
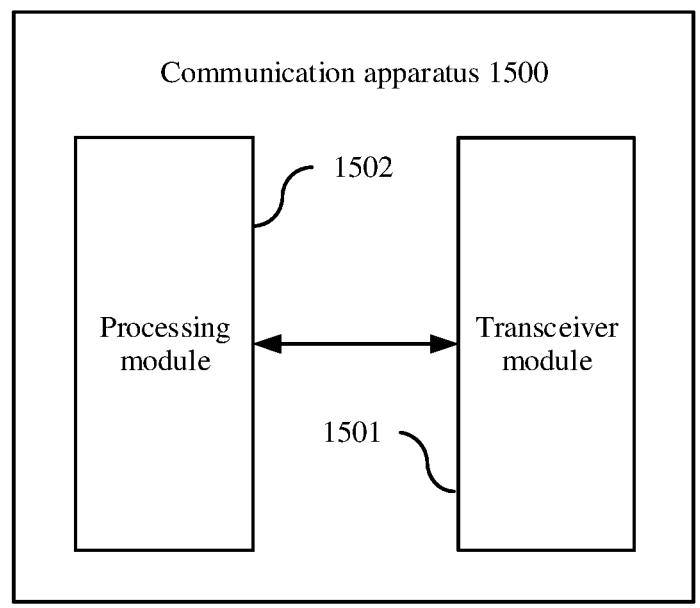
FIG. 15 to FIG. 19 each are example schematic diagrams of a structure of a communication apparatus according to an embodiment of this application.

For example, FIG. 15 is a schematic diagram 1 of a structure of a communication apparatus according to an embodiment of this application. As shown in FIG. 15, the communication apparatus 1500 includes a transceiver module 1501 and a processing module 1502. For ease of description, FIG. 15 shows only main components of the communication apparatus.

In a possible implementation, the communication apparatus 1500 is applicable to the communication system shown in FIG. 3, and performs a function of the source donor node in the communication method shown in FIG. 8 or FIG. 11.

The transceiver module 1501 is configured to receive one or more of the following items from a target donor node: first resource configuration information, sixth resource configuration information, or first information. The processing module 1502 is configured to determine third resource configuration information, including: determining the third resource configuration information based on the first resource configuration information, or determining the third resource configuration information based on the sixth resource configuration information and/or the first information. The transceiver module 1501 is further configured to send the third resource configuration information to a first node.

The first resource configuration information includes current resource configuration information of a target cell, the sixth resource configuration information includes resource reconfiguration information of the target cell, the target cell is a cell served by a target parent node, and the target parent node is used by the first node to connect to the target donor node. The first information includes resource configuration information that is of a first cell and that is determined by the target donor node, and the first cell is a cell served by the first node. The third resource configuration information is used for resource configuration of the first cell.

In a possible implementation, the processing module 1502 is further configured to determine the third resource configuration information based on the first resource configuration information and second resource configuration information. The second resource configuration information may include current resource configuration information of the first cell.

In a possible implementation, the processing module 1502 is further configured to determine the third resource configuration information based on the sixth resource configuration information and/or the first information and the second resource configuration information. The second resource configuration information may include the current resource configuration information of the first cell.

In a possible implementation, the processing module 1502 is further configured to determine second information based on the second resource configuration information. The second resource configuration information may include the current resource configuration information of the first cell, and the second information may include resource configuration information that is of the target cell and that is determined by a source donor node.

In a possible implementation, the processing module 1502 is further configured to determine the second information based on the second resource configuration information and the first resource configuration information. The second resource configuration information may include the current resource configuration information of the first cell, and the second information may include the resource configuration information that is of the target cell and that is determined by the source donor node.

In a possible implementation, the transceiver module 1501 is further configured to send the second information to the target donor node.

In a possible implementation, the processing module 1502 is further configured to determine fifth resource configuration information based on the third resource configuration information and/or the first resource configuration information. The fifth resource configuration information includes resource reconfiguration information of a second cell, the second cell is a cell served by a second node, and the second node is connected to the source donor node via the first node.

In a possible implementation, the processing module 1502 is further configured to determine the fifth resource configuration information based on the third resource configuration information and/or the first resource configuration information and fourth resource configuration information. The fourth resource configuration information may include current resource configuration information of the second cell, the second cell may be the cell served by the second node, the second node is connected to the source donor node via the first node, and the fifth resource configuration information may include the resource reconfiguration information of the second cell.

In a possible implementation, the processing module 1502 is further configured to determine the fifth resource configuration information based on one or more of the sixth resource configuration information, the first information, and the third resource configuration information. The fifth resource configuration information may include the resource reconfiguration information of the second cell, the second cell may be the cell served by the second node, and the second node is connected to the source donor node via the first node.

In a possible implementation, the processing module 1502 is further configured to determine the fifth resource configuration information based on the fourth resource configuration information and one or more of the sixth resource configuration information, the first information, and the third resource configuration information. The fourth resource configuration information may include the current resource configuration information of the second cell, the fifth resource configuration information may include the resource reconfiguration information of the second cell, the second cell is the cell served by the second node, and the second node is connected to the source donor node via the first node.

In a possible implementation, the transceiver module 1501 is further configured to send the fifth resource configuration information to the second node.

In a possible implementation, the transceiver module 1501 is further configured to send second effectiveness indication information to the second node. The second effectiveness indication information indicates that the fifth resource configuration information is effective.

In a possible implementation, the transceiver module 1501 is further configured to send the third resource configuration information to the target donor node.

In a possible implementation, the transceiver module 1501 is further configured to send a first request message to the target donor node. The first request message may be used to request to hand over a donor node of the first node from the source donor node to the target donor node, or used to request to use the target donor node as a secondary node of the first node.

In a possible implementation, the first request message may include one or more of the following: first indication information, an identifier of the target cell, or the second resource configuration information. The first indication information may indicate that the first node is an integrated access and backhaul IAB node, and the second resource configuration information may include the current resource configuration information of the first cell.

In a possible implementation, the transceiver module 1501 is further configured to receive a first response message from the target donor node. The first response message may be used to determine to hand over the donor node of the first node from the source donor node to the target donor node, or used to determine to use the target donor node as the secondary node of the first node.

In a possible implementation, the first response message may include one or more of the following: the first resource configuration information, the sixth resource configuration information, or the first information.

In a possible implementation, the transceiver module 1501 is further configured to send second indication information to the target donor node. The second indication information may indicate whether the source donor node uses the first information as resource reconfiguration information of the first cell.

In a possible implementation, the transceiver module 1501 is further configured to receive third indication information from the target donor node. The third indication information may indicate whether the target donor node uses the second information as the resource reconfiguration information of the target cell.

In a possible implementation, the transceiver module 1501 is further configured to send first effectiveness indication information to the first node. The first effectiveness indication information indicates that the third resource configuration information is effective.

It should be noted that the transceiver module 1501 may include a receiving module and a sending module. The receiving module is configured to receive data and/or signaling from target donor node, the first node, or the second node. The sending module is configured to send data and/or signaling to the target donor node, the first node, or the second node. A specific implementation of the transceiver module is not specifically limited in this application.

Optionally, the communication apparatus 1500 may further include a storage module (not shown in FIG. 15). The storage module stores a program or instructions. When the processing module executes the program or the instructions, the communication apparatus 1500 may perform the function of the source donor node in the communication method shown in FIG. 8 or FIG. 11.

It should be noted that the communication apparatus 1500 may be the target donor node shown in FIG. 3, or may be a chip (system) or another part or component that may be disposed on the target donor node. This is not limited in this application.

In addition, for a technical effect of the communication apparatus 1500, refer to the technical effect of the communication method shown in FIG. 8 or FIG. 11.

In another possible implementation, the communication apparatus 1500 shown in FIG. 15 is applicable to the communication system shown in FIG. 3, and performs a function of the target donor node in the communication method shown in FIG. 8 or FIG. 11.

The transceiver module 1501 is configured to receive one or more of the following items from a source donor node: second resource configuration information, third resource configuration information, or second information. The processing module 1502 is configured to determine sixth resource configuration information, including: determining the sixth resource configuration information based on the second resource configuration information, or determining the sixth resource configuration information based on the third resource configuration information and/or the second information. The transceiver module 1501 is further configured to send the sixth resource configuration information to a target parent node.

The second resource configuration information includes current resource configuration information of a first cell, the third resource configuration information includes resource reconfiguration information of the first cell, the first cell is a cell served by a first node, the second information includes resource configuration information that is of a target cell and that is determined by the source donor node, the target cell is a cell served by the target parent node, the target parent node is used by the first node to connect to a target donor node, and the sixth resource configuration information is used for resource configuration of the target cell.

In a possible implementation, the processing module 1502 is further configured to determine the sixth resource configuration information based on the second resource configuration information and/or first resource configuration information. The first resource configuration information may include current resource configuration information of the target cell.

In a possible implementation, the processing module 1502 is further configured to determine the sixth resource configuration information based on the third resource configuration information and/or the second information and the first resource configuration information. The first resource configuration information may include the current resource configuration information of the target cell.

In a possible implementation, the processing module 1502 is further configured to determine first information based on the first resource configuration information. The first resource configuration information may include the current resource configuration information of the target cell, and the first information may include the resource configuration information that is of the first cell and that is determined by the target donor node.

In a possible implementation, the processing module 1502 is further configured to determine the first information based on the first resource configuration information and the second resource configuration information. The first resource configuration information may include the current resource configuration information of the target cell, and the first information may include the resource configuration information that is of the first cell and that is determined by the target donor node.

In a possible implementation, the transceiver module 1501 is further configured to send the first information to the source donor node.

In a possible implementation, the processing module 1502 is further configured to determine eighth resource configuration information based on the second resource configuration information and/or the sixth resource configuration information. The eighth resource configuration information may include resource reconfiguration information of a third cell, the third cell may be a cell served by a third node, and the third node is connected to the target donor node by using the target parent node.

In a possible implementation, the processing module 1502 is further configured to determine the eighth resource configuration information based on the second resource configuration information and/or the sixth resource configuration information and seventh resource configuration information. The seventh resource configuration information may include current resource configuration information of the third cell, the third cell is the cell served by the third node, the third node is connected to the target donor node by using the target parent node, and the eighth resource configuration information may include the resource reconfiguration information of the third cell.

In a possible implementation, the processing module 1502 is further configured to determine the eighth resource configuration information based on one or more of the third resource configuration information, the second information, and the sixth resource configuration information. The eighth resource configuration information may include the resource reconfiguration information of the third cell, the third cell may be the cell served by the third node, and the third node is connected to the target donor node by using the target parent node.

In a possible implementation, the processing module 1502 is further configured to determine the eighth resource configuration information based on the seventh resource configuration information and one or more of the third resource configuration information, the second information, and the sixth resource configuration information. The seventh resource configuration information may include the current resource configuration information of the third cell, the eighth resource configuration information may include the resource reconfiguration information of the third cell, the third cell may be the cell served by the third node, and the third node is connected to the target donor node by using the target parent node.

In a possible implementation, the transceiver module 1501 is further configured to send the eighth resource configuration information to the third node.

In a possible implementation, the transceiver module 1501 is further configured to send the sixth resource configuration information to the source donor node.

In a possible implementation, the transceiver module 1501 is further configured to receive a first request message from the source donor node. The first request message may be used to request to hand over a donor node of the first node from the source donor node to the target donor node, or used to request to use the target donor node as a secondary node of the first node.

In a possible implementation, the first request message may include one or more of the following: first indication information, an identifier of the target cell, or the second resource configuration information. The first indication information may indicate that the first node is an integrated access and backhaul IAB node, and the second resource configuration information may include the current resource configuration information of the first cell.

In a possible implementation, the transceiver module 1501 is further configured to send a first response message to the source donor node. The first response message may be used to determine to hand over the donor node of the first node from the source donor node to the target donor node, or used to determine to use the target donor node as the secondary node of the first node.

In a possible implementation, the first response message may include one or more of the following: the first resource configuration information, the sixth resource configuration information, or the first information.

In a possible implementation, the transceiver module 1501 is further configured to receive second indication information from the source donor node. The second indication information may indicate whether the source donor node uses the first information as resource reconfiguration information of the first cell.

In a possible implementation, the transceiver module 1501 is further configured to send third indication information to the source donor node. The third indication information may indicate whether the target donor node uses the second information as the resource reconfiguration information of the target cell.

In a possible implementation, the transceiver module 1501 is further configured to send first effectiveness indication information to the first node. The first effectiveness indication information may indicate that the third resource configuration information is effective.

In a possible implementation, the transceiver module 1501 is further configured to send third effectiveness indication information to the third node. The third effectiveness indication information may indicate that the eighth resource configuration information is effective.

In a possible implementation, the transceiver module 1501 is further configured to send fourth effectiveness indication information to the target parent node. The fourth effectiveness indication information may indicate that the sixth resource configuration information is effective.

It should be noted that the transceiver module 1501 may include a receiving module and a sending module. The receiving module is configured to receive data and/or signaling from the source donor node, the first node, the second node, the target parent node, or the third node. The sending module is configured to send data and/or signaling to the source donor node, the first node, the second node, the target parent node, or the third node. A specific implementation of the transceiver module is not specifically limited in this application.

Optionally, the communication apparatus 1500 may further include a storage module (not shown in FIG. 15). The storage module stores a program or instructions. When the processing module executes the program or the instructions, the communication apparatus 1500 may perform the function of the target donor node in the communication method shown in FIG. 8 or FIG. 11.

It should be noted that the communication apparatus 1500 may be the target donor node shown in FIG. 3, or may be a chip (system) or another part or component that may be disposed on the target donor node. This is not limited in this application.

In addition, for a technical effect of the communication apparatus 1500, refer to the technical effect of the communication method shown in FIG. 8 or FIG. 11.

In still another possible implementation, the communication apparatus 1500 is applicable to the communication system shown in FIG. 3, and performs a function of the first node in the communication method shown in FIG. 8 or FIG. 11.

The transceiver module 1501 is configured to receive third resource configuration information from a source donor node. The processing module 1502 is configured to determine that the third resource configuration information is effective, including: receiving first effectiveness indication information from a target donor node, a target parent node, or the source donor node, or establishing a connection to the target parent node; and performing resource configuration on a first cell based on the third resource configuration information. The third resource configuration information is used for resource configuration of the first cell, the first cell is a cell served by a first node, and the first effectiveness indication information indicates that the third resource configuration information is effective.

In a possible implementation, the transceiver module 1501 is further configured to send second effectiveness indication information to the second node. The second effectiveness indication information may indicate that fifth resource configuration information is effective.

It should be noted that the transceiver module 1501 may include a receiving module and a sending module. The receiving module is configured to receive data and/or signaling from the source donor node, a second node, the target parent node, or the target donor node. The sending module is configured to send data and/or signaling to the source donor node, the second node, the target parent node, or the target donor node. A specific implementation of the transceiver module is not specifically limited in this application.

Optionally, the communication apparatus 1500 may further include a storage module (not shown in FIG. 15). The storage module stores a program or instructions. When the processing module executes the program or the instructions, the communication apparatus 1500 may perform the function of the first node in the communication method shown in FIG. 8 or FIG. 11.

It should be noted that the communication apparatus 1500 may be the first node shown in FIG. 3, or may be a chip (system) or another part or component that may be disposed on the first node. This is not limited in this application.

In addition, for a technical effect of the communication apparatus 1500, refer to the technical effect of the communication method shown in FIG. 8 or FIG. 11.

In yet another possible implementation, the communication apparatus 1500 is applicable to the communication system shown in FIG. 3, and performs a function of the target parent node in the communication method shown in FIG. 8 or FIG. 11.

The transceiver module 1501 is further configured to receive sixth resource configuration information from a target donor node and determine that the sixth resource configuration information is effective, including: receiving fourth effectiveness indication information from the target donor node, or establishing a connection to a first node; and performing resource configuration on a target cell based on the sixth resource configuration information. The sixth resource configuration information may be used for resource configuration of the target cell, the target cell is a cell served by a target parent node, and the target parent node may be used by the first node to connect to the target donor node, and the fourth effectiveness indication information indicates that the sixth resource configuration information is effective.

In a possible implementation, the transceiver module 1501 is further configured to send third effectiveness indication information to a third node. The third effectiveness indication information may indicate that eighth resource configuration information is effective.

In a possible implementation, the transceiver module 1501 is further configured to send first effectiveness indication information to the first node. The first effectiveness indication information indicates that the third resource configuration information is effective.

It should be noted that the transceiver module 1501 may include a receiving module and a sending module. The receiving module is configured to receive data and/or signaling from a source donor node, a second node, a first node, or the target donor node. The sending module is configured to send data and/or signaling to the source donor node, the second node, the first node, or the target donor node. A specific implementation of the transceiver module is not specifically limited in this application.

Optionally, the communication apparatus 1500 may further include a storage module (not shown in FIG. 15). The storage module stores a program or instructions. When the processing module executes the program or the instructions, the communication apparatus 1500 may perform the function of the target father node in the communication method shown in FIG. 8 or FIG. 11.

It should be noted that the communication apparatus 1500 may be the target father node shown in FIG. 3, or may be a chip (system) or another part or component that may be disposed on the target father node. This is not limited in this application.

In addition, for a technical effect of the communication apparatus 1500, refer to the technical effect of the communication method shown in FIG. 8 or FIG. 11.

Figure 16:
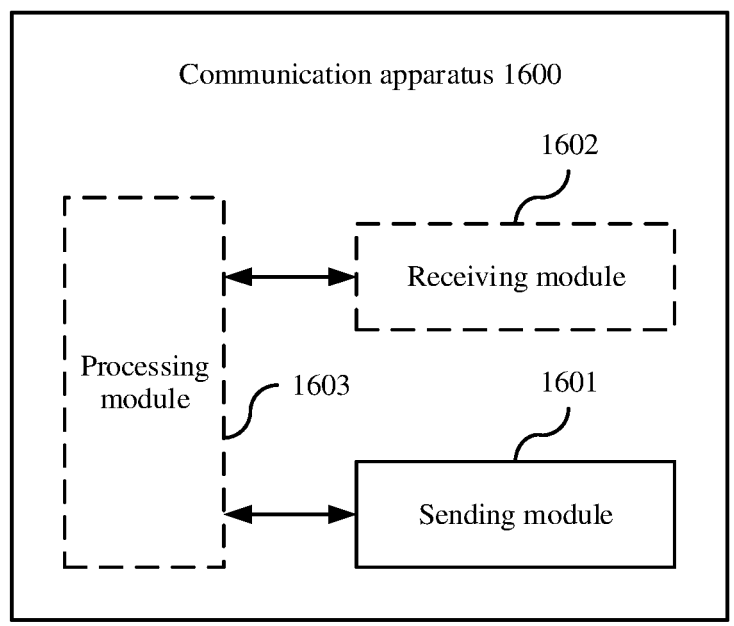

For example, FIG. 16 is a schematic diagram 2 of a structure of a communication apparatus according to an embodiment of this application. As shown in FIG. 16, the communication apparatus 1600 includes a sending module 1601. For ease of description, FIG. 16 shows only main components of the communication apparatus.

In a possible implementation, the communication apparatus 1600 is applicable to the communication system shown in FIG. 3, and performs a function of the first node in the communication method shown in FIG. 12.

The sending module 1601 is configured to send first configuration effectiveness information to a second node. The first configuration effectiveness information indicates effectiveness of a first internet protocol (IP) address and/or effectiveness of first backhaul adaptation protocol (BAP) layer configuration information, the first IP address is used by the second node to communicate with a central unit (CU) of a source donor node or a CU of a target donor node by using a distributed unit (DU) of the target donor node, and the first BAP layer configuration information is used by the second node to communicate with the CU of the source donor node or the CU of the target donor node.

In a possible implementation, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

In a possible implementation, the first configuration effectiveness information may be carried in a protocol data unit PDU or a data link layer control element MAC CE at a BAP layer.

In a possible implementation, the first configuration effectiveness information may include a first index value and/or a second index value, the first index value is used to indicate at least one first IP address, and the second index value is used to indicate at least one piece of first BAP layer configuration information.

In a possible implementation, the first configuration effectiveness information may include an identifier of the target donor node.

Optionally, the communication apparatus 1600 may further include a receiving module 1602, a processing module 1603, and a storage module (not shown in FIG. 16). The receiving module 1602 may be configured to receive data and/or signaling from the target donor node, the source donor node, or the second node. The storage module stores a program or instructions. When the processing module 1603 executes the program or the instructions, the communication apparatus 1600 may perform the function of the first node in the communication method shown in FIG. 12.

It should be noted that the communication apparatus 1600 may be the first node shown in FIG. 3, or may be a chip (system) or another part or component that may be disposed on the first node. This is not limited in this application.

In addition, for a technical effect of the communication apparatus 1600 shown in FIG. 16, refer to the technical effect of the communication method shown in FIG. 12.

Figure 17:
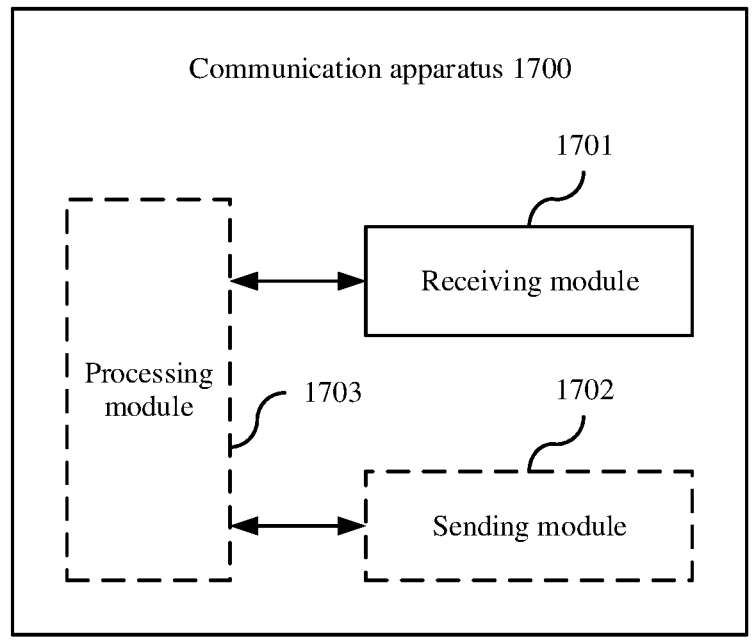

For example, FIG. 17 is a schematic diagram 3 of a structure of a communication apparatus according to an embodiment of this application. As shown in FIG. 17, the communication apparatus 1700 includes a receiving module 1701. For ease of description, FIG. 17 shows only main components of the communication apparatus.

In a possible implementation, the communication apparatus 1700 is applicable to the communication system shown in FIG. 3, and performs a function of the second node in the communication method shown in FIG. 12.

The receiving module 1701 is configured to receive first configuration effectiveness information from a first node. The first configuration effectiveness information indicates effectiveness of a first internet protocol IP address and/or effectiveness of first backhaul adaptation protocol BAP layer configuration information, the first IP address is used by a second node to communicate with a central unit CU of a source donor node or a CU of a target donor node by using a distributed unit DU of the target donor node, and the first BAP layer configuration information is used by the second node to communicate with the CU of the source donor node or the CU of the target donor node.

In a possible implementation, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

In a possible implementation, the first configuration effectiveness information may be carried in a protocol data unit PDU or a data link layer control element MAC CE at a BAP layer.

In a possible implementation, the first configuration effectiveness information may include a first index value and/or a second index value, the first index value is used to indicate at least one first IP address, and the second index value is used to indicate at least one piece of first BAP layer configuration information.

In a possible implementation, the first configuration effectiveness information may include an identifier of the target donor node.

Optionally, the communication apparatus 1700 may further include a sending module 1702, a processing module 1703, and a storage module (not shown in FIG. 17). The sending module 1702 may be configured to send data and/or signaling to the target donor node, the source donor node, or the first node. The storage module stores a program or instructions. When the processing module 1703 executes the program or the instructions, the communication apparatus 1700 may perform the function of the second node in the communication method shown in FIG. 12.

It should be noted that the communication apparatus 1700 may be the second node shown in FIG. 3, or may be a chip (system) or another part or component that may be disposed on the second node. This is not limited in this application.

In addition, for a technical effect of the communication apparatus 1700 shown in FIG. 17, refer to the technical effect of the communication method shown in FIG. 12.

Figure 18:
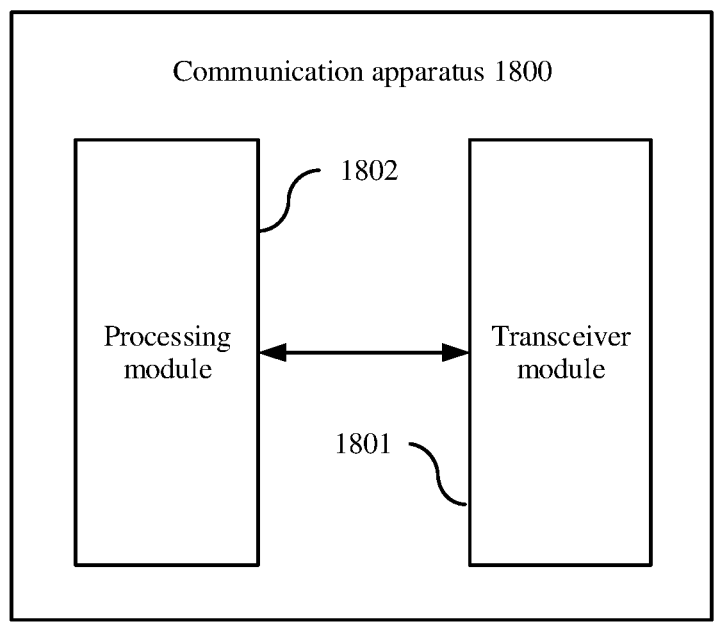

For example, FIG. 18 is a schematic diagram 4 of a structure of a communication apparatus according to an embodiment of this application. As shown in FIG. 18, the communication apparatus 1800 includes a transceiver module 1801 and a processing module 1802. For ease of description, FIG. 18 shows only main components of the communication apparatus.

In a possible implementation, the communication apparatus 1800 is applicable to the communication system shown in FIG. 3, and performs a function of the source donor node in the communication method shown in FIG. 13.

The processing module 1802 is configured to determine that a first condition is met. The transceiver module 1801 is configured to send a first message to a second node.

The first condition includes: a release message or a handover success message from a target donor node is received; indication information from the target donor node indicating that a mobile terminal MT part of a first node has been successfully connected to the target donor node is received; or it is determined that a control plane of an F1 interface of the first node has been handed over to a second internet protocol IP address.

The release message indicates a source donor node to release the MT part of the first node, the handover success message indicates that the MT part of the first node has been successfully handed over from being connected to the source donor node to being connected to the target donor node, and the second IP address is used by the first node to communicate with a central unit CU of the source donor node by using a DU of the target donor node.

For example, the first message includes a first IP address and/or first backhaul adaptation protocol BAP layer configuration information, the first IP address is used by the second node to communicate with the CU of the source donor node or a CU of the target donor node by using the DU of the target donor node, and the first BAP layer configuration information is used by the second node to communicate with the CU of the source donor node or the CU of the target donor node.

In a possible implementation, the first BAP layer configuration information may include one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

It should be noted that the transceiver module 1801 may include a receiving module and a sending module. The receiving module is configured to receive data and/or signaling from the second node, the first node, or the target donor node. The sending module is configured to send data and/or signaling to the second node, the first node, or the target donor node. A specific implementation of the transceiver module is not specifically limited in this application.

Optionally, the communication apparatus 1800 may further include a storage module (not shown in FIG. 18). The storage module stores a program or instructions. When the processing module executes the program or the instructions, the communication apparatus 1800 may perform the function of the source donor node in the communication method shown in FIG. 13.

It should be noted that the communication apparatus 1800 may be the source donor node shown in FIG. 3, or may be a chip (system) or another part or component that may be disposed on the source donor node. This is not limited in this application.

In addition, for a technical effect of the communication apparatus 1800, refer to the technical effect of the communication method shown in FIG. 13.

In a possible implementation, the communication apparatus 1800 is applicable to the communication system shown in FIG. 3, and performs a function of the source donor node in the communication method shown in FIG. 14.

The transceiver module 1801 is configured to receive the first internet protocol IP address and/or the first backhaul adaptation protocol BAP layer configuration information from the source donor node. The transceiver module 1801 is further configured to receive first sending indication information from the source donor node. The processing module 1802 is configured to: after the first node successfully establishes a connection to a target parent node, control the transceiver module 1801 to send the first IP address and/or the first BAP layer configuration information to the second node.

The first IP address is used by the second node to communicate with the central unit CU of the source donor node or the CU of the target donor node by using the distributed unit DU of the target donor node, the first BAP layer configuration information is used by the second node to communicate with the CU of the source donor node or the CU of the target donor node, and the first sending indication information indicates the first node to send the first IP address and/or the first BAP layer configuration information to the second node after the first node successfully establishes the connection to the target parent node.

In a possible implementation, the first BAP layer configuration information includes one or more of the following: a first BAP routing identifier, a BAP address of a next-hop node of the second node, an identifier of a default backhaul BH radio link control RLC channel on a first link, an identifier of a BH RLC channel that corresponds to one or more F1 interface user plane tunnels and that is on the first link, an identifier of a BH RLC channel that corresponds to a terminal device UE-related F1AP message and that is on the first link, an identifier of a BH RLC channel that corresponds to a non-UE-related F1AP message and that is on the first link, or an identifier of a BH RLC channel that corresponds to a non-F1 interface non-F1 service and that is on the first link. The next-hop node of the second node is a next-hop node of the second node during uplink transmission, that is, a parent node of the second node. The first link is a link between the second node and the next-hop node of the second node.

It should be noted that the transceiver module 1801 may include a receiving module and a sending module. The receiving module is configured to receive data and/or signaling from the second node, the source donor node, or the target donor node. The sending module is configured to send data and/or signaling to the second node, the source donor node, or the target donor node. A specific implementation of the transceiver module is not specifically limited in this application.

Optionally, the communication apparatus 1800 may further include a storage module (not shown in FIG. 18). The storage module stores a program or instructions. When the processing module executes the program or the instructions, the communication apparatus 1800 may perform the function of the first node in the communication method shown in FIG. 14.

It should be noted that the communication apparatus 1800 may be the first node shown in FIG. 3, or may be a chip (system) or another part or component that may be disposed on the first node. This is not limited in this application.

In addition, for a technical effect of the communication apparatus 1800, refer to the technical effect of the communication method shown in FIG. 14.

Figure 19:
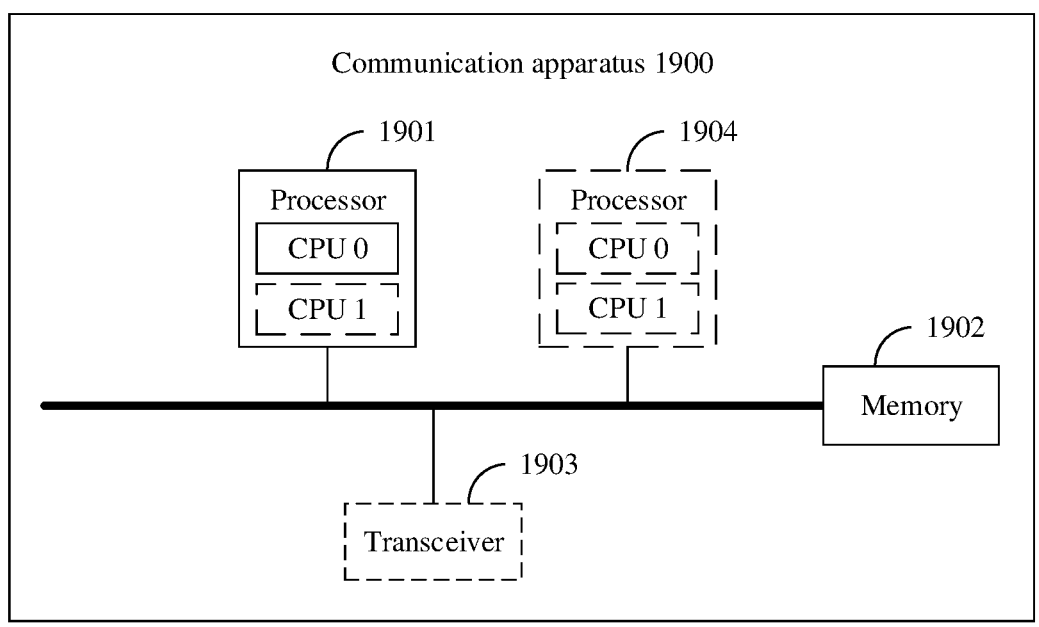

FIG. 19 is a schematic diagram 5 of a structure of a communication apparatus 1900 that can be configured to perform a communication method according to an embodiment of this application. The communication apparatus 1900 may be a source donor node, a target donor node, a first node, or a target parent node, such as the source donor node, the target donor node, the first node, or the target parent node in FIG. 3, or may be a chip applied to the source donor node, the target donor node, the first node, or the target parent node, or another component that has a function of the source donor node, the target donor node, the first node, or the target parent node.

As shown in FIG. 19, the communication apparatus 1900 may include a processor 1901 and a memory 1902. Optionally, the communication apparatus 1900 may further include a transceiver 1903. The processor 1901 is coupled to the memory 1902 and the transceiver 1903, for example, may be connected through a communication bus.

The following describes components of the communication apparatus 1900 in detail with reference to FIG. 19.

The processor 1901 is a control center of the communication apparatus 1900, and may be a processor, or may be a general name of a plurality of processing elements. For example, the processor 1901 is one or more central processing units (CPUs), or may be an application-specific integrated circuit (ASIC), or is configured as one or more integrated circuits that implement embodiments of this application, for example, one or more microprocessors (DSPs), or one or more field programmable gate arrays (FPGAs).

The processor 1901 may execute various functions of the communication apparatus 1900 by running or executing software programs stored in the memory 1902, and invoking data stored in the memory 1902.

During specific implementation, in an embodiment, the processor 1901 may include one or more CPUs, for example, a CPU 0 and a CPU 1 shown in FIG. 19.

During specific implementation, in an embodiment, the communication apparatus 1900 may alternatively include a plurality of processors, for example, the processor 1901 and a processor 1904 shown in FIG. 19. Each of the processors may be a single-core processor (single-CPU), or may be a multi-core processor (multi-CPU). The processor may be one or more communication devices, circuits, and/or processing cores configured to process data (for example, computer program instructions).

The memory 1902 may be a read-only memory (ROM) or another type of static storage communication device that can store static information and instructions, or a random access memory (RAM) or another type of dynamic storage communication device that can store information and instructions, or may be an electrically erasable programmable read-only memory (EEPROM), a compact disc read-only memory (CD-ROM) or other optical disk storage, optical disc storage (including a compressed optical disc, a laser disc, an optical disc, a digital versatile disc, a Blu-ray disc, or the like), a magnetic disk storage medium or another magnetic storage communication device, or any other medium that can be used to carry or store expected program code in a form of an instruction or a data structure and that can be accessed by a computer, but is not limited thereto. The memory 1902 may be integrated with the processor 1901, or may exist independently, and is coupled to the processor 1901 through an input/output port (not shown in FIG. 19) of the communication apparatus 1900. This is not specifically limited in this embodiment of this application.

The memory 1902 is configured to store a software program for executing the solutions of this application, and the processor 1901 controls execution of the software program. For the foregoing specific implementation, refer to the following method embodiments.

The transceiver 1903 is configured to communicate with another communication apparatus. For example, the communication apparatus 1900 is a communication device, and the transceiver 1903 may be configured to communicate with a first network device. For another example, the communication apparatus 1900 is a first network device, and the transceiver 1903 may be configured to communicate with a communication device or communicate with a second network device. For still another example, the communication apparatus 1900 is a second network device, and the transceiver 1903 may be configured to communicate with a first network device. In addition, the transceiver 1903 may include a receiver and a transmitter (not separately shown in FIG. 19). The receiver is configured to implement a receiving function, and the transmitter is configured to implement a sending function. The transceiver 1903 may be integrated with the processor 1901, or may exist independently, and is coupled to the processor 1901 through the input/output port (not shown in FIG. 19) of the communication apparatus 1900. This is not specifically limited in this embodiment of this application.

It should be noted that a structure of the communication apparatus 1900 shown in FIG. 19 does not constitute a limitation on the communication apparatus. An actual communication apparatus may include more or fewer components than those shown in the figure, or combine some components, or have different component arrangements.

An embodiment of this application provides a communication system. The system includes a source donor node, a first node, and a target donor node, or the system includes a target donor node, a target parent node, and a source donor node, or the system includes a source donor node and one or more second nodes, or the system includes a first node and one or more second nodes, or the system includes a source donor node, a first node, a target donor node, and a target parent node, or the system includes a source donor node, a first node, a target donor node, a target parent node, and a second node.

An embodiment of this application provides a chip system. The chip system includes a processor and an input/ output port. The processor is configured to implement a processing function in the communication method provided in embodiments of this application. The input/output port is configured to implement a transceiver function in the communication method provided in embodiments of this application.

In a possible implementation, the chip system further includes a memory. The memory is configured to store program instructions and data that implement functions related to the communication method provided in embodiments of this application.

The chip system may include a chip, or may include a chip and another discrete component.

An embodiment of this application provides a computer-readable storage medium. The computer-readable storage medium includes a computer program or instructions. When the computer program or the instructions are run on a computer, the computer is enabled to perform the communication method provided in embodiments of this application.

An embodiment of this application provides a computer program product. The computer program product includes a computer program or instructions. When the computer program or the instructions are run on a computer, the computer is enabled to perform the communication method provided in embodiments of this application.

It should be understood that, the processor in embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. Through an example rather than a limitative description, random access memories (RAM) in many forms may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

All or some of the foregoing embodiments may be implemented by using software, hardware (for example, circuit), firmware, or any combination thereof. When software is used for implementation, all or some of the foregoing embodiments may be implemented in a form of a computer program product. The computer program product includes one or more computer instructions or computer programs. When the computer instructions or the computer programs are loaded and executed on the computer, the procedure or functions according to embodiments of this application are all or partially generated. The computer may be a target donor node, a source donor node, a first node, a target parent node, a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects, and represents that at least three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units or modules, and algorithm steps can be implemented by electronic hardware or a combination of computer software and electronic hardware. Whether the functions are performed by hardware or software depends on particular applications and implementation constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit or module, refer to a corresponding process in the foregoing method embodiments.

In the several embodiments provided in this application, it should be understood that the disclosed system, apparatus, and method may be implemented in other manners. For example, the described apparatus embodiments are merely examples. For example, division into the units or modules is merely logical function division, or may be other division during actual implementation. For example, a plurality of units or modules may be combined or integrated into another system, some units or modules may be ignored, or functions corresponding some units or modules are not performed. In addition, the displayed or discussed mutual couplings or direct couplings or communication connections may be implemented through some interfaces. The indirect couplings or communication connections between the apparatuses or units/modules may be implemented in electrical, mechanical, or other forms.

The units/modules described as separate parts may or may not be physically separate, and parts displayed as units/modules may or may not be physical units/modules, may be located in one position, or may be distributed on a plurality of network units/modules. Some or a part of the units/modules may be selected based on actual requirements to achieve the objectives of the solutions of embodiments.

In addition, the functional units/modules in embodiments of this application may be integrated into one processing unit/module, each of the units/modules may exist alone physically, or two or more units/modules are integrated into one unit/module.

When the functions are implemented in a form of a software functional unit/module and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

In embodiments of this application, when there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication apparatus, which is a source donor node or included in the source donor node, the communication apparatus comprising:
   at least one processor; and
   at least one memory configured to store computer readable instructions that, when executed by the at least one processor, cause the communication apparatus to:
      receive, from a target donor node, one or more of: first resource configuration information, sixth resource configuration information, or first information, wherein
         the first resource configuration information includes current resource configuration information of a target cell,
         the sixth resource configuration information includes resource reconfiguration information of the target cell,
         the target cell is served by a target parent node,
         a first node uses the target parent node to connect to the target donor node,
         the first information includes resource configuration information of a first cell and determined by the target donor node, and
         the first cell is served by the first node;
      determine the third resource configuration information based on the first resource configuration information, or determine the third resource configuration information based on the sixth resource configuration information or the first information, wherein the third resource configuration information is used for resource configuration of the first cell; and
      send the third resource configuration information to the first node.

2. The communication apparatus according to claim 1, wherein determining the third resource configuration information based on the first resource configuration information comprises:
   determining the third resource configuration information based on the first resource configuration information and second resource configuration information, wherein the second resource configuration information includes current resource configuration information of the first cell.

3. The communication apparatus according to claim 1, wherein determining the third resource configuration information based on the sixth resource configuration information and/or the first information comprises:
   determining the third resource configuration information based on the sixth resource configuration information and/or the first information and second resource configuration information, wherein the second resource configuration information includes current resource configuration information of the first cell.

4. The communication apparatus according to claim 1, wherein the communication apparatus is further caused to:
   determine second information based on the second resource configuration information, wherein the second resource configuration information includes the current resource configuration information of the first cell, and the second information includes resource configuration information of the target cell determined by a source donor node.

5. The communication apparatus according to claim 1, wherein the communication apparatus is further caused to:
   determine the second information based on the second resource configuration information and the first resource configuration information, wherein the second resource configuration information includes the current resource configuration information of the first cell, and the second information includes the resource configuration information of the target cell determined by the source donor node.

6. The communication apparatus according to claim 4, wherein the communication apparatus is further caused to:
   send the second information to the target donor node.

7. The communication apparatus according to claim 1, wherein the communication apparatus is further caused to:

determine fifth resource configuration information based on the third resource configuration information and/or the first resource configuration information, wherein the fifth resource configuration information includes resource reconfiguration information of a second cell, the second cell is served by a second node, and the second node is connected to the source donor node via the first node.

8. The communication apparatus according to claim 1, wherein the communication apparatus is further caused to:
determine fifth resource configuration information based on the third resource configuration information and/or the first resource configuration information and fourth resource configuration information, wherein the fourth resource configuration information includes current resource configuration information of the second cell, the second cell is served by a second node, the second node is connected to the source donor node via the first node, and the fifth resource configuration information includes the resource reconfiguration information of the second cell.

9. The communication apparatus according to claim 1, wherein the communication apparatus is further caused to:
determine fifth resource configuration information based on one or more of the sixth resource configuration information, the first information, and the third resource configuration information, wherein the fifth resource configuration information includes resource reconfiguration information of a second cell, the second cell is served by a second node, and the second node is connected to the source donor node via the first node.

10. The communication apparatus according to claim 1, wherein the communication apparatus is further caused to:
determine fifth resource configuration information based on fourth resource configuration information and one or more of the sixth resource configuration information, the first information, and the third resource configuration information, wherein the fourth resource configuration information includes current resource configuration information of a second cell, the fifth resource configuration information includes resource reconfiguration information of the second cell, the second cell is served by a second node, and the second node is connected to the source donor node via the first node.

11. The communication apparatus according to claim 7, wherein the communication apparatus is further caused to:
send the fifth resource configuration information to the second node; and
send second effectiveness indication information to the second node, wherein the second effectiveness indication information indicates the fifth resource configuration information is effective.

12. The communication apparatus according to claim 1, wherein the communication apparatus is further caused to:
send the third resource configuration information to the target donor node; and
send first effectiveness indication information to the first node, wherein the first effectiveness indication information indicates the third resource configuration information is effective.

13. The communication apparatus according to claim 1, wherein the communication apparatus is further caused to:
send a first request message to the target donor node, wherein the first request message is used to request to hand over a donor node of the first node from the source donor node to the target donor node, or the first request message is used to request to use the target donor node as a secondary node of the first node.

14. The communication apparatus according to claim 1, wherein
the first request message includes one or more of: first indication information, an identifier of the target cell, or the second resource configuration information,
the first indication information indicates that the first node is an integrated access and backhaul (IAB) node, and
the second resource configuration information includes the current resource configuration information of the first cell.

15. The communication apparatus according to claim 14, wherein the communication apparatus is further caused to:
receive a first response message from the target donor node, wherein the first response message is used to determine to hand over the donor node of the first node from the source donor node to the target donor node, or the first response message is used to determine to use the target donor node as the secondary node of the first node.

16. A communication apparatus, which is a first node or included in the first node, the communication apparatus comprising:
at least one processor; and
at least one memory configured to store computer readable instructions that, when executed by the at least one processor, cause the communication apparatus to:
receive third resource configuration information from a source donor node, wherein
the third resource configuration information is used for resource configuration of a first cell, and
the first cell is served by a first node;
determine that the third resource configuration information is effective by receiving first effectiveness indication information from the source donor node, a target donor node, or a target parent node, or by establishing a connection to the target parent node, wherein the first effectiveness indication information indicates that the third resource configuration information is effective; and
perform resource configuration on the first cell based on the third resource configuration information.

17. The communication apparatus according to claim 16, wherein the communication apparatus is further caused to:
send second effectiveness indication information to a second node, wherein the second effectiveness indication information indicates that fifth resource configuration information is effective.

18. A communication system, comprising:
a source donor node; and
a first node, wherein
the source donor node is configured to:
receive, from the target node, one or more of: first resource configuration information, sixth resource configuration information, or first information, wherein
the first resource configuration information includes current resource configuration information of a target cell,
the sixth resource configuration information includes resource reconfiguration information of the target cell,
the target cell is served by a target parent node,
a first node uses the target parent node to connect to the target donor node, the first information includes resource configuration information of a first cell and determined by the target donor node, and the first cell is served by the first node;

determine third resource configuration information by determining the third resource configuration information based on the first resource configuration information, or by determining the third resource configuration information based on the sixth resource configuration information and/or the first information, wherein the third resource configuration information is used for resource configuration of the first cell; and send the third resource configuration information to the first node;

wherein the first node is configured to:

receive the third resource configuration information from the source donor node; and perform resource configuration on the first cell based on the third resource configuration information.

19. The communication system according to claim 18, wherein the source donor node is further configured to:

determine the third resource configuration information based on the first resource configuration information and second resource configuration information, wherein the second resource configuration information includes current resource configuration information of the first cell.

20. The communication system according to claim 18, wherein the first node is further configured to:

determine that the third resource configuration information is effective by receiving first effectiveness indication information from the source donor node, a target donor node, or a target parent node, or by establishing a connection to the target parent node, wherein the first effectiveness indication information indicates that the third resource configuration information is effective; and send second effectiveness indication information to a second node, wherein the second effectiveness indication information indicates that fifth resource configuration information is effective.

\* \* \* \* \*